(12) United States Patent
Arnott

(10) Patent No.: US 11,092,978 B2
(45) Date of Patent: Aug. 17, 2021

(54) VALVE ASSEMBLY AND FLUID ARRANGEMENT FOR CONTINUOUS DELIVERY OF VOLUMETRICALLY PROPORTIONED FLUIDS

(71) Applicant: Michael D. Holt Company LLC, San Antonio, TX (US)

(72) Inventor: Glen M. Arnott, New Braunfels, TX (US)

(*) Notice: Subject to any disclaimer, the term of this patent is extended or adjusted under 35 U.S.C. 154(b) by 0 days.

(21) Appl. No.: 16/146,252

(22) Filed: Sep. 28, 2018

(65) Prior Publication Data

US 2020/0103925 A1  Apr. 2, 2020

(51) Int. Cl.
*G05D 7/01* (2006.01)
*G05D 11/03* (2006.01)

(52) U.S. Cl.
CPC ............. *G05D 7/014* (2013.01); *G05D 11/03* (2013.01)

(58) Field of Classification Search
CPC ............................... G05D 7/014; G05D 11/03
See application file for complete search history.

(56) References Cited

U.S. PATENT DOCUMENTS

| | | | |
|---|---|---|---|
| 2,257,249 A | 9/1941 | Thomas | |
| 3,790,129 A | 2/1974 | Pauls | |
| 4,309,022 A * | 1/1982 | Reinicke | F16K 31/1221 251/297 |
| 4,372,333 A * | 2/1983 | Goans | E21B 29/04 137/1 |
| 4,674,526 A | 6/1987 | Athanassiu | |
| 4,874,116 A | 10/1989 | Fallon et al. | |
| 4,889,152 A | 12/1989 | Wilson | |
| 4,928,850 A | 5/1990 | Fallon et al. | |
| 5,244,118 A | 9/1993 | Fallon et al. | |
| 6,152,163 A | 11/2000 | Tsargorodski et al. | |
| 6,308,724 B1 | 10/2001 | Haruch et al. | |
| 7,654,975 B2 | 2/2010 | Mantell | |
| 8,272,393 B2 | 9/2012 | Johnston | |
| 8,561,630 B2 | 10/2013 | Hu | |

OTHER PUBLICATIONS

McDantim, Inc., Specifications for TRUMIX Gas Blenders for Beer Dispense, Jan. 31, 2017, Helena, Montana, US.
McDantim, Inc., BEER GAS 101, date unknown, Helena, Montana, US.
ISA/US, International Search Report of the ISA/US for related PCT-US19-52741, dated Dec. 16, 2019.
ISA/US, Written Opinion of the ISA/US for related PCT-US19-52741, dated Dec. 16, 2019.

* cited by examiner

*Primary Examiner* — Michael R Reid
(74) *Attorney, Agent, or Firm* — Wayne J. Colton, Inc.

(57) ABSTRACT

A valve assembly and fluid arrangement for continuous delivery of volumetrically proportioned gases or like fluids includes a valve assembly and a volumetric fluid storage bank, which has first and second sets of fluid storage chambers. The valve assembly alternately supplies a consumer with a blend of gases from the first set of fluid storage chambers while charging the second set of fluid storage chambers from pressurized gas sources, and, upon a threshold depletion of gases from the first set of chambers, supply the consumer with a blend of gases from the second set of fluid storage chambers while charging the first set of fluid storage chambers from the gas sources. Upon the threshold depletion of gases from the second set of chambers, the valve assembly again supplies mixed gases from the first set of chambers while charging the second set of chambers, and the process repeats.

30 Claims, 42 Drawing Sheets

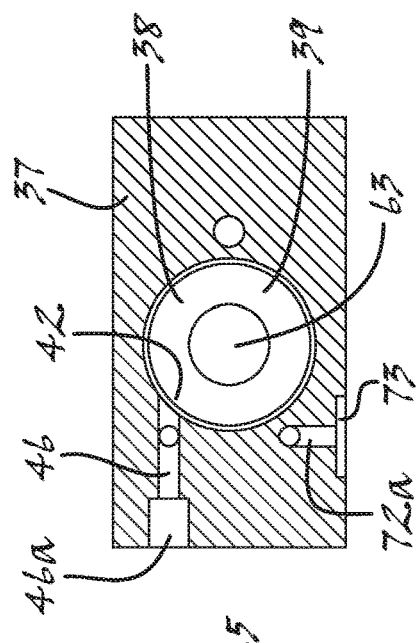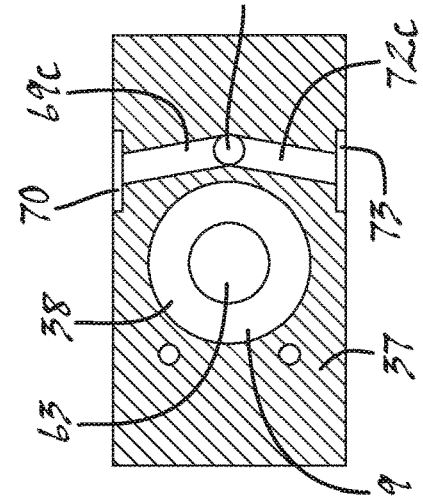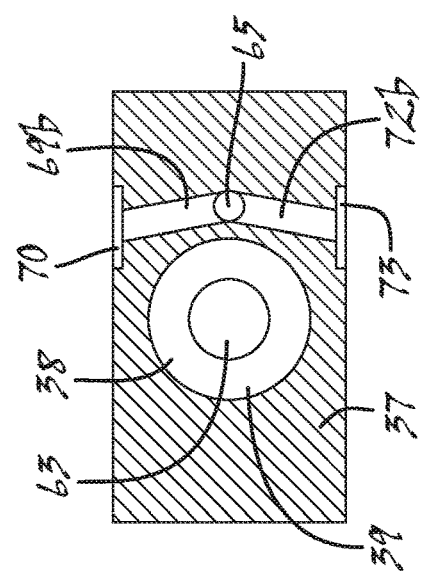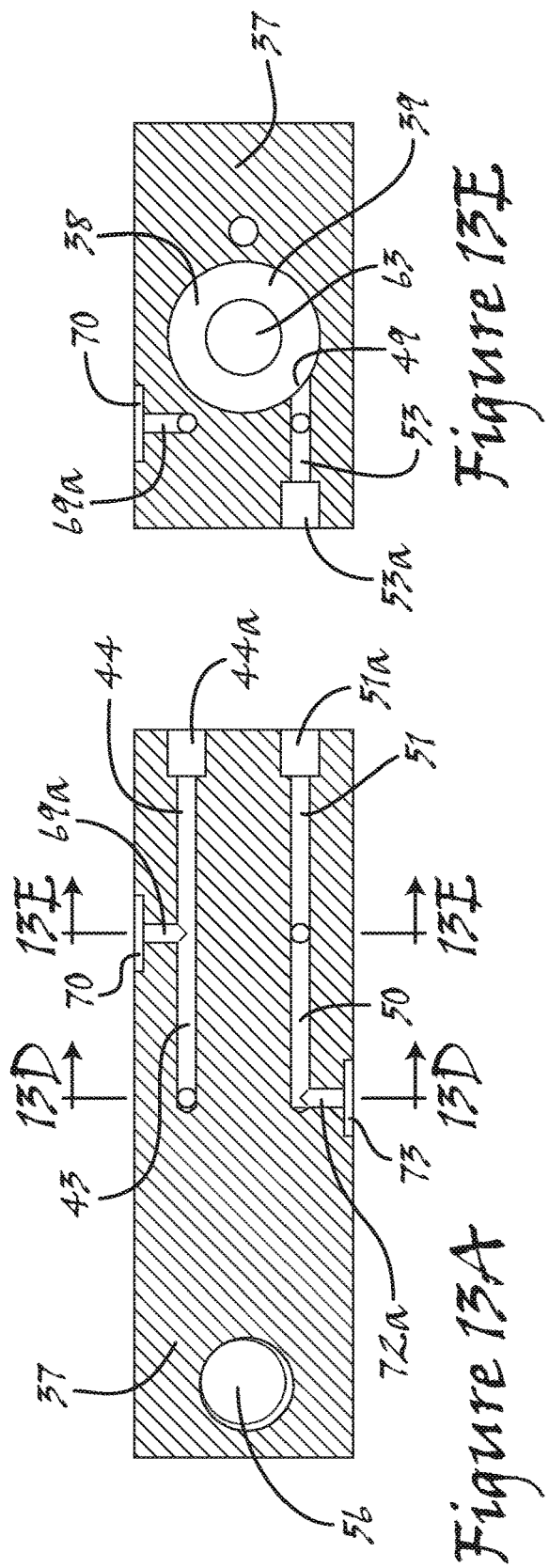

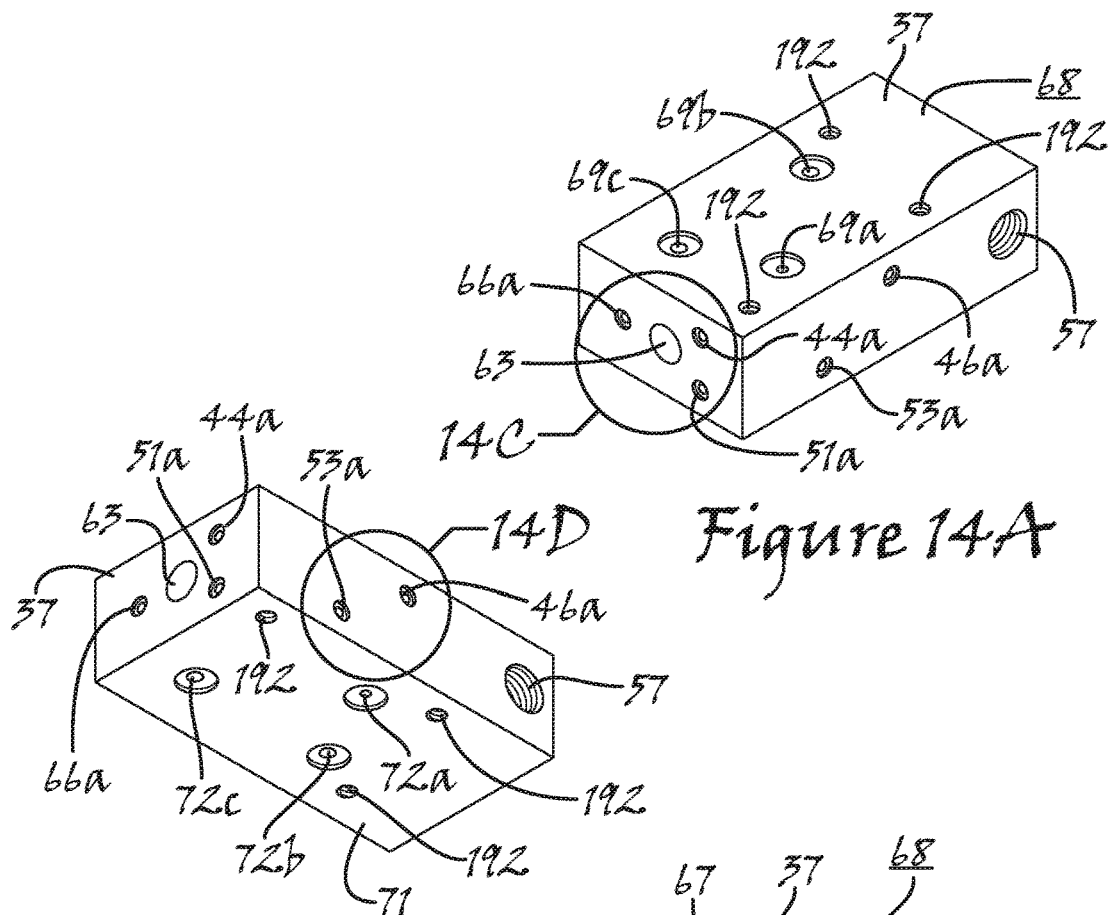
Figure 14A
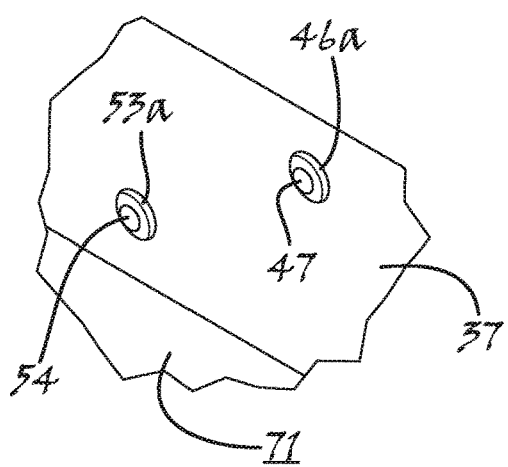
Figure 14B
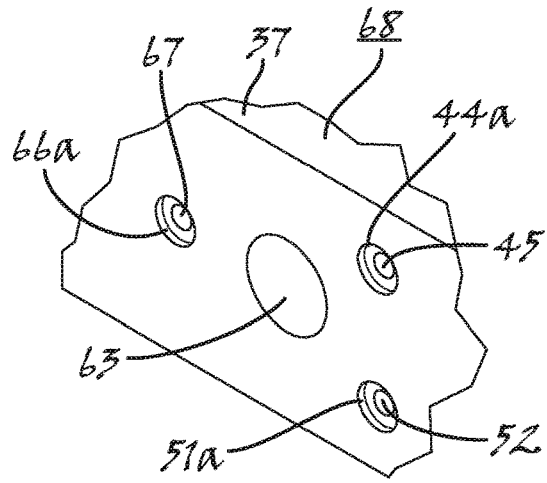
Figure 14C
Figure 14D

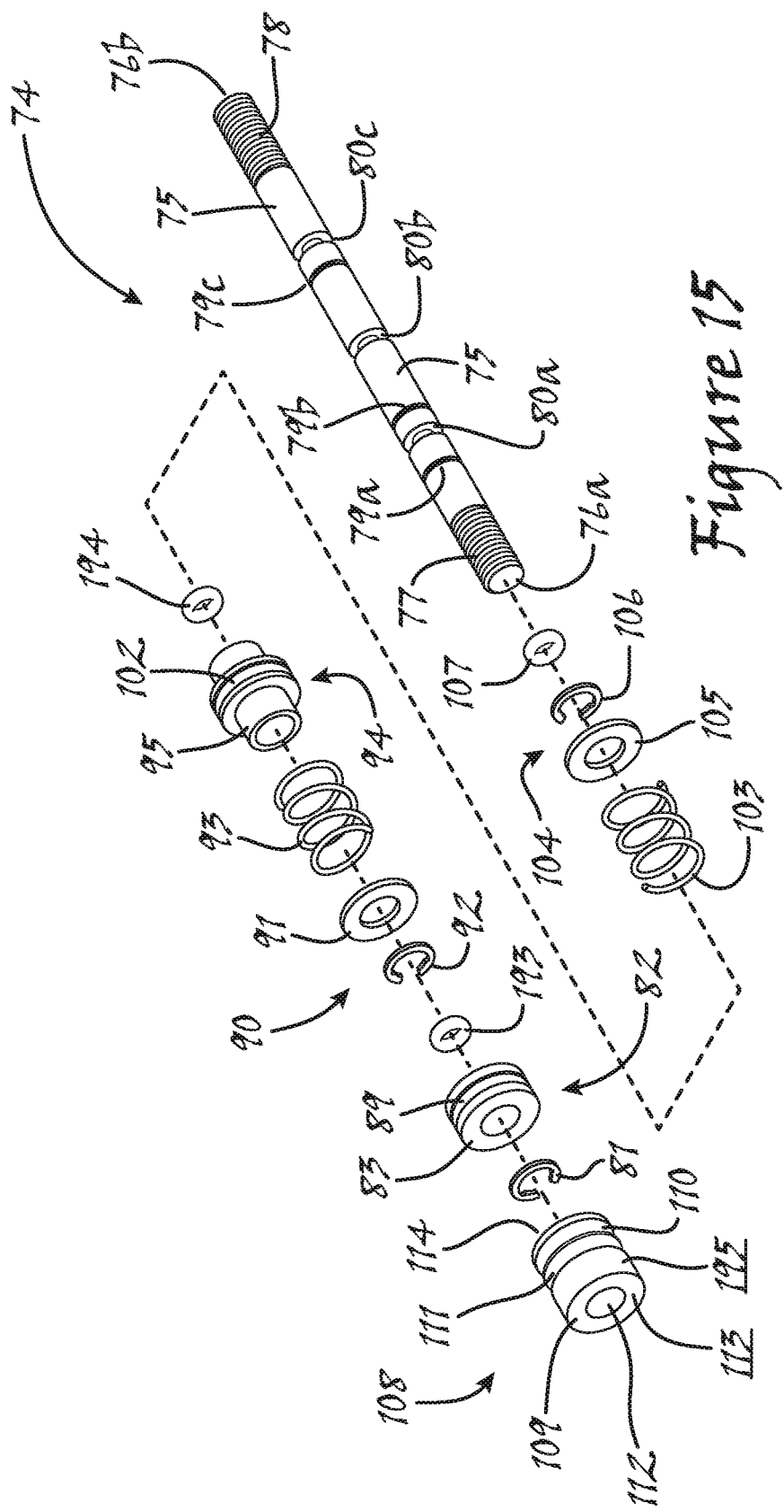

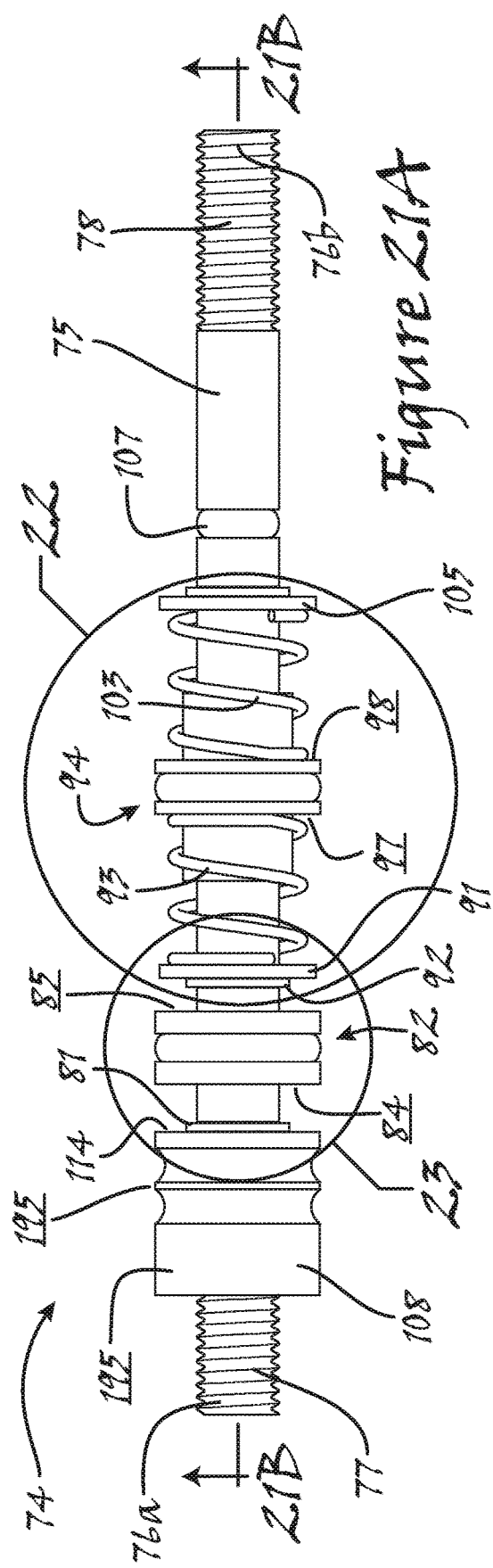
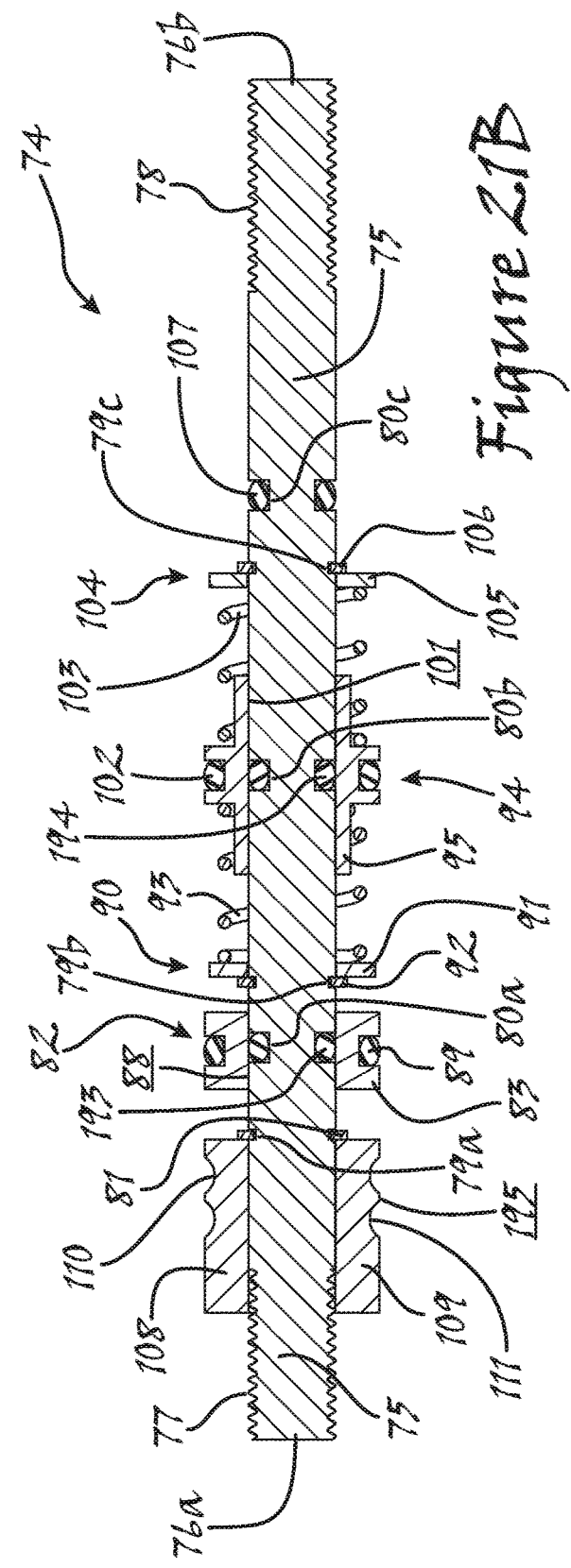

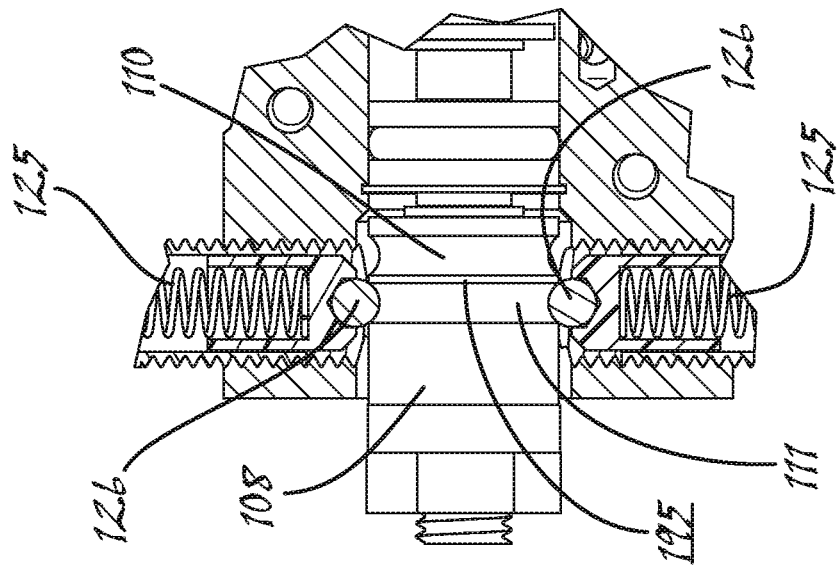
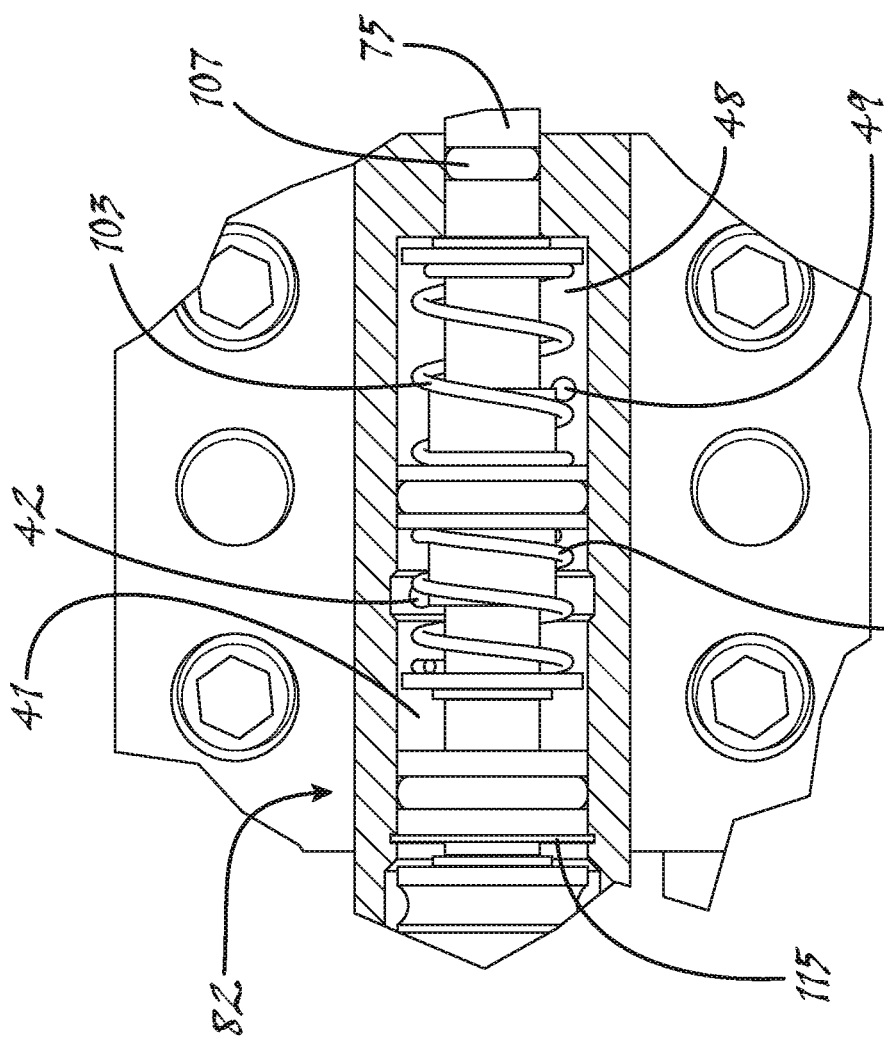

VALVE ASSEMBLY AND FLUID ARRAIGNMENT FOR CONTINUOUS DELIVERY OF VOLUMETRICALLY PROPORTIONED FLUIDS

FIELD OF THE INVENTION

The present invention relates to gas, and like fluid, handling. More particularly, the invention relates to a fluid arraignment specially adapted to deliver a continuous supply of volumetrically proportioned fluids, the arrangement including a fluid pressure operated valve controller adapted to automatically switch between alternate sources of volumetrically proportioned fluids, while simultaneously recharging depleted fluids within sources outside of the supply cycle.

BACKGROUND OF THE INVENTION

There exist many applications where a precise mixture of two or more gases, or like fluids, is required. For example, the draft beer systems often rely on mixtures of carbon dioxide ($CO_2$) and nitrogen (N) gases in order to dispense beer in long draft lines without over-carbonating the beer. To this end, gas blenders have been developed to provide specific ratios of carbon dioxide and nitrogen gases. To date, however, the available systems are generally very expensive, notwithstanding that they include components subject to failure and lack accuracy. Additionally, these systems are generally available only in fixed ratios, or with a limited selection of fixed ratios, and do not include any practical end-user adjustability.

In cases where a beer draft system employed by a craft beer establishment, however, it is highly desirable for the establishment to be able to readily select widely varying ratios of carbon dioxide and nitrogen gases. To be sure, such an establishment may, under at least some circumstances, desire a blend of 10% $CO_2$ and 90% N, and, under other circumstances, may desire a blend of 40% $CO_2$ and 60% N. What is universally true, however, is that once a ratio is identified as providing a desired presentation and flavor in the glass, the establishment will want to precisely maintain that ratio in the gas lines to the tap. That said, the state of the art is clearly lacking for applications requiring the provision of blended gases in specific ratios, and especially in cases where the ratio of component gases may need to be user selectable.

It is therefore an object of the present inventions to provide systems and methods for accurately providing a continuous flow of volumetrically proportioned gases.

It is a further object of the present inventions to provide such systems and methods that are reliable in use, and do not require external power or include consumable components, such as filters.

It is an additional object of the present inventions to provide such systems and methods that is readily adjustable by an end-user, without sacrifice of reliability or accuracy, or risk of injury to the user or damage to the system.

Finally, it is an object of the present inventions to provide such systems and methods that are economical to manufacture, and therefore readily available to the widest consumer base.

SUMMARY OF THE INVENTION

In accordance with the foregoing objects, the present invention—a valve assembly and fluid arrangement for continuous delivery of volumetrically proportioned gases or other fluids—generally comprises a valve assembly and a volumetric fluid storage bank, which includes at least a first set of fluid storage chambers and a second set of fluid storage chambers. The valve assembly is specially adapted to alternately supply a mixed gas consumer with a blend of gases from the first set of fluid storage chambers while charging the second set of fluid storage chambers from a plurality of pressurized gas sources, and, upon a threshold depletion of the blended gases from the first set of fluid storage chambers, supply the mixed gas consumer with a blend of gases from the second set of fluid storage chambers while charging the first set of fluid storage chambers from the plurality of pressurized gas sources. Upon the threshold depletion of the blended gases from the second set of fluid storage chambers, the valve assembly again supplies mixed gases from the first set of fluid storage chambers while charging the second set of fluid storage chambers, and the process repeats.

The valve assembly includes an independently inventive fluid pressure operated valve controller, which, in at least some implementations, comprises a shift rod assembly operably mated with a controller body. The body includes a first, longitudinal axis, a second axis transverse to the first axis, and inner walls about the first axis, which define a piston chamber and detent cavity. The shift rod assembly comprises a shift rod adapted to interface with a valve actuator, said shift rod translatable along the central axis between first and second positions with respect to the body, and various components operably supported on and about the shift rod, including first and second seal members defining first and second ends of the piston chamber; a floating piston slidingly affixed about the shift rod, and segregating the piston chamber into first and second volumes; means to translate the shift rod between first and second operable states responsive to the relative fluid pressures of the first and second volumes; a force resisting mechanism adapted to oppose translation of the shift rod until the differential fluid pressure between the first and second volumes a threshold absolute value; and a force storage mechanism adapted to facilitate translation of the shift rod upon substantial equalization of the fluid pressures of the first and second volumes following attainment the threshold absolute value.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 12D shows, in a cross-sectional view through cut line 12D-12D of FIG. 12A, various details of the gas mixing manifold of FIG. 12A, as the gas mixing manifold intersects a first set of ducts, which, in use of the present invention, are in fluid communication with corresponding ducts of the first and second spool valves;

FIG. 12E shows, in a cross-sectional view through cut line 12E-12E of FIG. 12A, various details of the gas mixing manifold of FIG. 12A, as the gas mixing manifold intersects a second set of ducts, which, in use of the present invention, are in fluid communication with corresponding ducts of the first and second spool valves;

FIG. 13A shows, in a cross-sectional view through cut line 13A-13A of FIG. 10C, various internal details of the valve controller body of FIG. 10A, including, in particular, details of a first channel providing fluid communication between the first spool valve and a first pressure port into a first volume of the piston chamber of the valve controller body and a second channel providing fluid communication between the second spool valve and a second pressure port into a second volume of the piston chamber of the valve controller body;

FIG. 13D shows, in a cross-sectional view through cut line 13D-13D of FIG. 13A, details of the formation of the first pressure port, as provides fluid communication between the first channel and the first volume of the piston chamber;

FIG. 13E shows, in a cross-sectional view through cut line 13E-13E of FIG. 13A, details of the formation of the second pressure port, as provides fluid communication between the second channel and the second volume of the piston chamber;

FIGS. 14A and 14B show, in isometric views, the valve controller body as finally prepared for integration with the valve controller;

FIGS. 14C and 14D show, in detail views taken from FIGS. 14A and 14C, respectively, details of the construction of the first and second channels of FIG. 13A, and where FIG. 14C also shows details of the construction of the gas mixing manifold of FIG. 12A;

FIG. 15 shows, in an exploded isometric view, various details of a shift rod assembly, as specially adapted for use, in connection with the valve controller body of FIGS. 14A and 14B, in the exemplary implementation of the fluid pressure operated valve controller according to the present invention, and, in particular, shows a shift rod together with various components to be mounted on and about the shift rod;

FIG. 21A shows, in an elevational view, various details of the shift rod assembly of FIG. 15, as assembled in preparation for integration with the valve controller body;

FIG. 21B shows, in a cross-sectional view through cut line 21B-21B of FIG. 21A, details of the interfacing of the mounted components and the shift rod;

FIG. 43C shows, in a detail view taken from FIG. 43A, details of the shift rod assembly, as the valve assembly is in the state of FIG. 43A;

FIG. 43D shows, in a detail view taken from FIG. 38B, details of the operation of the detents on the shift rod stop member, as the valve assembly is in the state of FIG. 43A;

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
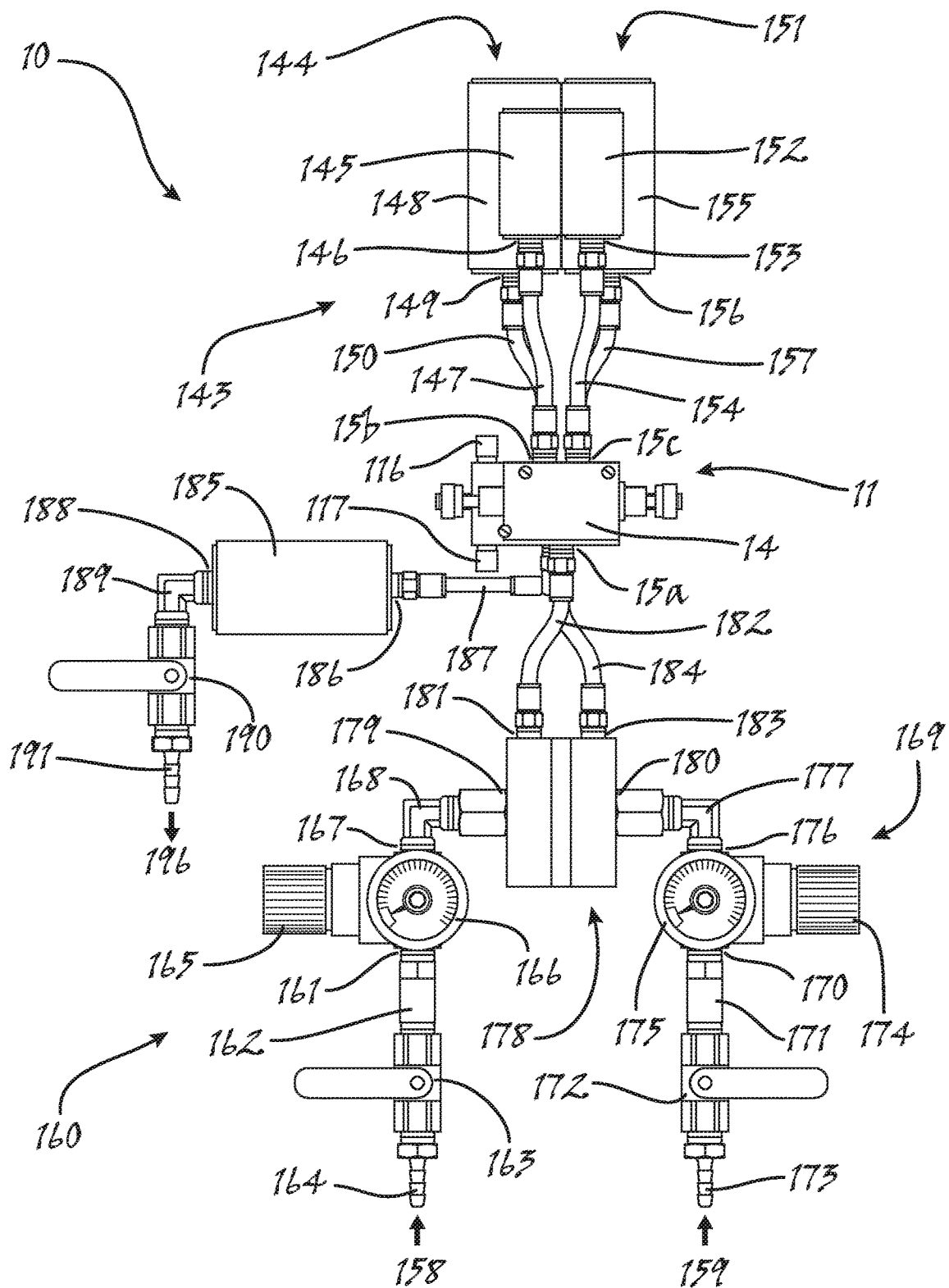
FIG. 1 shows, in a plan view, a pneumatic arrangement for continuous delivery of volumetrically proportioned gases or other fluids, including an inventive valve assembly in fluid communication with a plurality of gas sources and a volumetric fluid storage bank.

Referring now to the figures, and to FIG. 1 in particular, a pneumatic arrangement 10 for substantially continuous delivery of a volumetrically proportioned mixture—or blend—of gases is shown to generally comprise a valve assembly 11, which is in and of itself inventive, and a volumetric fluid storage bank 143, which comprises at least a first set 144 of fluid storage chambers and a second set 151 of fluid storage chambers. In accordance with the present inventions, the valve assembly 11 is specially adapted to alternately supply a mixed gas consumer 196 with a blend of gases from the first set 144 of fluid storage chambers while charging the second set 151 of fluid storage chambers from a plurality of pressurized gas sources 158, 159, and, upon a threshold depletion of the blended gases from the first set of fluid storage chambers, supply the mixed gas consumer 196 with a blend of gases from the second set 151 of fluid storage chambers while charging the first set 144 of fluid storage chambers from the plurality of pressurized gas sources 158, 159. Upon the threshold depletion of the blended gases from the second set 151 of fluid storage chambers, the valve assembly 11 again supplies mixed gases from the first set 144 of fluid storage chambers while charging the second set 151 of fluid storage chambers, and the process repeats.

Although the following exemplary embodiments of the present inventions are generally set forth with respect to the provision of a mixture, or blend, of gases, it is noted at the outset that the teachings of the present inventions are generally applicable to implementations and uses in connection other fluids beyond gases, all of which should be considered within the scope of the present inventions as limited only by the claims appended hereto. That said, the present inventions are particularly useful in applications requiring the provision of blended gases in specific ratios. For examples, in a case where the mixed gas consumer 196 comprises a beer draft system, a first source 158 may provide pressurized carbon dioxide ($CO_2$), while a second gas source 159 may provide pressurized nitrogen (N). In any case, the pressurized gas sources 158, 159 may take any conventional form, such as, for example, that of a pressurized gas cylinder or the like.

In order to provide volumetric proportioning of the gases, each set 144, 151 of fluid storage chambers in the volumetric fluid storage bank 143 includes one storage chamber for each of the plurality of gases to be blended. Although the teachings of the present invention contemplate that more than two gases, or other fluids, may be mixed, in the exemplary implementation as now shown and described, each set 144, 151 of fluid storage chambers comprises a pair of fluid storage chambers, where one chamber of each pair corresponds to one of each of the two described gas sources 158, 159.

Figure 3A:
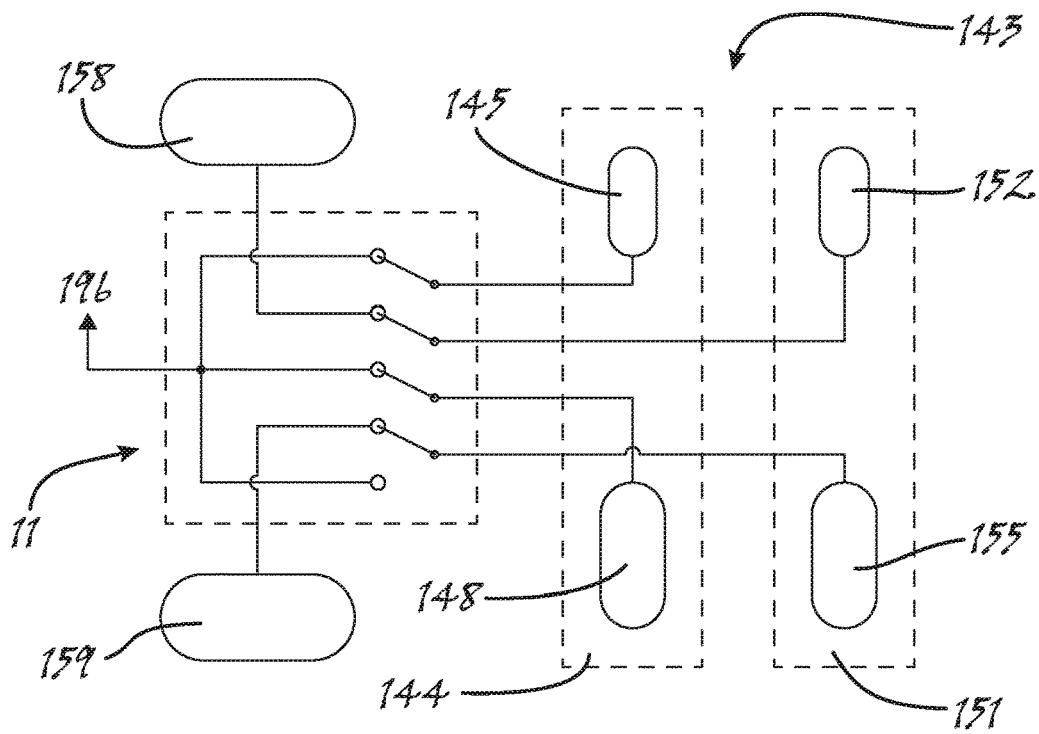
FIG. 3A shows, in a pneumatic diagram, the controlled flow through the valve assembly between the gas sources and a consumer of a mixture of volumetrically proportioned gases, as the valve assembly is in a first operable state.
Figure 3B:
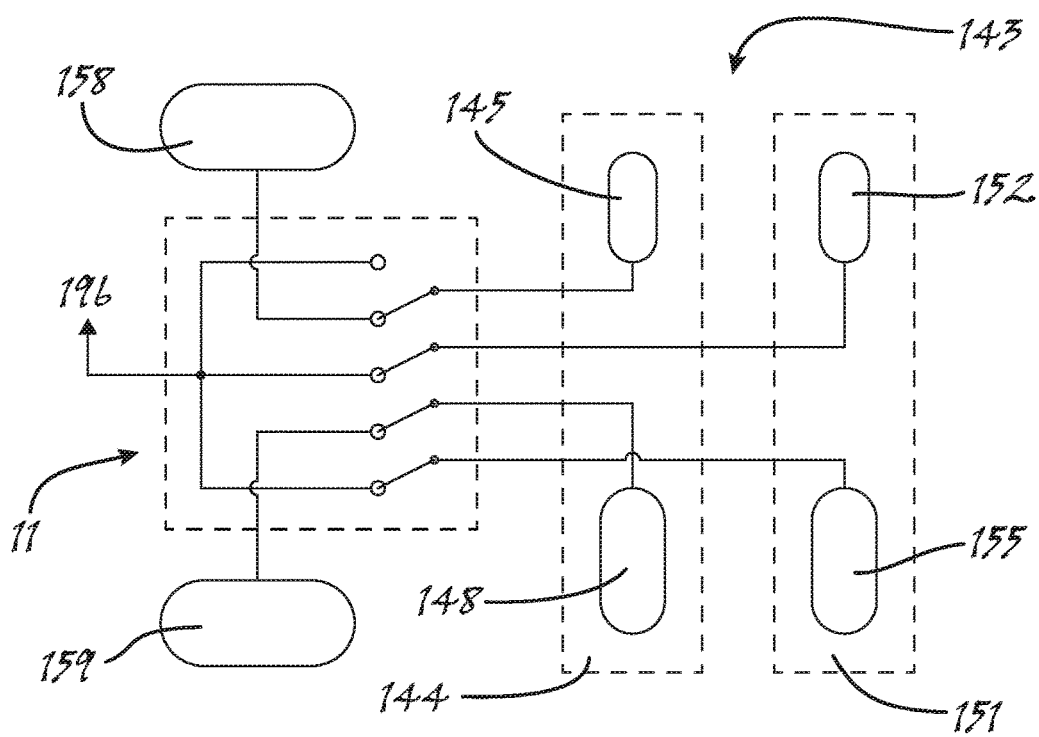
FIG. 3B shows, in a pneumatic diagram, the controlled flow through the valve assembly between the gas sources and the mixed gas consumer, as the valve assembly is in a second operable state.

As particularly shown in FIG. 1, but also in FIGS. 3A and 3B, the first set 144 of fluid storage chambers includes a first canister 145 of a first volume, which canister 145 corresponds to the first gas source 158 and comprises, for example, a closed cylinder or other substantially equivalent storage chamber. As shown, the provided storage chamber includes a threaded nipple 146 or like structure that preferably provides the sole opening into the contained volume. Likewise, the first set 144 of fluid storage chambers includes a second canister 148 of a second volume, which canister 148 corresponds to the second gas source 159 and comprises, for example, a closed cylinder or other substantially equivalent storage chamber. Like the first canister 148, the provided storage chamber includes a threaded nipple 149 or like structure that preferably provides the sole opening into the contained volume.

The second set 151 of fluid storage chambers includes a third canister 152 of a third volume. Like the first canister 145, the third canister 152 corresponds to the first gas source 158 and comprises, for example, a closed cylinder or other substantially equivalent storage chamber having a threaded nipple 153 or like structure that preferably provides the sole opening into the contained volume. Likewise, the second set 151 of fluid storage chambers includes a fourth canister 155 of a fourth volume. Like the second canister 148, the fourth canister 155 corresponds to the second gas source 159 and comprises, for example, a closed cylinder or other substantially equivalent storage chamber having a threaded nipple 156 or like structure that preferably provides the sole opening into the contained volume.

As will be better understood further herein, it is necessary for the canisters 152, 155 of the second set 151 to be provided in the same volumetric proportion, per gas, as the canisters 145, 148 of the first set 144—that is, the ratio of the third volume of the third canister 152 to the fourth volume of the fourth canister 155 must be substantially equal to the ratio of the first volume of the first canister 144 to the second volume of the second canister 148. Although not necessary to any implementation, it is noted the required result is obtained if the third volume of the third canister 152 is the same as the first volume of the first canister 144 and the fourth volume of the fourth canister 155 is the same as the second volume of the second canister 148. Additionally, it is noted that where an equal proportion of two gases is desired the first and second volumes may be equal, in which case the third and fourth volumes would also be equal. In any case, all implementations producing the required proportionality should be considered within the scope of the present invention, which is limited only by the claims appended hereto.

Figure 2A:
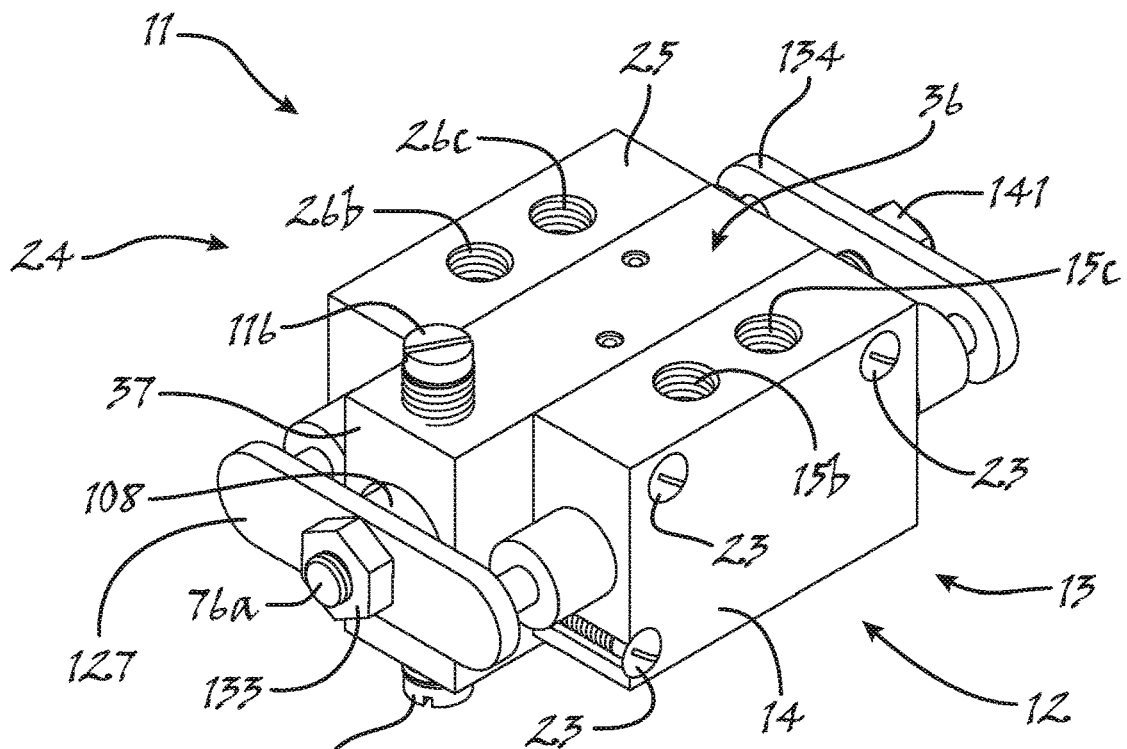
FIG. 2A shows, in a first, storage bank side isometric view, an exemplary implementation of the preferred embodiment of the valve assembly of FIG. 1.

In any case, as shown in FIG. 1, with reference to FIG. 2A, each of the provided canisters 145, 148, 152, 155 is in fluid communication with the valve assembly 11. To this end, the valve assembly 11 includes a first pair of storage ports 15$b$, 15$c$, which, as will be better understood further herein, selectively provide fluid communication of the first gas between the valve assembly 11 and the first and third canisters 145, 152, respectively. In particular, conventional tubing 147, such as the pipe, as shown, or any other suitable tubular member, connects the port 15$b$ of the valve assembly 11 to the threaded nipple 146 of the first canister 145, and conventional tubing 154, such as the pipe, as shown, or any other suitable tubular member, connects the port 15$c$ of the valve assembly 11 to the threaded nipple 153 of the third canister 152.

Figure 2B:
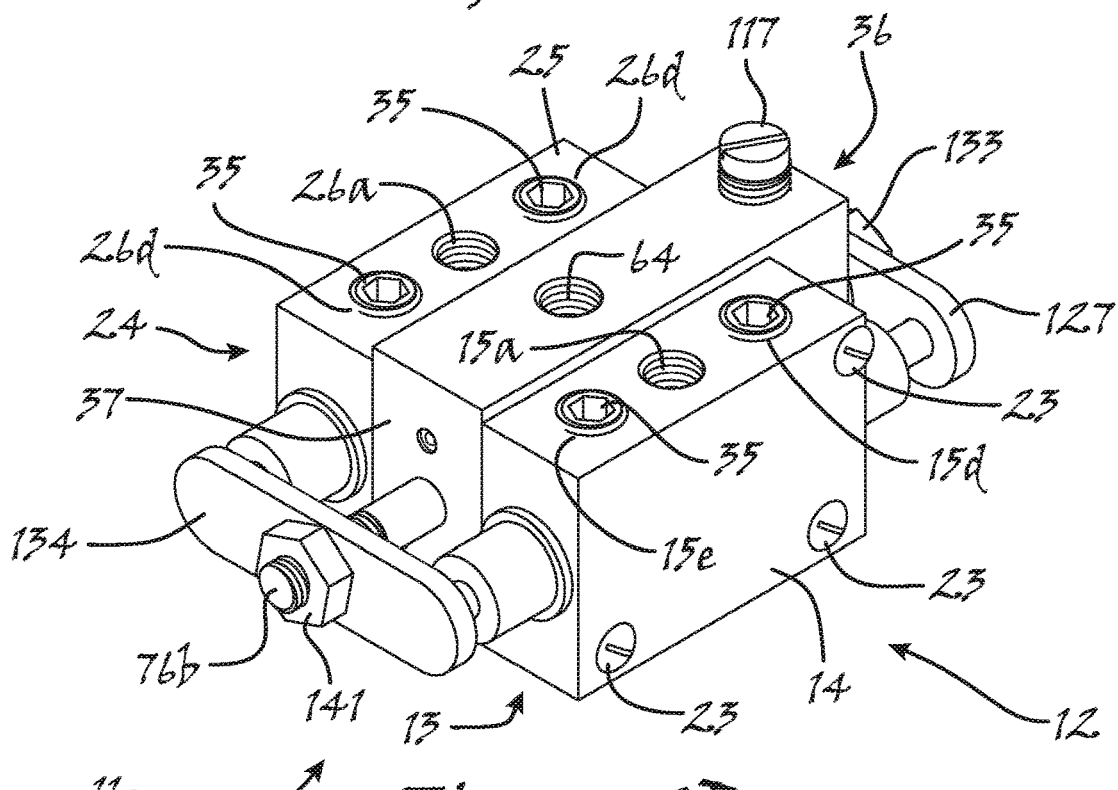
FIG. 2B shows, in a second, gas sources side isometric view, the valve assembly of FIG. 2A.

Likewise, the valve assembly 11 includes a second pair of storage ports 26$b$, 26$c$, which, as will also be better understood further herein, selectively provide fluid communication of the second gas between the valve assembly 11 and the second and fourth canisters 148, 155, respectively. In particular, conventional tubing 150, such as the pipe, as shown, or any other suitable tubular member, connects the port 26$b$ of the valve assembly 11 to the threaded nipple 149 of the second canister 148, and conventional tubing 157, such as the pipe, as shown, or any other suitable tubular member, connects the port 26$c$ of the valve assembly 11 to the threaded nipple 156 of the fourth canister 155. As shown in FIG. 2B, the valve assembly 11 also includes a first inlet port 15$a$ for introducing the first gas to the valve assembly 11, and a second inlet port 26$a$ for introducing the second gas to the valve assembly 11. Additionally, and as also particularly shown in FIG. 2B, the valve assembly further includes an outlet port 64, which provides fluid communication of the blended gases from the valve assembly 11 for ultimate provision to the mixed gas consumer 196.

Referring now to FIGS. 3A and 3B, the general function of the pneumatic arrangement of the present invention is described, where FIG. 3A shows the valve assembly 11 in a first operable state, and FIG. 3B shows the valve assembly 11 in a second operable state. In the first operable state, as shown in FIG. 3A, the valve assembly 11 causes the gases of the first set 144 of storage chambers—first canister 145 and second canister 148—to be mixed, or blended, together and ultimately delivered to the mixed gas consumer 196. As the mixture of gases from the first set 144 of storage chambers is being delivered to the mixed gas consumer 196, the valve assembly 11 also operates to charge the second set 151 of storage chambers—third canister 152 and fourth canister 155—by providing fluid communication between the first gas source 158 and the third canister 152, and fluid communication between the second gas source 159 and the fourth canister 155. As will be better understood further herein, the valve assembly 11 is inventively adapted to be pneumatically controlled. In particular, and as will be better understood further herein, depletion of the mixed gases from the first set 144 of storage chambers to a fluid pressure less than a threshold value below the fluid pressure of the gas charging one of the canisters 152, 155 of the second set 151 of storage chambers will result in mechanical transition of the valve assembly 11 from the first operable state to its second operable state.

In the second operable state, as shown in FIG. 3B, the valve assembly 11 causes the gases of the second set 151 of storage chambers—third canister 152 and fourth canister 155—to be mixed, or blended, together and ultimately delivered to the mixed gas consumer 196. As the mixture of gases from the second set 151 of storage chambers is being delivered to the mixed gas consumer 196, the valve assembly 11 also operates to charge the first set 144 of storage chambers—first canister 145 and second canister 148—by providing fluid communication between the first gas source 158 and the first canister 145, and fluid communication between the second gas source 159 and the second canister 148. In the previously noted inventive implementation of the valve assembly 11, and as will be better understood further herein, depletion of the mixed gases from the second set 151 of storage chambers to a fluid pressure less than a threshold value below the fluid pressure of the gas charging one of the canisters 145, 148 of the first set 144 of storage chambers will result in mechanical transition of the valve assembly 11 from the second operable state to its first operable state.

As previously noted, the volume of the third canister 152 relative to the volume of the fourth canister 155 must at least be proportional to the volume of the first canister 145 relative to the volume of the second canister 148. In other terms, the ratio of the third volume relative to the fourth volume must equal the ratio of the first volume relative to the second volume. Additionally, however, the fluid pressure of the first gas from the first gas source 158 as introduced to the valve assembly 11 and the fluid pressure of the second gas from the second gas source 159 as introduced to the valve assembly must be substantially equal. With these constraints in place, and in light of this exemplary disclosure, it will be appreciated that the described charging of the first set 144 of storage chambers establishes the volumetric proportion of gases present in the mixture of gases thereafter supplied from the first set 144 of storage chambers to the mixed gas consumer 196. Likewise, of course, the described charging of the second set 151 of storage chambers establishes the volumetric proportion of gases present in the mixture of gases thereafter supplied from the second set 151 of storage chambers to the mixed gas consumer 196, which volumetric proportion will be equal to the proportion supplied from the first set 144 of storage chambers.

In order to adjust the "mixture," i.e. the proportion of gases delivered to the mixed gas consumer 196, the user need only change out, or otherwise substitute, the storage chambers corresponding to one or the other gas sources 158, 159, replacing the removed chambers with new chambers of appropriately differing volumes. For example, a pneumatic arrangement 10 established to provide a mixture consisting of 75% of the first gas and 25% of the second gas is readily adjusted to provide a mixture consisting of 40% of the first gas and 60% of the second gas by simply unscrewing and removing some or all of the gas canisters 145, 148, 152, 155 and replacing the removed canisters with any combination of canisters sized to produce the newly desired 40/60 ratio. As will be appreciated by those of ordinary skill in the art, in light of this exemplary description, this feature is highly desirable for end-user operation and/or maintenance of the pneumatic arrangement 10.

Noting again that in many, if not all, applications of the present invention, equal gas pressures at the inlet ports 15a, 26a to the valve assembly 11 is very important to satisfactory performance of the present inventions, the most preferred implementations of the present inventions further include measures to ensure balanced input gas pressures. In particular, and as shown in FIG. 1, the most preferred implementations of the pneumatic arrangement according to the present inventions include one or more pressure regulators 160, 169 and/or a pressure balancer 178.

As shown in FIG. 1, a first conventional gas pressure regulator 160 for use in regulating pressure of the first gas as provided from the first gas source 158, and as is well-known to those of ordinary skill in the art, comprises an inlet 161, an outlet 167, and an adjustment knob 165 for setting or otherwise selecting the output pressure from the regulator 160. In order to select the output pressure for the first gas, the gas pressure regulator 160 preferably further comprises at least a low pressure gauge 166. Those of ordinary skill in the art, however, will recognize that other features such as, for example, a pressure relief valve may be provided. Likewise those of ordinary skill in the art will recognize that a high pressure gauge may be desired as being particularly useful for monitoring and determining depletion of the first gas source 158. In any case, such additional features, as well as alternative embodiments of gas pressure regulators, are all readily within the ordinary skill in the relevant arts.

As also shown in FIG. 1, a second conventional gas pressure regulator 169 for use in regulating pressure of the second gas as provided from the second gas source 159, and as is well-known to those of ordinary skill in the art, comprises an inlet 170, an outlet 176, and an adjustment knob 174 for setting or otherwise selecting the output pressure from the regulator 169. In order to select the output pressure for the second gas, the gas pressure regulator 169 preferably further comprises at least a low pressure gauge 175. Those of ordinary skill in the art, however, will recognize that other features such as, for example, a pressure relief valve may be provided. Likewise those of ordinary skill in the art will recognize that a high pressure gauge may be desired as being particularly useful for monitoring and determining depletion of the second gas source 159. In any case, such additional features, as well as alternative embodiments of gas pressure regulators, are all readily within the ordinary skill in the relevant arts.

In at least some applications of the present inventions, the outlet 167 from the first pressure regulator 160 may be placed in direct fluid communication with the first gas inlet port 15a of the valve assembly 11, and the outlet 176 from the second pressure regulator 169 may be placed in direct fluid communication with the second gas inlet port 26a of the valve assembly 11. It is noted, however, that variances in manufacturing, component wear, difficulty in reading the pressure gauges 166, 175, and the like may result in variances between actual output pressures and indicated pressures for the pressure regulators 160, 169. As a result, it is most preferable that the gas outlets 167, 176 from the pressure regulators 160, 169 feed into a pressure balancer 178 prior to delivery of the first and second gases from the first and second outlets 167, 176 to the inlets 15a, 26a, respectively, of the valve assembly 11.

FIG. 1 shows a pressure balancer 178 interposed the gas outlets 167, 176 from the pressure regulators 160, 169, respectively, and the valve assembly 11. As shown in the figure, the exemplary pressure balancer 178 includes a first inlet port 179 for the first gas from the outlet 167 of the first pressure regulator 160, and a second inlet port 180 for the second gas from the outlet 176 of the second pressure regulator 169. The pressure balancer 178 operates to equalize the pressures of the first and second gases as the first and second gases flow through the pressure balancer 178, such that the balanced output pressure of each of the first and second gases is an equal pressure at or below the lower of the pressures of the gases admitted through the inlet ports 179, 180. A first outlet port 181 passes the balanced pressure first gas from the pressure balancer 178, and a second outlet port 183 passes the balanced pressure second gas from the pressure balancer 178. Importantly, it should be understood that the first and second gases remain separate one from another, and do not mix together within the pressure balancer 178.

Implementation of such a pressure balancer 178 is readily within the ordinary skill in the relevant arts, and may take any of a variety of forms. For example, the pressure balancer 178, as described, may be implemented by plumbing commercially available common off-the-shelf components. For example, a low pressure selector relay, such as, for example, the well-known Model 90 low pressure selector relay commercially available from Fairchild Industrial Products Company of Winston-Salem, N.C., may be used to select, based on lowest pressure, either the first gas or the second gas. The selected low pressure gas flow is then "switched" by the selector into use as a pilot pressure. The pilot pressure then simultaneously drives a first pneumatic booster controlling flow through the pressure balancer 178 of the first gas and a second pneumatic booster controlling flow through the pressure balancer 178 of the second gas. The first and second pneumatic boosters, which in the present application would each be set to control flow on a 1:1 pressure ratio, may each comprise, for example, the well-known Model 20 pneumatic precision booster, also commercially available from Fairchild Industrial Products Company.

Additionally, and also desirable, those of ordinary skill in the art will recognize that such relays and/or boosters, or other commonly available pneumatic controllers, may be utilized in such a combination to require that the selected low pressure for the pilot be at or above a minimum pressure required by the ultimate mixed gas consumer 196. In this manner, the pressure balancer 178 also serves to ensure that the pneumatic arrangement 10 automatically shuts off flow to the mixed gas consumer 196 in the event that one or the other of the gas sources 158, 159 depletes to an inadequate pressure.

Referring then again to FIGS. 1 and 2B, the most preferred implementation of the pneumatic arrangement 10 contemplates provision of a first pressure regulator 160 and a second pressure regulator 169, which direct gas flows into and through pressure balancer 178, which delivers the gas flows in optimal condition to the valve assembly 11. As shown in the figures, the first pressure regulator 160 preferably includes a shut-off valve 163, such as a conventional fluid tight ball valve or the like, as may be useful, for example, in change out of the first gas source 158. The shut-off valve 163 is connected on a first side through conventional tubing 162, such as the depicted nipple or the like, to the inlet 161 of the first pressure regulator 160, and on a second side has a hose nipple 164. The first gas source 158 then connects to the first pressure regulator 160 through any compatible conventional fluid conduit between the first gas source 158 and the hose nipple 164, such as for example flexible tubing.

As also shown in the figures, the second pressure regulator 169 preferably includes a shut-off valve 172, such as a conventional fluid tight ball valve or the like, as may be useful, for example, in change out of the second gas source 159. The shut-off valve 172 is connected on a first side through conventional tubing 171, such as the depicted nipple or the like, to the inlet 170 of the second pressure regulator 169, and on a second side has a hose nipple 173. The second gas source 159 then connects to the second pressure regulator 169 through any compatible conventional fluid conduit between the second gas source 159 and the hose nipple 173, such as for example flexible tubing.

The outlet 167 from the first pressure regulator 160 connects through conventional tubing 168, such as the elbow, as shown, or another suitable tubular member, to the first gas inlet 179 of the pressure balancer 178. Likewise, the outlet 176 from the second pressure regulator 169 connects through conventional tubing 177, such as the elbow, as shown, or another suitable tubular member, to the second gas inlet 180 of the pressure balancer 178. The pressure balanced individual flows of the first and second gases, are then conveyed to the valve assembly 11. In particular, the first gas outlet port 181 from the pressure balancer 178 connects through conventional tubing 182, such as flexible pipe, as shown, or any other suitable tubular member, to the first gas inlet port 15a of the valve assembly 11. Likewise, the second gas outlet port 183 from the pressure balancer 178 connects through conventional tubing 184, such as flexible pipe, as shown, or any other suitable tubular member, to the second gas inlet port 26a of the valve assembly 11.

It is noted, at this juncture, that the provision of the first and second pressure regulators 160, 169 is deemed important, in at least some implementations, notwithstanding the provision of a pressure balancer 178. In particular, it is noted that the pressure regulators 160, 169 serve to ensure that the canisters 145, 148, 152, 155 of the volumetric fluid storage bank 143 are not inadvertently charged to an excessive pressure. In this manner, the pressure regulators 160, 169 prevent such excessive pressures from being inadvertently delivered to the mixed gas consumer 196, which otherwise could result in substandard product or damaged equipment. On the other hand, a single pressure regulator in combination with the pressure balancer 178 may be suitable to prevent such problems. Likewise, in circumstances where excessive pressure is not of great concern, implementation without any pressure regular may be acceptable.

It is also noted at this juncture that as the valve assembly 11 shifts between the first state and the second state, and again back to the first state, a pressure surge may be generated in the mixed gas flow from the outlet 64 of the valve assembly 11. To this end, the most preferred pneumatic arrangement 10 of the present invention includes a surge chamber 185. The surge chamber 185 comprises a canister or like structure providing an increased volume in the output gas flow in which the effects of rapid changes in pressure are dampened. As shown in FIG. 1, the outlet 64 from the valve assembly 11 connects through conventional tubing 187, such as the pipe, as shown, or any other suitable tubular member, to the inlet 186 of the surge chamber 185. A shut-off valve 190, as may comprise a conventional fluid tight ball valve or the like, may also desired, in which case the shut-off valve 190 is preferably placed after the surge chamber 185 in the output gas flow. As shown, the the outlet 188 from the surge chamber 185 connects through conventional tubing 189, such as the elbow, as shown, or another suitable tubular member, to a first side of the shut-off valve 190, the other side of which, in the depicted implementation, dependently supports a hose nipple 191, or other suitable connector for fluid connection to the mixed gas consumer 196.

As shown in FIGS. 2A and 2B, the valve assembly 11 generally comprises a valve block 12, a fluid pressure operated valve controller 36, and an interface operably coupling the valve controller 36 to the valve block 12. In the exemplary implementation as shown and described, the valve block 12 comprises a cooperative arrangement of a first spool valve 13, a second spool valve 24, and portions of the fluid pressure operated valve controller 36 itself. Those of ordinary skill in the art will recognize, however, especially in light of the detailed discussions to follow, that the valve block 12 may be implemented in any number of forms, including, with advances in such technologies as additive manufacturing, as a unitary body. Likewise, although the exemplary interface operably coupling the valve controller 36 to the valve block 12 comprises a first push plate 127 and a second push plate 134, those of ordinary skill in the art will recognize that the implemented interface will depend largely at least on the actual implementation of the valve block 12.

Figure 4A:
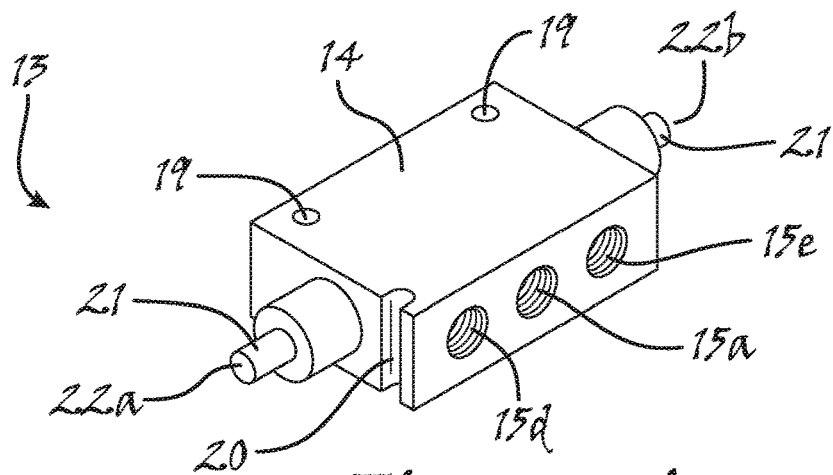
FIGS. 4A through 4C show, in isometric views, various aspects of a first spool valve, forming in part an exemplary implementation of a valve block for the valve assembly according to the present invention, and where FIG. 4C also shows details of a mating face specially adapted for coupling the first spool valve to a first mating face of a valve controller body.
Figure 4B:
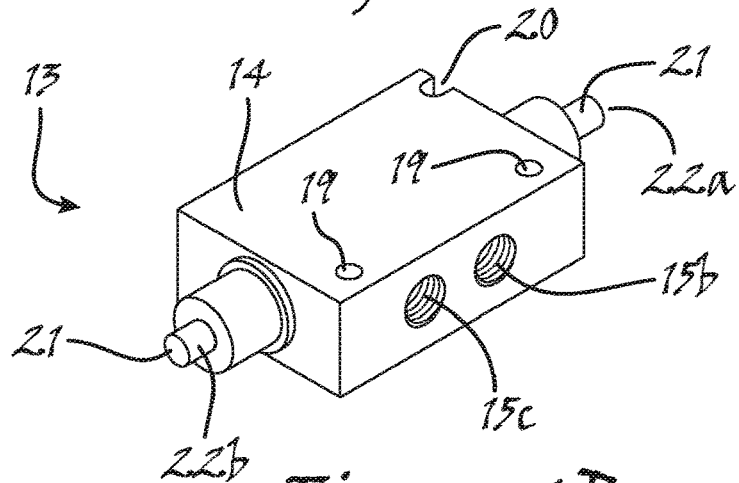
Figure 4C:
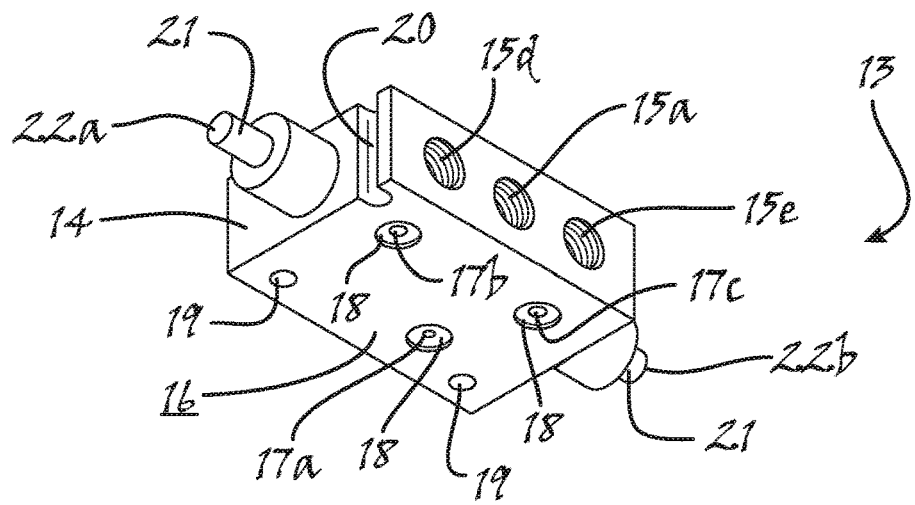
Figure 5A:
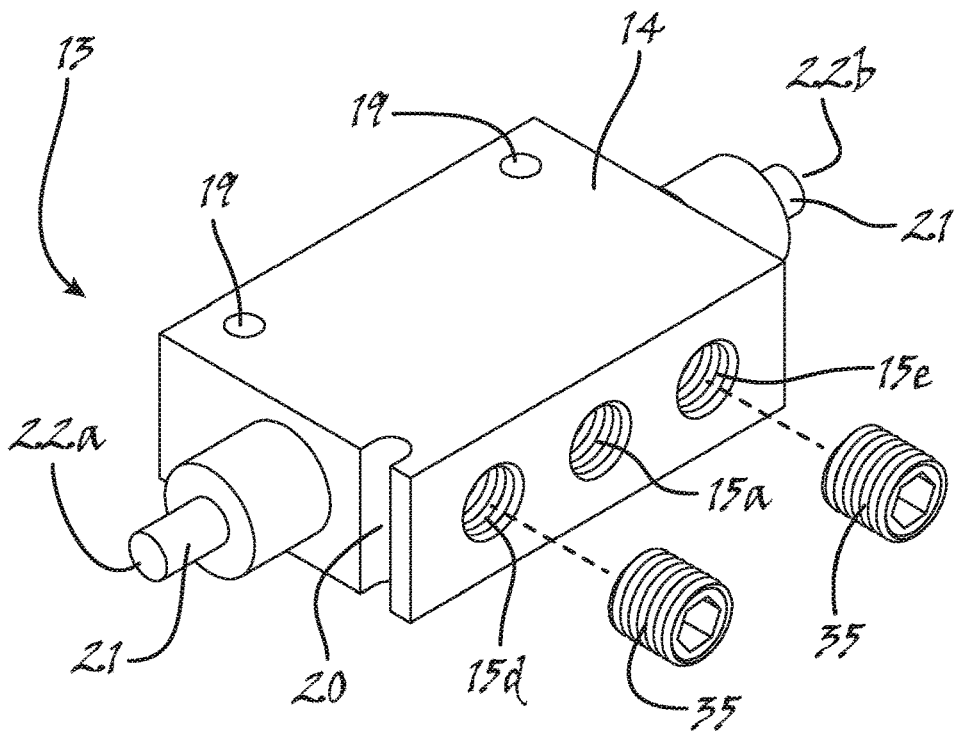
FIGS. 5A and 5B show, in an exploded isometric view and an isometric view, respectively, details of the configuration of the first spool valve in preparation for integration into the valve assembly.
Figure 5B:
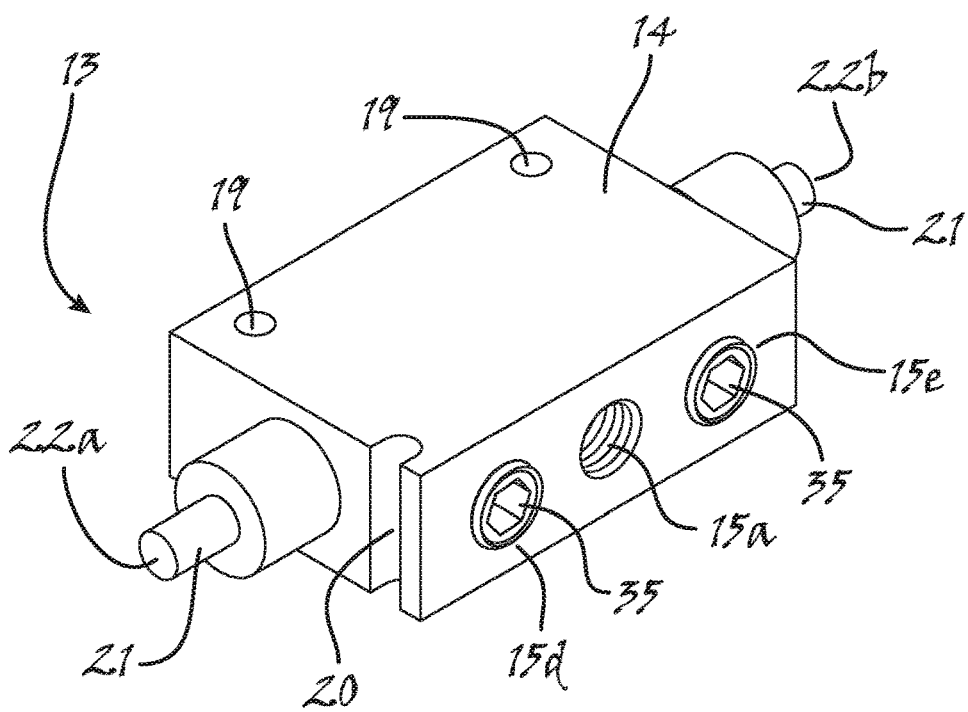

Referring now to FIGS. 4A, 4B and 4C, the first spool valve 13 of the present invention is shown to generally comprise a valve body 14 and a valve actuator 21. Although other implementations are readily possible, Applicant has found it convenient to implement the first spool valve 13 by modifying a well-known commercially available spool valve. In particular, the first spool valve 13 is implemented by modifying the well-known model FV-5DP five port four-way spool valve as is readily commercially available from Clippard Instrument Laboratory, Inc. In any case, as shown in the figures, the valve body 14 includes a plurality of valve ports. As implemented in the valve assembly 11 of the present invention, a port 15a provides an inlet for the first gas, a port 15b provides fluid communication between the first spool valve 13 and the first canister 145, and a port 15c provides fluid communication between the spool valve 13 and the third canister 152. A port 15d and a port 15e are also provided, but as shown in FIGS. 5A and 5B, are each blocked with a plug 35.

In a first modification according to the present invention of the first spool valve 13, a plurality of ducts are provided on a substantially planar mating face 16, which, as will be better understood further herein, is used for coupling the valve body 14 to a first substantially planar face 68 of a body 37 forming a part of the valve controller 36. The a duct 17a is in fluid communication within the valve body 14 with port 15c, a duct 17b is in fluid communication within the valve body 14 with port 15d, and a duct 17c is in fluid communication within the valve body 14 with port 15e. As previously noted, port 15d and port 15e are each blocked with plugs 35. To this end, it is preferred that the threading for at least port 15d and port 15e and, correspondingly, for the plugs 35, is NPT or like tapered threads, thereby ensuring that the plugs 35 may be sealingly engaged within the ports 15d, 15e without causing an internal obstruction of the ducts 17b, 17c.

In order to facilitate coupling the valve body 14 to the first face 68 of the controller body 37, and as will be better understood further herein, each provided duct 17a, 17b, 17b is formed within a counterbore 18 in the mating face 16 of the valve body 14. In this manner, as also will be better understood further herein, recesses are formed in the mounting face 16 about the ducts 17a, 17b, 17b for accommodating interbody seals 142, such as O-rings or substantially equivalent means. Additionally, as also shown in the figures, the valve body 14 is further modified in accordance with the present invention by the provision of a plurality of mounting holes 19 and a mounting recess 20, each of which is used in the coupling of the valve body 14 to the first face 68 of the controller body 37.

Figure 6A:
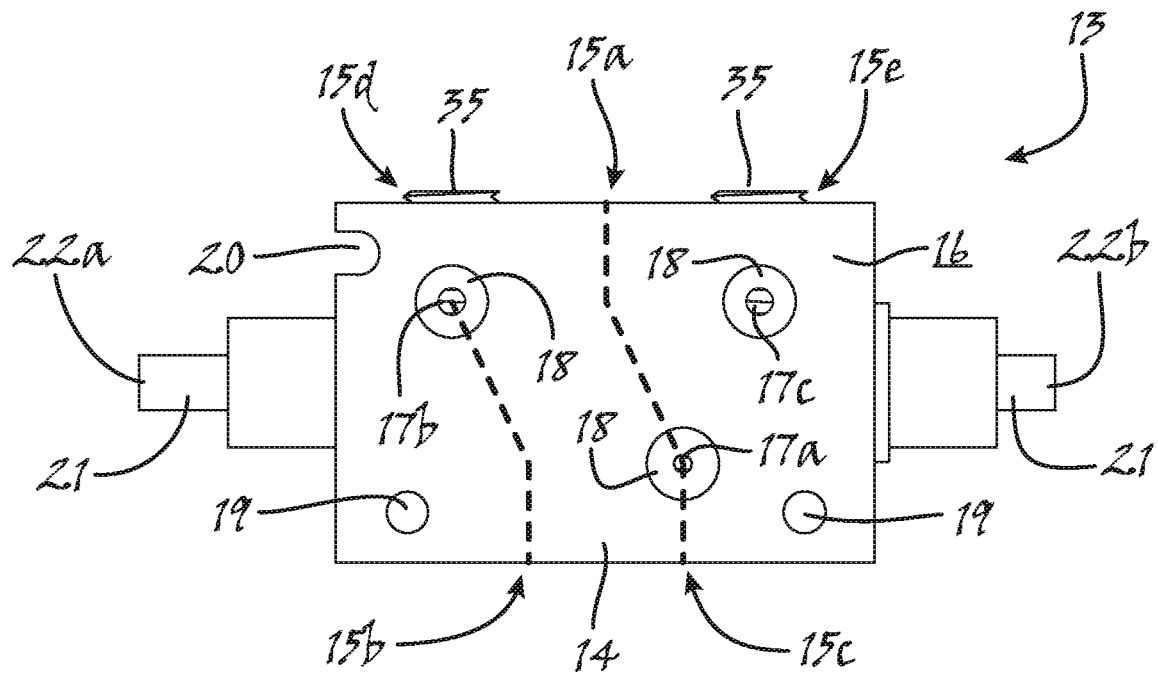
FIG. 6A shows, in an annotated plan view, the fluid flow through the first spool valve, as the first spool valve is in a first operable state corresponding to the first operable state of the valve assembly.
Figure 6B:
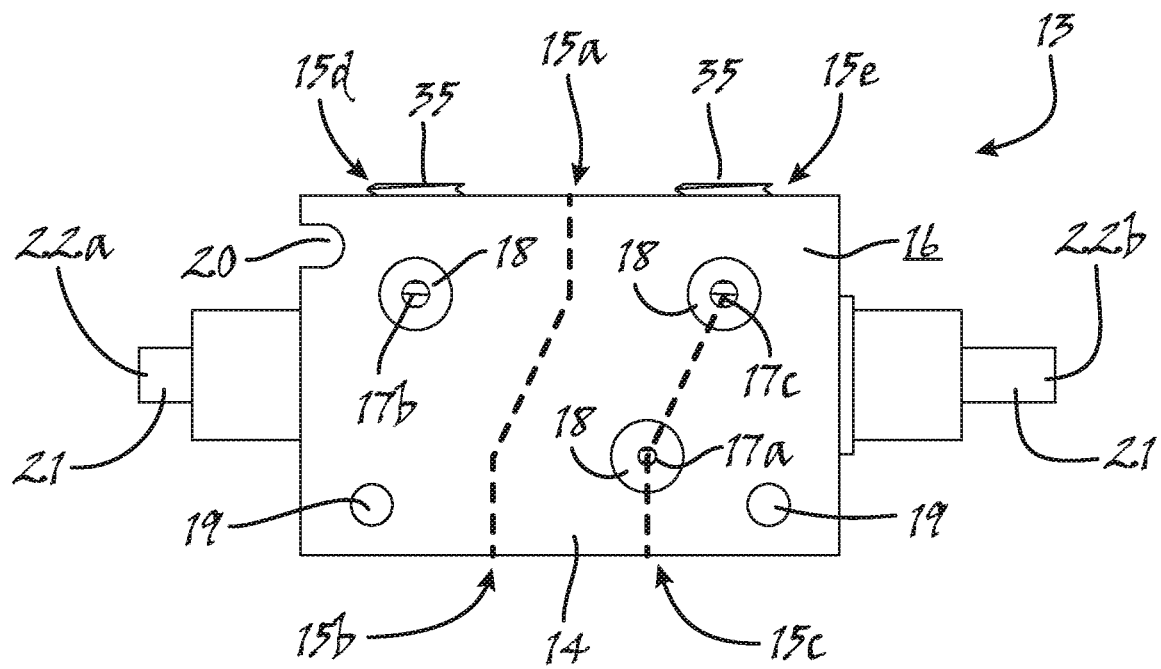
FIG. 6B shows, in an annotated plan view, the fluid flow through the first spool valve, as the first spool valve is in a second operable state corresponding to the second operable state of the valve assembly.

Valve actuator 21, which in the exemplary described implementation comprises a manually operated spool stem, has a first operable position as depicted in FIG. 6A, and a second operable position as shown in FIG. 6B. As shown in the figures, the first end 22a of the valve actuator 21 is maximally extended from the valve body 14 when the valve actuator 21 is in the first operable position, which corresponds to the first operable state of the valve assembly 11. Likewise, and as also shown in the figures, the second end 22b of the valve actuator 21 is maximally extended from the valve body 14 when the valve actuator 21 is in the second operable position, which corresponds to the second operable state of the valve assembly 11.

As shown in FIG. 6A, when the valve actuator 21 of the first spool valve 13 is in the first operable position, fluid flow through the first spool valve 13 is established between port 15a and port 15c, as well as duct 17a. Additionally, fluid flow is established between port 15b and duct 17b when the valve actuator 21 is in the first operable position. As shown in FIG. 6B, when the valve actuator 21 of the first spool valve 13 is in the second operable position, fluid flow through the first spool valve 13 is established between port 15a and port 15b. Finally, when the valve actuator 21 is in the second operable position fluid flow through the first spool valve 13 is established between port 15c and both duct 17a and duct 17c.

Figure 7A:
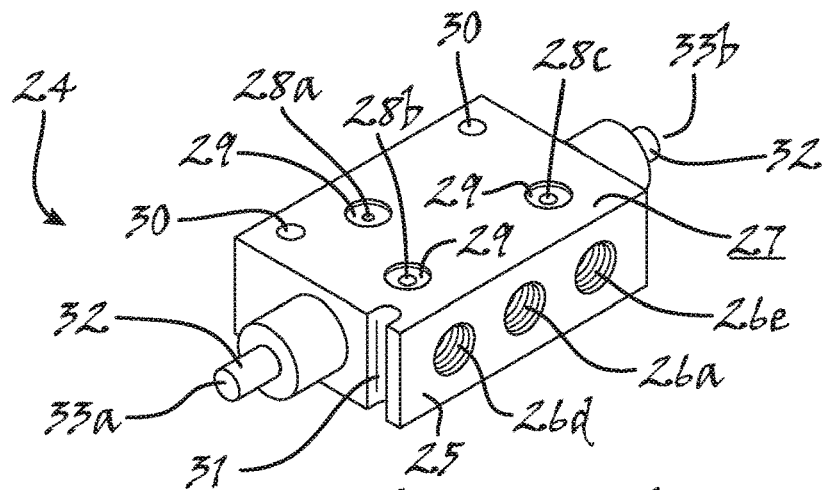
FIGS. 7A through 7C show, in isometric views, various aspects of a second spool valve, forming in part the exemplary implementation of the valve block for the valve assembly according to the present invention, and where FIGS. 7A and 7B also show details of a mating face specially adapted for coupling the second spool valve to a second mating face of the valve controller body.
Figure 7B:
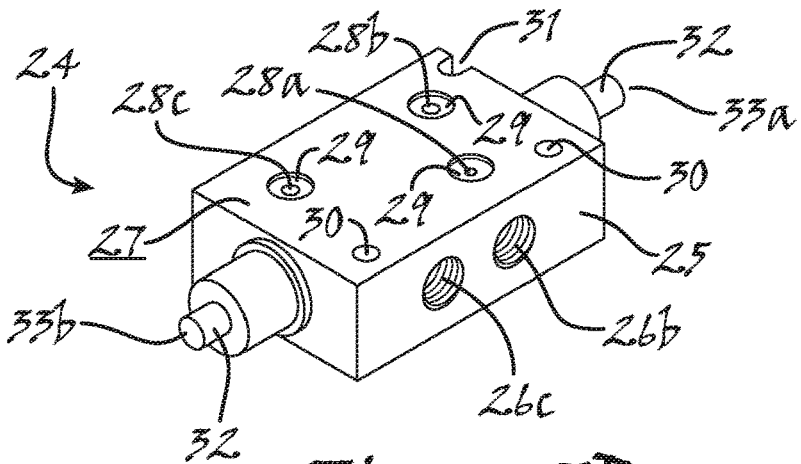
Figure 7C:
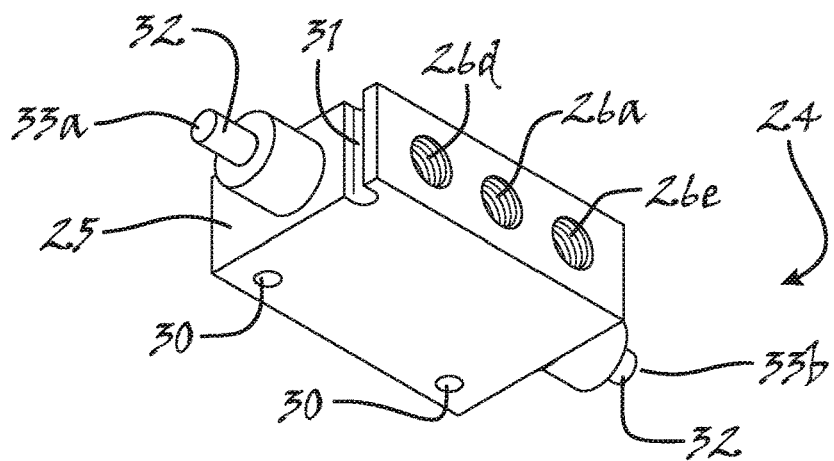
Figure 8A:
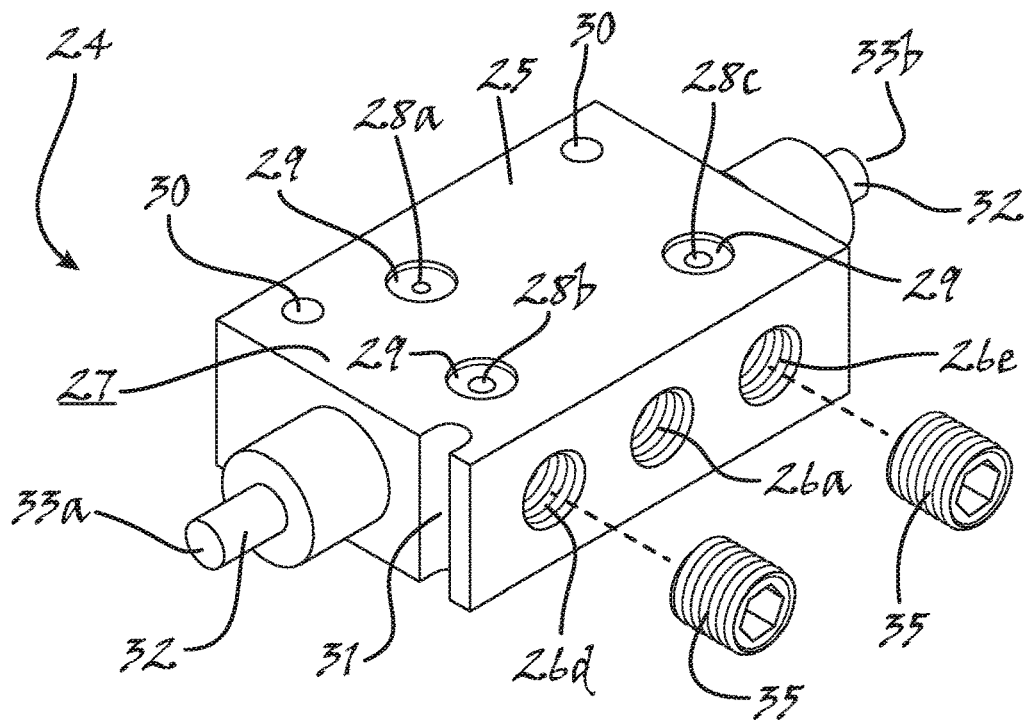
FIGS. 8A and 8B show, in an exploded isometric view and an isometric view, respectively, details of the configuration of the second spool valve in preparation for integration into the valve assembly.
Figure 8B:
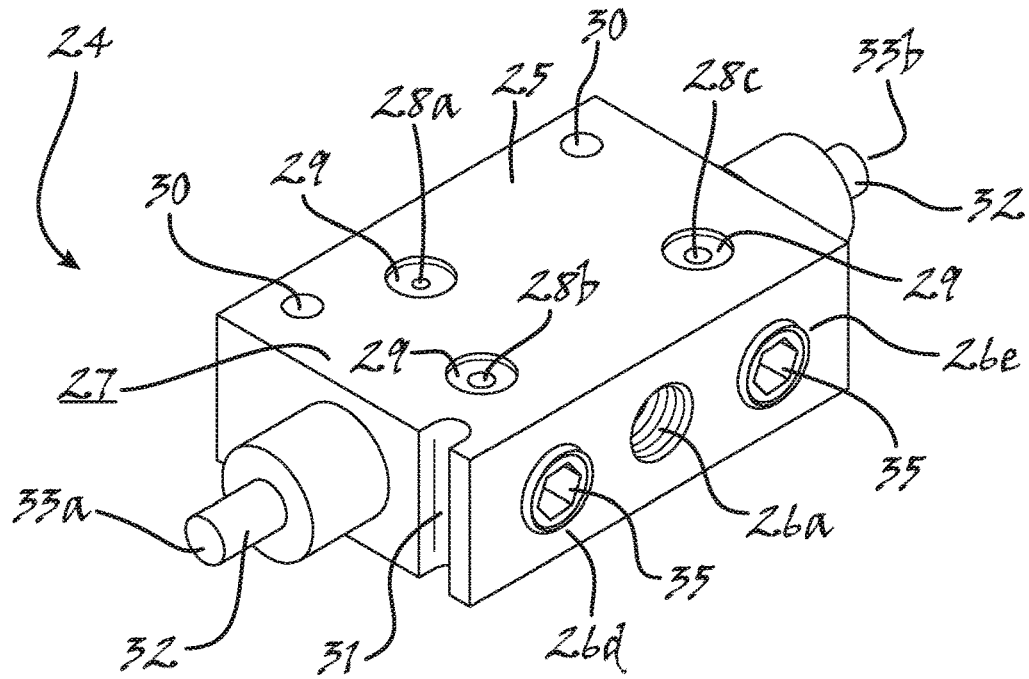

Referring now to FIGS. 7A, 7B and 7C, the second spool valve 24 of the present invention is shown to generally comprise a valve body 25 and a valve actuator 32. As with the first spool valve 13, Applicant has found it convenient to implement the second spool valve 24 by making slightly different modifications to the well-known model FV-5DP five port four-way spool valve as is readily commercially available from Clippard Instrument Laboratory, Inc. In any case, as shown in the figures, the valve body 25 includes a plurality of valve ports. As implemented in the valve assembly 11 of the present invention, a port 26a provides an inlet for the second gas, a port 26b provides fluid communication between the second spool valve 24 and the second canister 148, and a port 26c provides fluid communication between the spool valve 24 and the fourth canister 155. A port 26d and a port 26e are also provided, but as shown in FIGS. 8A and 8B, are each blocked with a plug 35.

In a first modification according to the present invention of the second spool valve 24, a plurality of ducts are provided on a substantially planar mating face 27, which, as will be better understood further herein, is used for coupling the valve body 25 to a second substantially planar face 71 of the body 37 forming a part of the valve controller 36. In particular, a duct 28a is in fluid communication within the valve body 25 with port 26b, a duct 28b is in fluid communication within the valve body 14 with port 26d, and a duct 28c is in fluid communication within the valve body 14 with port 26e. As previously noted, port 26d and port 26e are each blocked with plugs 35. To this end, and as with the first spool valve 13, it is preferred that the threading for at least port 26d and port 26e and, correspondingly, for the plugs 35, is NPT or like tapered threads, thereby ensuring that the plugs 35 may be sealingly engaged within the ports 26d, 26e without causing an internal obstruction of the ducts 28b, 28c.

In order to facilitate coupling the valve body 25 to the second face 71 of the controller body 37, and as will be better understood further herein, each provided duct 28a, 28b, 28b is formed within a counterbore 29 in the mating face 27 of the valve body 25. In this manner, as also will be better understood further herein, recesses are formed in the mounting face 27 about the ducts 28a, 28b, 28b for accommodating interbody seals 142, such as O-rings or substantially equivalent means. Additionally, as also shown in the figures, the valve body 25 is further modified in accordance with the present invention by the provision of a plurality of mounting holes 30 and a mounting recess 31, each of which is used in the coupling of the valve body 25 to the second face 71 of the controller body 37.

Figure 9A:
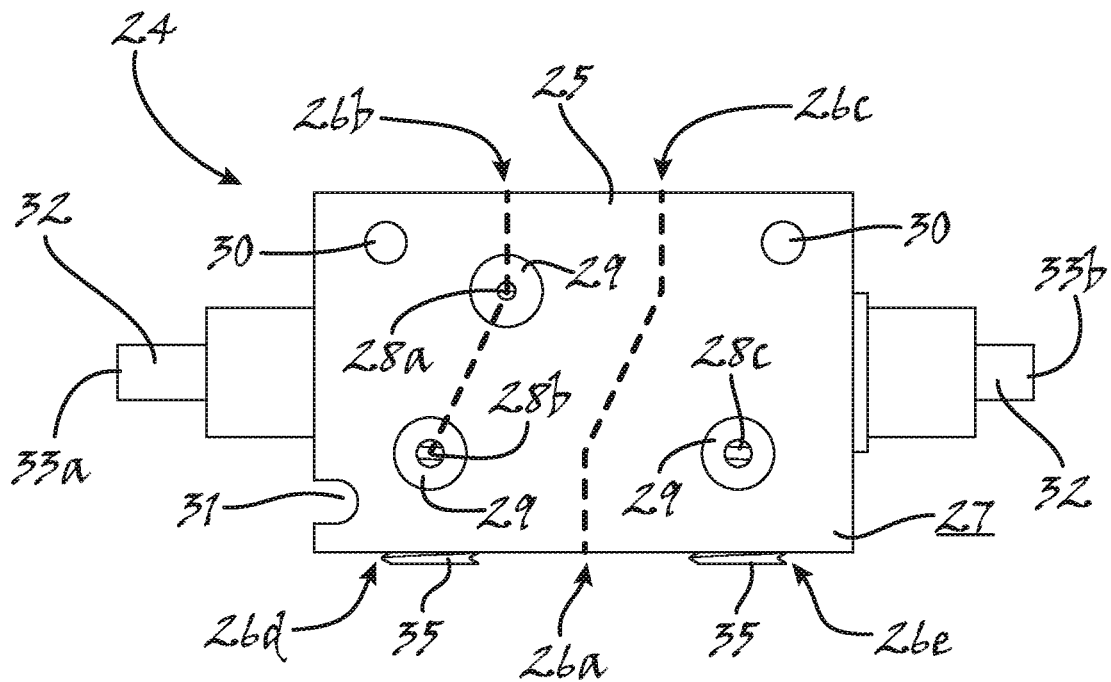
FIG. 9A shows, in an annotated plan view, the fluid flow through the second spool valve, as the second spool valve is in a first operable state corresponding to the first operable state of the valve assembly.
Figure 9B:
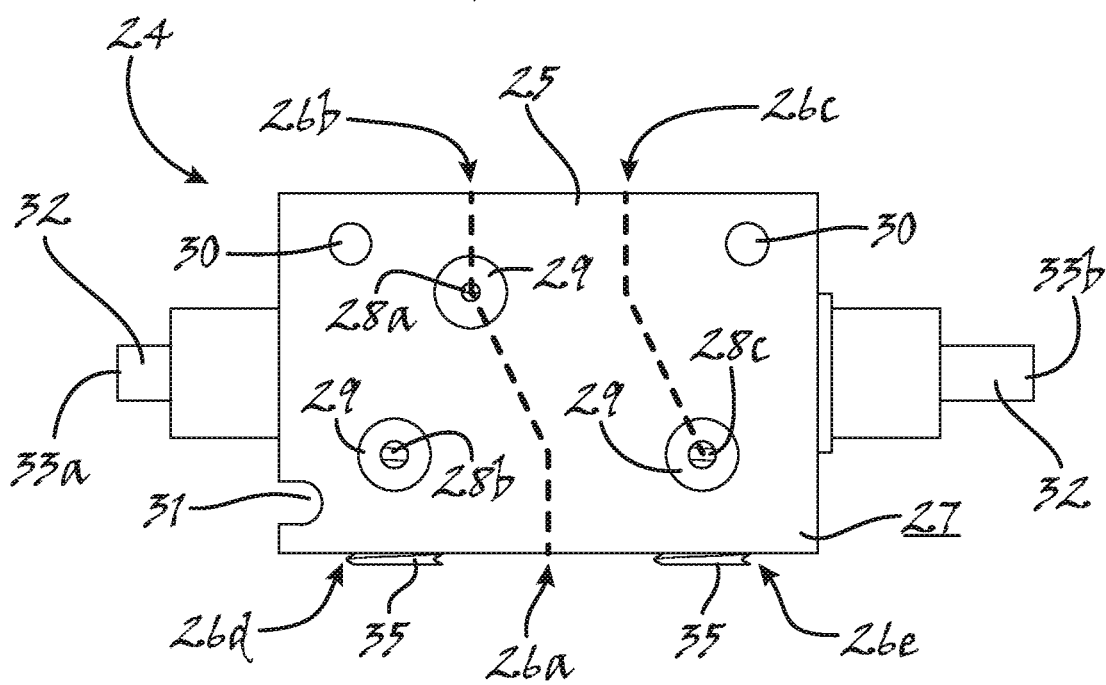
FIG. 9B shows, in an annotated plan view, the fluid flow through the second spool valve, as the second spool valve is in a second operable state corresponding to the second operable state of the valve assembly.

Valve actuator 32, which in the exemplary described implementation comprises a manually operated spool stem, has a first operable position as depicted in FIG. 9A, and a second operable position as depicted in FIG. 9B. As shown in the figures, the first end 33a of the valve actuator 32 is maximally extended from the valve body 25 when the valve actuator 32 is in the first operable position, which corresponds to the first operable state of the valve assembly 11. Likewise, and as also shown in the figures, the second end 33b of the valve actuator 32 is maximally extended from the valve body 25 when the valve actuator 32 is in the second operable position, which corresponds to the second operable state of the valve assembly 11.

As shown in FIG. 9A, when the valve actuator 32 of the second spool valve 24 is in the first operable position, fluid flow through the second spool valve 24 is established between port 26a and port 26c. Additionally, fluid flow is established between port 26b and both duct 28a and duct 28b when the valve actuator 32 is in the first operable position. As shown in FIG. 6B, when the valve actuator 32 of the first spool valve 24 is in the second operable position, fluid flow through the second spool valve 24 is established between port 26a and port 26b, as well as duct 28a. Finally, when the valve actuator 32 is in the second operable position, fluid flow through the second spool valve 24 is established between port 26c and duct 28c.

As will be better understood further herein, the fluid pressure operated valve controller 36, as implemented according to the preferred embodiments of the present inventions, generally comprises a body 37 and a shift rod assembly 74. As shown in FIGS. 10A through 10E, the body 37 of the valve controller 36 generally comprises a rectilinear block. As particularly shown in FIG. 10A, the body 37 comprises a first substantially planar face 68, which couples with the mating face 16 of the valve body 14 of the first spool valve 13. Likewise, and as particularly shown in FIG. 10B, the body 37 also comprises a second substantially planar face 71, which couples with the mating face 27 of the valve body 25 of the second spool valve 24.

Figure 11:
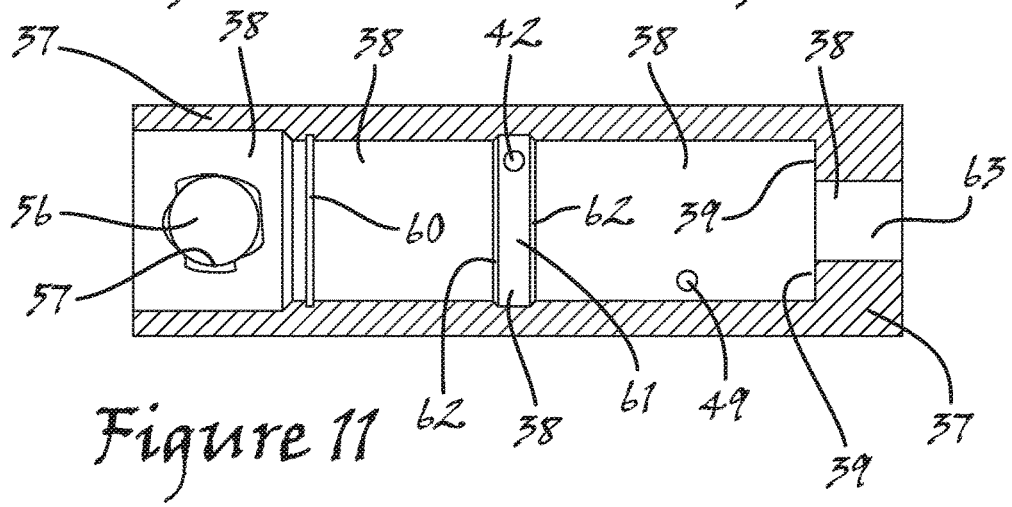
FIG. 11 shows, in a cross-sectional view through cut line 11-11 of FIG. 10C, various internal details of the valve controller body of FIG. 10A, including, in particular, details of inner walls forming among other features a piston chamber, a detent cavity, and a shift rod guide.

Additionally, a plurality of inner walls 38 form a number of internal structures of the body 37, which are generally aligned along a first, longitudinal, axis X. In particular, FIG. 11, which is a cross-sectional view through axis X of the valve controller body 37, shows the profile of the various internal structures formed, or defined, by the inner walls 38 of the body 37. In accordance with the exemplary described implementation, each of the defined internal structures comprises a substantially circular transverse cross-section centered on axis X, and which cross-sections increase or decrease in diameter according to the longitudinal profile. Those of ordinary skill in the art will recognize, however, that with an increase in complexity it is at least possible to implement much of the teachings of the present inventions with other cross-sectional shapes. In any case, as shown in FIG. 11, the internal structures defined by the inner walls 38 of the body 37 include at least a piston chamber 40, a detent cavity 55 and a shift rod guide 63, each of which will be better understood further herein. Likewise, the most preferred implementations of the present inventions also contemplate the provision of a circumferential snap ring groove 60, and a circumferential recess 61 about a port 42 into the piston chamber 40, each of which will also be better understood further herein.

Figure 10A:
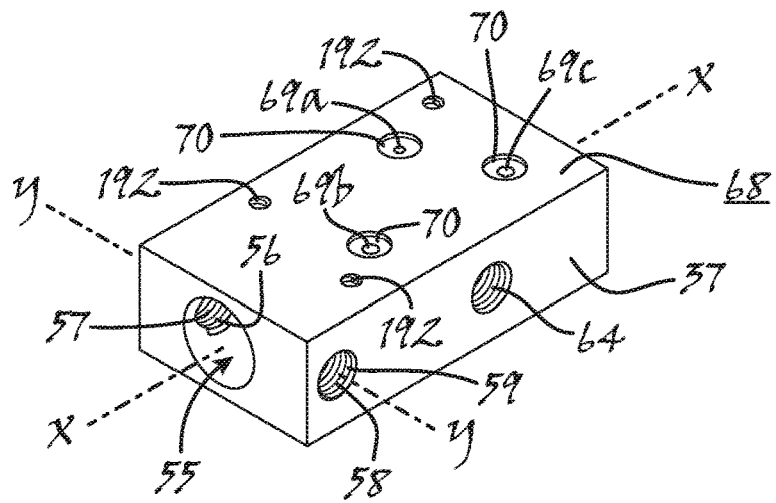
FIG. 10A shows, in an isometric view, various details of the valve controller body forming a part of an exemplary fluid pressure operated valve controller for the valve assembly of the present invention, and also forms, in part, the exemplary implementation of the valve block for the valve assembly, including particular details of the first mating face for coupling of the first spool valve.
Figure 10B:
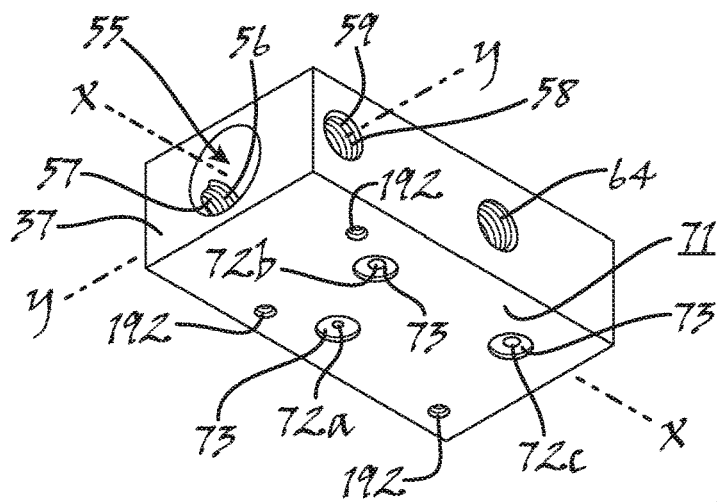
FIG. 10B shows, in an isometric view, various details of the valve controller body of FIG. 10A, including particular details of the second mating face for coupling of the second spool valve.
Figure 10C:
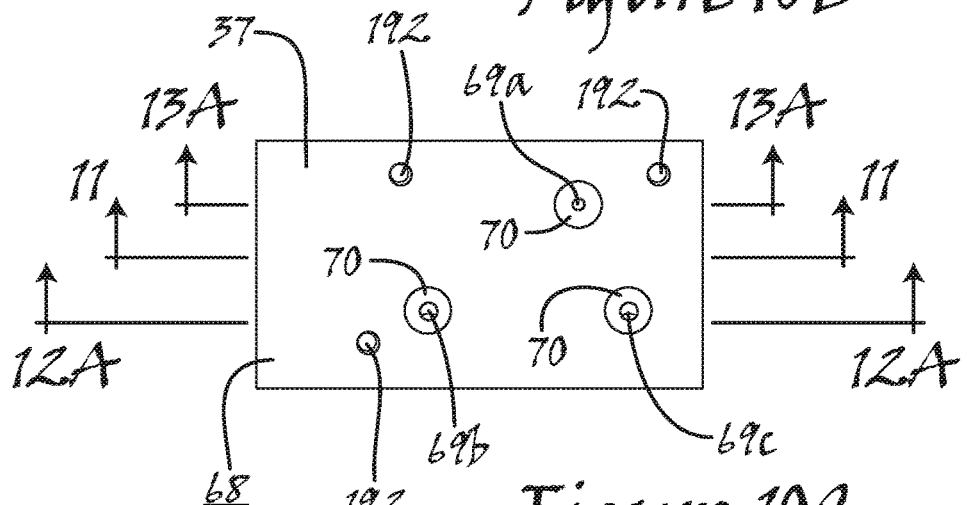
FIG. 10C shows, in a plan view aligned to the first mating face, the valve controller body of FIG. 10A.
Figure 10D:
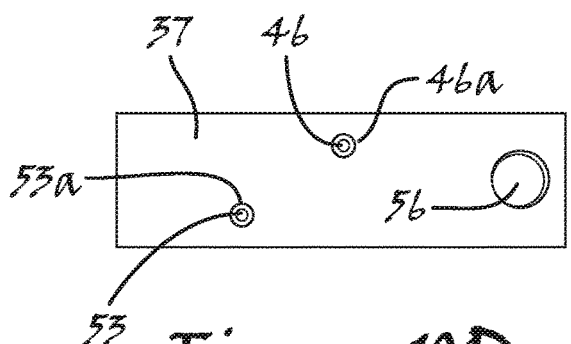
FIGS. 10D and 10E show, in elevational views, various details of the valve controller body of FIG. 10A.
Figure 10E:
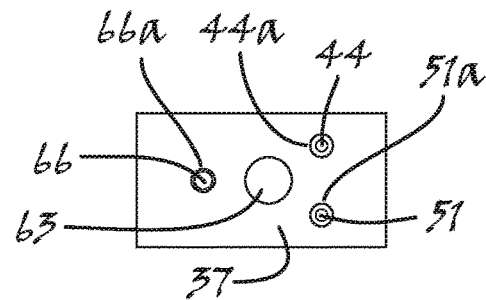
Figure 12A:
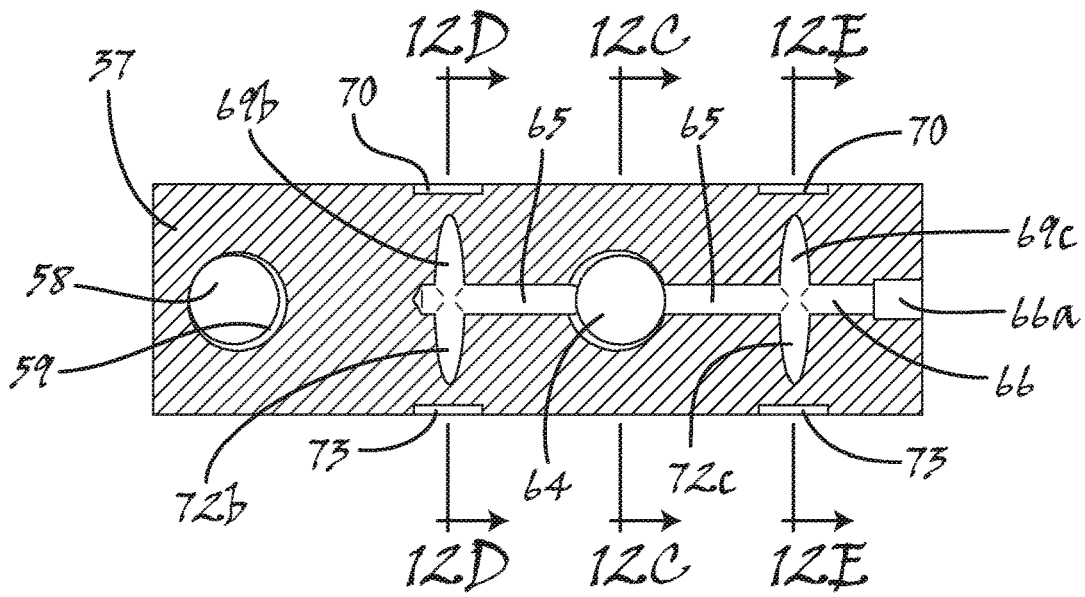
FIG. 12A shows, in a cross-sectional view through cut line 12A-12A of FIG. 10C, various internal details of the valve controller body of FIG. 10A, including, in particular, details of a gas mixing, or blending, manifold, and fluid communication through the valve controller body of gases flowing from the first and second spool valves en route an outlet port from the valve controller body.

Still further, and as shown in FIG. 12A, the controller body 37 also includes a gas blending, or mixing, manifold 65, as well as other operable structures described further herein, which structures are generally offset from axis X and defined other than by the inner walls 38. For example, as shown in FIGS. 10A and 10B, a first transverse bore 56 is provided in alignment with a second axis Y, which most preferably is transverse to the first, longitudinal, axis X. As will be better understood further herein, the first transverse bore 56, and optionally, but most preferably, a second transverse bore 58 run into the detent chamber 55 for use in cooperation with the shift rod assembly 74.

As particularly shown in FIG. 10A, the first substantially planar face 68 of the valve controller body 37 includes a duct 69a, which is provided to mate with corresponding duct 17a in the valve body mating face 16 of the first spool valve 13. In operation of the fully assembled valve assembly 11, duct 69a provides fluid communication of gases from duct 17a of the first spool valve 13 to a pressure port 42, which, as shown in FIG. 11, terminates in a first volume 41 of the piston chamber 40. Similarly, the first substantially planar face 68 of the controller body 37 also includes a duct 69b, which is provided to mate with corresponding duct 17b in the valve body mating face 16 of the first spool valve 13, and a duct 69c, which is provided to mate with corresponding duct 17c in the valve body mating face 16 of the first spool valve 13. In operation of the fully assembled valve assembly 11, duct 69b provides fluid communication of gases from duct 17b of the first spool valve 13 through the gas blending manifold 65 and to a mixed gas outlet port 64, as shown in FIG. 12A. Likewise, duct 69c provides fluid communication of gases from duct 17c of the first spool valve 13 through the gas blending manifold 65 and to the mixed gas outlet port 64. As with the mating face 16 of the valve body 14 of the first spool valve 13, the first face 68 of the valve controller body 37 includes counterbores 70 about each of the ducts 69a, 69b, 69c, each of which provides a recess about the corresponding duct 69a, 69b, 69c for receiving an interbody seal 142.

As particularly shown in FIG. 10B, the second substantially planar face 71 of the valve controller body 37 includes a duct 72a, which is provided to mate with corresponding duct 28a in the valve body mating face 27 of the second spool valve 24. In operation of the fully assembled valve assembly 11, duct 72a provides fluid communication of gases from duct 28a of the second spool valve 24 to a pressure port 49, which, as shown in FIG. 11, terminates in a second volume 48 of the piston chamber 40. Similarly, the first substantially planar face 71 of the controller body 37 also includes a duct 72b, which is provided to mate with corresponding duct 28b in the valve body mating face 27 of the second spool valve 24, and a duct 72c, which is provided to mate with corresponding duct 28c in the valve body mating face 27 of the second spool valve 24. In operation of the fully assembled valve assembly 11, duct 72b provides fluid communication of gases from duct 28b of the second spool valve 24 through the gas blending manifold 65 and to the mixed gas outlet port 64. Likewise, duct 72c provides fluid communication of gases from duct 28c of the first spool valve 24 through the gas blending manifold 65 and to the mixed gas outlet port 64. As with the mating face 27 of the valve body 25 of the first spool valve 24, the second face 71 of the valve controller body 37 includes counterbores 73 about each of the ducts 72a, 72b, 72c, each of which provides a recess about the corresponding duct 72a, 72b, 72c for receiving an interbody seal 142.

Figure 12B:
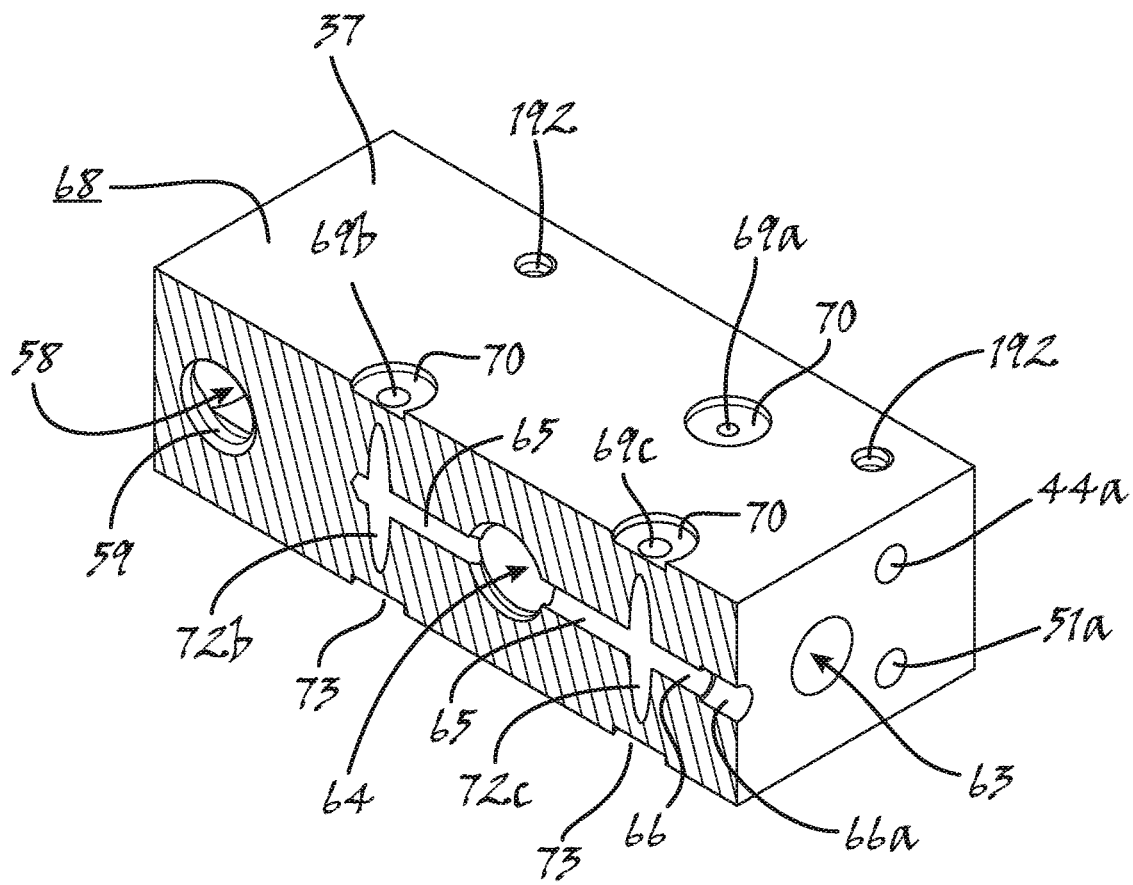
FIG. 12B shows, in an isometric view of the cross-sectional view of FIG. 12A, various additional details of the gas mixing manifold of FIG. 12A.
Figure 12C:
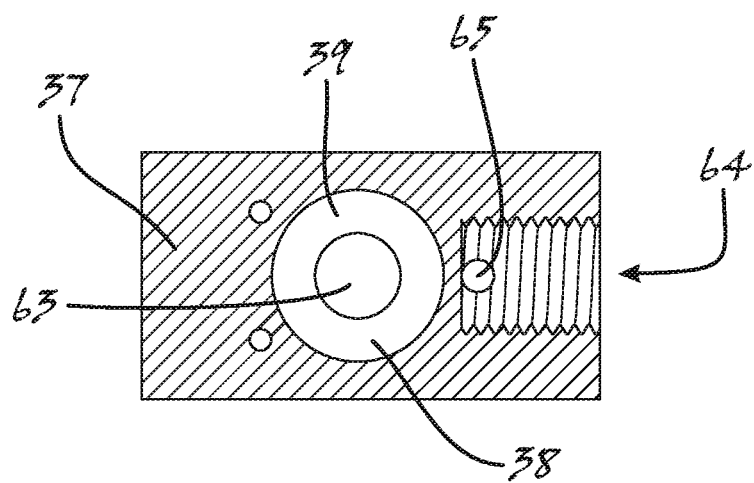
FIG. 12C shows, in a cross-sectional view through cut line 12C-12C of FIG. 12A, various details of the gas mixing manifold of FIG. 12A, as the gas mixing manifold intersects the outlet port from the valve controller body.
Figure 13B:
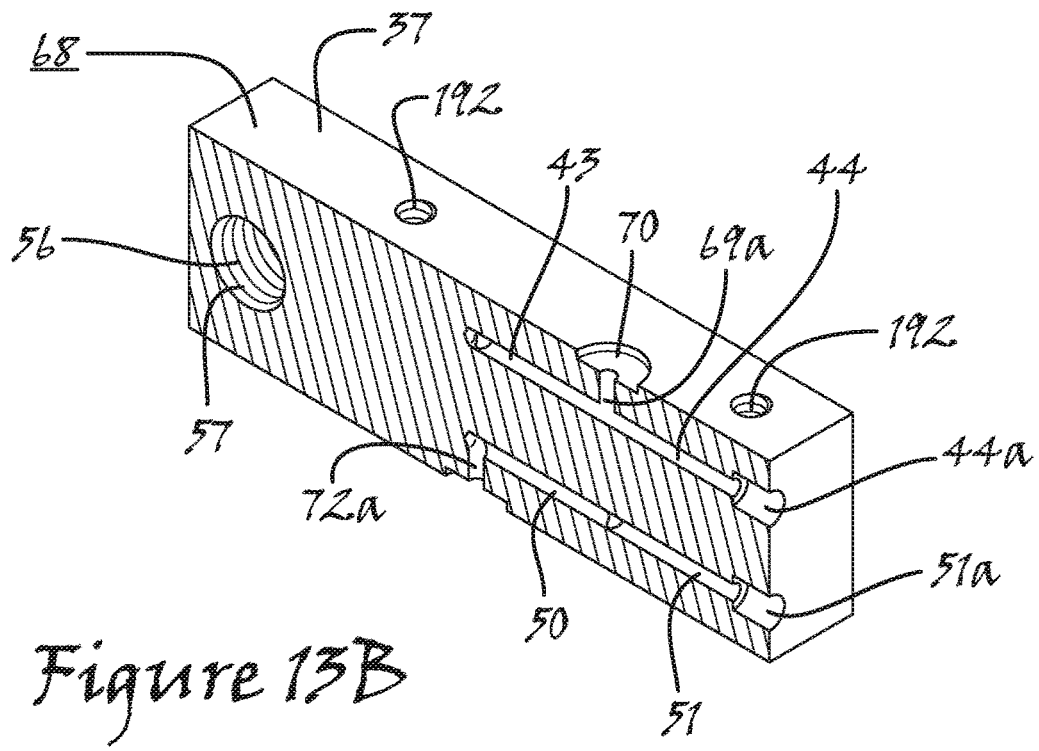
FIGS. 13B and 13C show, in isometric views of the cross-sectional view of FIG. 13A, various additional details of the first and second channels of FIG. 13A.
Figure 13C:
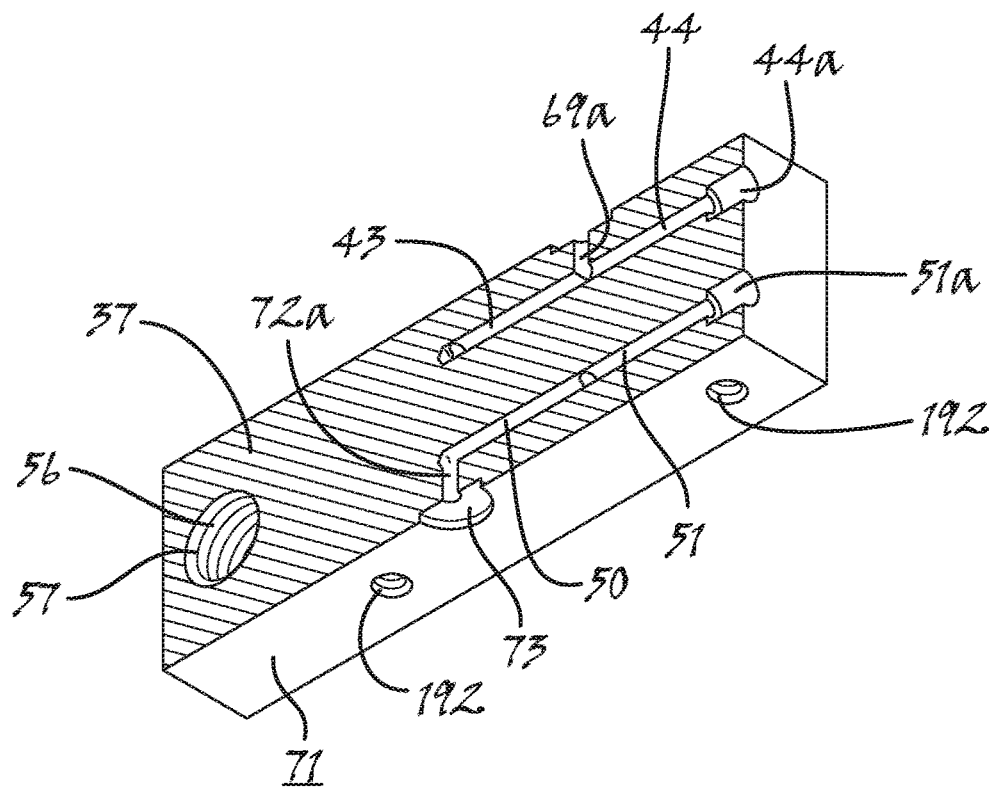

As shown in FIGS. 12A and 12B, the gas blending manifold 65 is readily formed by drilling, or otherwise providing, a longitudinal bore 66, which runs substantially parallel to axis X. As shown in the figures, the longitudinal bore 66 runs sufficiently long so as to intersect each of ducts 69b, 69c, 72b, and 72c as formed in the first and second faces 68, 71, respectively, of the valve controller body 37. Additionally, and as particularly shown in FIG. 12C, the longitudinal bore 66 forming the gas blending manifold 65 also intersects a portion of the transversely oriented mixed gas outlet port 64. As shown in the figures, the mixed gas outlet port 64 is provided with conventional threading to facilitate fluid communication with the mixed gas consumer 196, as previously described with reference to FIG. 1. In order to ensure that any interfacing tubular connector does not occlude or otherwise interfere with the gas blending manifold 65 as it passes through the mixed gas outlet port 64, it is most preferred that the threading for the mixed gas outlet port 64 comprises NPT or like tapered threads.

At this juncture, it is noted that the gas blending manifold 65, as formed in the valve controller body 37, cooperates with the first spool valve 13 and the second spool valve 24 to form an integral part of the valve block 12, but otherwise has no connection to the function per se of the fluid pressure operated valve controller 36. As a result, as particularly shown in FIGS. 12D and 12E, care is taken to ensure that the gas blending manifold 65 does not intersect those structures defined by the inner walls 38 of the valve controller body 37, which are generally arranged about the first, longitudinal, axis X. To this end, and as most clearly shown in FIGS. 12D and 12E, the gas blending manifold 65 is shown to be provided within the valve controller body 37 at a substantial lateral offset from the inner walls 38. In order to accommodate alignment with the ducts 17b and 17c in the valve mating face 16 of the first spool valve 13, the ducts 69b and 69c in the in the first face 68 of the valve controller body 37 must angle outward, as shown in FIGS. 12D and 12E, to intersect the gas blending manifold 65. Likewise, in order to accommodate alignment with ducts 28b and 28c in the valve mating face 27 of the second spool valve 24, the ducts 72b and 72c in the second face 71 of the valve controller body 37 must also angle outward, as shown in FIGS. 12D and 12E, to intersect the gas blending manifold 65.

As previously noted, duct 69a through the first face 68 of the valve controller body 37 provides fluid communication of gases to a first pressure port 42 terminating within the piston chamber 40. To this end, as particularly shown in FIGS. 13A, 13B and 13C, a channel 43 is provided to conduct the fluid flow through the valve controller body 37 from duct 69a to pressure port 42. As shown in FIGS. 13A through 13E, channel 43 is readily formed by drilling, or otherwise providing, a longitudinal bore 44 and a transverse bore 46. As shown in the figures, longitudinal bore 44 intersects the transverse bore 46, which terminates in the piston chamber 40 to form the first pressure port 42. As will be better understood further herein, the transverse bore 46 locates the first pressure port 42 within a first volume 41 of the piston chamber 40.

As also previously noted, duct 72a through the second face 71 of the valve controller body 37 provides fluid communication of gases to a second pressure port 49 terminating within the piston chamber 40. To this end, as particularly shown in FIGS. 13A, 13B and 13C, a channel 50 is provided to conduct the fluid flow through the valve controller body 37 from duct 72a to pressure port 49. As shown in FIGS. 13A through 13E, channel 50 is readily formed by drilling, or otherwise providing, a longitudinal bore 51 and a transverse bore 53. As shown in the figures, longitudinal bore 51 intersects the transverse bore 53, which terminates in the piston chamber 40 to form the second pressure port 49. As will be better understood further herein, the transverse bore 53 locates the second pressure port 49 within a second volume 48 of the piston chamber 40.

In order to make use of valve controller body 37 as heretofore described, the various construction bores as provided to ease manufacturability must be closed to operably isolate the gas blending manifold 65 and the channels 43, 50 providing fluid communication to the pressure ports 42, 49, respectively. Although other, alternative means will be apparent to those of ordinary skill in the art, Applicant has found it convenient and effective to mechanically plug each bore. To this end, plugs such as may comprise steel or like material pins sized to fit tightly within a corresponding bore are mechanically inserted into the end of each bore to be capped. In order to provide additional integrity, a sealing compound, as well-known in the relevant arts, may also be applied about the inserted pins. To facilitate sealing, and accommodate any sealant material, each bore is preferably provided with a counterbore.

As depicted in FIGS. 14A through 14D, a plug 67 is placed in the end, and in a counterbore 66a formed in the end, of the longitudinal bore 66 for the gas blending manifold 65; a plug 45 is placed in the end, and in a counterbore 44a formed in the end, of the longitudinal bore 44 for the channel 43 for the first pressure port 42; a plug 47 is placed in the end, and in a counterbore 46a formed in the end, of the transverse bore 46 for the channel 43 for the first pressure port 42; a plug 52 is placed in the end, and in a counterbore 51a formed in the end, of the longitudinal bore 51 for the channel 50 for the second pressure port 49; and a plug 54 is placed in the end, and in a counterbore 53a formed in the end, of the transverse bore 53 for the channel 50 for the second pressure port 49. While simple and effective, it is nonetheless noted that those of ordinary skill in the art will also recognize other alternative means, such as, for example, additive manufacturing, for providing the required gas blending manifold 65 and the channels 43, 50 providing fluid communication to the pressure ports 42, 49, respectively, which means may not require "plugging" or the like. In any case, all such implementations should be considered within the scope of the present inventions.

As previously noted, the fluid pressure operated valve controller 36 of the present inventions includes a shift rod assembly 74, in addition to the valve controller body 37. As shown in FIG. 15, the shift rod assembly 74 generally comprises a shift rod 75, as also detailed in FIG. 16, and a plurality of components dependently supported on the shift rod 75. As will be better understood further herein, the shift rod 75, and the components dependently supported thereon, cooperatively adapt the shift rod assembly 74 such that when the shift rod assembly 74 is operably engaged within the inner walls 38 of the valve controller body 37, the longitudinal axis through the shift rod 75 is collinear with the longitudinal axis X through the valve controller body 37.

Figure 16:
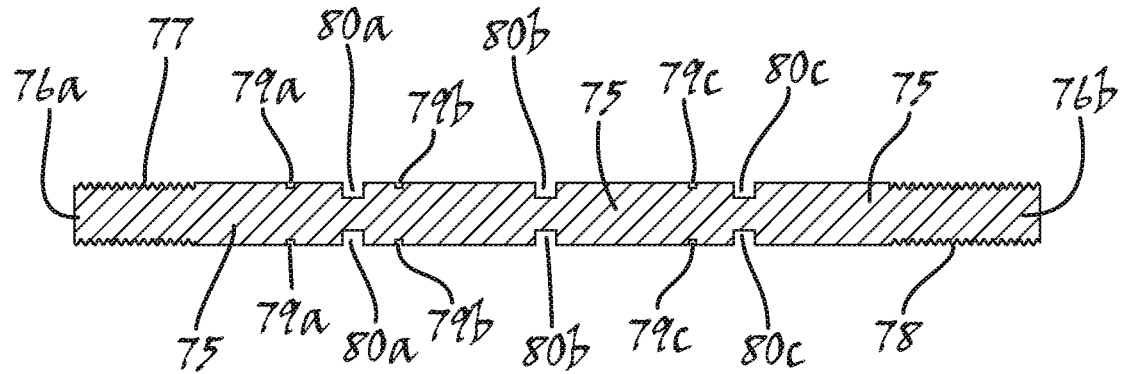
FIG. 16 shows, in a cross-sectional view through its longitudinal axis, various details of the shift rod, as forms an integral part of the shift rod assembly of FIG. 15.

As particularly shown in FIGS. 15 and 16, the shift rod 75 comprises a plurality of circumferential grooves, each of which is adapted to dependently support, as well as to longitudinally position, various of the components dependently supported on or about the shift rod 75. In particular, as shown in the figures, a plurality of snap ring grooves 79a, 79b, 79c is provided, each of which is sized and shaped to receive an external snap ring and to fix the received snap ring substantially in place about the shift rod 75. Likewise a plurality of O-ring grooves 80a, 80b, 80c is provided, each of which is sized and shaped to receive an O-ring and to fix the received O-ring substantially in place about the shift rod 75. Additionally, threading 77 is provided about the first end 76a of the shift rod 75, and threading 78 is provided about the second end 76b of the shift rod 75. As will be better understood further herein, the threading 77 about the first end 76a of the shift rod 75 and the threading 78 about the second end 76b of the shift rod 75 preferably comprise straight, or parallel, threads to accommodate, or otherwise enable, full adjustability of components as operably positioned in cooperation with the threading 77, 78.

As shown in FIG. 15, the shift rod assembly 74 comprises a plurality of specially formed components, including a shift rod stop member 108, a first, floating, seal member 82, and a floating piston 94. As detailed in FIG. 15, but also shown in FIG. 21B, the shift rod stop member 108 generally comprises a generally cylindrical body 109, which has a plurality of features specially formed thereon. In particular, and as will be better understood further herein, the shift rod stop member 108 includes a first circumferential groove 110, provided about the outer cylindrical surface 195 of the body 109, and a second circumferential groove 111, also provided about the outer cylindrical surface 195 of the body 109. As will be better understood further herein, the face of the first circumferential groove 110 is formed in the shape of a circular arc, most preferably a semicircle, as best shown in FIG. 21B. As also will be better understood further herein, the second circumferential groove 111 is substantially the same shape as the first circumferential groove 110, and is longitudinally spaced from the first circumferential groove 110 such that the distance between the central plane through the second circumferential groove 111 and the central plane through the first circumferential groove 110 is equal to the distance that the shift rod 75 translates as the fluid operated valve controller switches between a first operable state and a second operable state. Additionally, the shift rod stop member 108 comprises a longitudinally oriented central bore 112 through the body 109, which is sized to conform about the shift rod 75. Still further, the shift rod stop member 108 comprises a substantially planar first outer face 113, and also includes an inner end 114.

Figure 19:
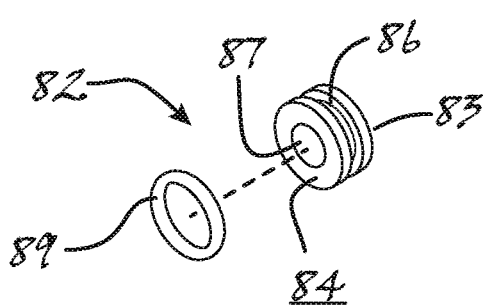
FIG. 19 shows, in an exploded isometric view, various details of a first, floating, seal member, as forms an integral part of the shift rod assembly of FIG. 15.
Figure 20:
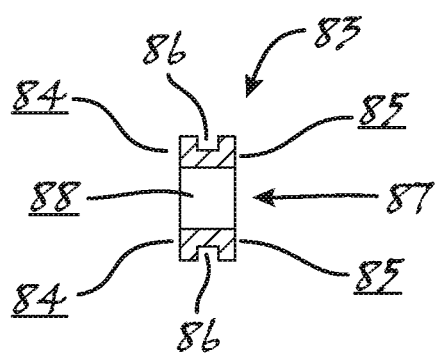
FIG. 20 shows, in a cross-sectional view through its longitudinal axis, various details of a body, as provided in implementation of the seal member of FIG. 19.

As particularly shown in FIGS. 15, 19 and 20, the first, floating, seal member 82 comprises a generally disc-shaped body 83 and an O-ring 89 or like sealing member. As particularly shown in FIGS. 19 and 20, the generally disc-shaped body 83 comprises a first face 84, a second face 85, and a circumferential groove 86 formed about the outside edge of the disc-shaped body 83. Additionally, the generally disc-shaped body 83 includes a longitudinally oriented central bore 87, which has an interior face 88 generally conforming to the size of the shift rod 75. As shown in FIGS. 15 and 19, the O-ring 89 is sized and shaped to fit conformingly into the circumferential groove 86 about the outside edge of the disc-shaped body 83.

Figure 17:
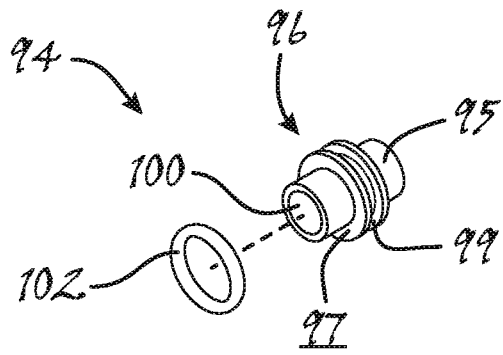
FIG. 17 shows, in an exploded isometric view, various details of a floating piston, as forms an integral part of the shift rod assembly of FIG. 15.
Figure 18:
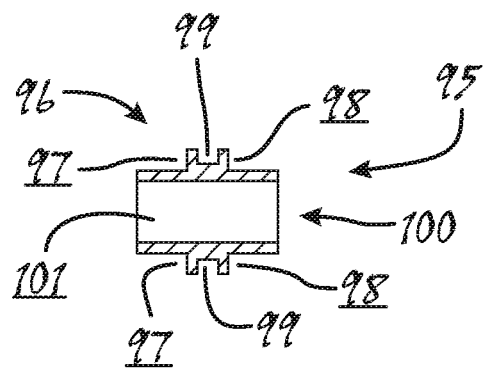
FIG. 18 shows, in a cross-sectional view through its longitudinal axis, various details of a body, as provided in implementation of the floating piston of FIG. 17.

As particularly shown in FIGS. 15, 17 and 18, the floating piston 94 comprises a generally cylindrical body 95 and an O-ring 102 or like sealing member. As best shown in FIGS. 17 and 18, the generally cylindrical body 95 includes an annular disc 96 formed about the mid-section of the cylindrical body 95, and a longitudinally oriented central bore 100 through the body 95. As with the floating seal member 82, the central bore 100 presents an interior face 101, which conforms about the shift rod 75. As also shown in the figures, the annular disc 96 about the generally cylindrical body 95 presents a first face 97 and a second face 98, and also includes a circumferential groove 99 formed about the outside edge of the disc 96. As shown in FIGS. 15 and 17, the O-ring 102 is sized and shaped to fit conformingly within the circumferential groove 99 about the annular disc 96 of the cylindrical body 95.

Additionally, and as shown in FIG. 15, the shift rod assembly 74 also comprises a number of otherwise conventional components, which, as will be better understood further herein, combine to form other functional elements of the shift rod assembly 74 and/or otherwise cooperate with other elements in operation of the shift rod assembly 74. In particular, a plurality of O-rings 193, 194, 107 function as fluid seals between the shift rod 75 and other elements of the shift rod assembly 74 dependently supported on or about the shift rod 75, or as a fluid seal between the shift rod 75 and the valve controller body 37. Similarly, external snap rings 81, 92, 106 fix various components longitudinally in place about the shift rod 75, and in some cases also cooperate with other components for the formation of a further functional elements. For example, as will be better understood further herein, internal snap ring 92 cooperates with a thrust washer 91 to form a first spring shoulder 90, while external snap ring 106 cooperates with a thrust washer 105 to provide a second spring shoulder 104. Finally a first piston spring 93 and a second piston spring 103 are provided in implementation of important aspects of the operation of the present inventions.

Referring now to FIGS. 15, 21A and 21B, details of the arrangement on and about the shift rod 75 of the other components of the shift rod assembly 74 are described. As shown in FIGS. 21A and 21B, the floating piston 94 is, in assembled state, arranged on the shift rod 75 between the first spring shoulder 90 and the second spring shoulder 104. As also shown in the figures, the floating piston 94 is, in the absence of any other forces, generally centered between the first spring shoulder 90 and the second spring shoulder 104 by the first piston spring 93 and the second piston spring 103, which most preferably are of substantially equivalent spring force.

In assembly of this portion of the shift rod assembly 74, O-ring 194 is first placed over and about the shift rod 75, and seated in place within the second O-ring groove 80b. With the O-ring 194 seated in place, the floating piston 94 is then placed over and about the shift rod 75 and the O-ring 194, as particularly shown in FIG. 21B. Although, as will be appreciated by those of ordinary skill in the art, the exact order of assembly is not generally critical so long as the described structural arrangement is obtained, in at least one order of assembly the first piston spring 93 is next placed over and about the first end 76a of the shift rod 75, and one end of the first piston spring 93 is abutted against the first face 97 of the annular disk 96 of the floating piston body 95. With the floating piston 94 and the first piston spring 93 in place as described, the first spring shoulder 90 is then assembled in place about the shift rod 75. In particular a thrust washer 91 is placed over and about the first end 76a of the shift rod 75, and then secured longitudinally in place along the shift rod 75 by affixing an external snap ring 92 within the second snap ring groove 79b, thereby fixing the thrust washer between the first piston spring 93 and the snap ring 92. To the extent that the first piston spring 93 is, while at rest, longer than the distance between the thrust washer 91 and the first face 97 of the floating piston body 95, as initially placed, it is noted that the foregoing step will generally cause the floating piston 94 to temporarily move toward the second end 76b of the shift rod 75, which is of no concern at this point.

In any case, integration of the floating piston assembly 94 into the shift rod assembly 74 continues with placement of the second piston spring 103 over and about the second end 76b of the shift rod 75, abutting one end of the second piston spring 103 against the second face 98 of the floating piston body 95. In completion of this stage of assembly, the second spring shoulder 104 is assembled in place about the shift rod 75. Unlike placement of the first piston spring 93 and the first spring shoulder 90, however, placement of the second spring shoulder 104 will generally require compression of both the first piston spring 93 and the second piston spring 103. In any case, and with the piston springs 93, 103 compressed as necessary, a thrust washer 105 is placed over and about the second end 76a of the shift rod 75, and used to hold the second end of the second piston spring 103 to the side of the third snap ring groove 79c while an external snap ring 106 is fixed in place within the third snap ring groove 79c about the shift rod 75. As particularly shown in FIG. 21B, with the cylindrical body 95 of the floating piston 94 operably positioned, the previously placed O-ring 194 serves to provide a fluid tight seal, within the fluid pressures expected in the operation of the present inventions, between the interior face 101 of the central bore 100 of the floating piston 94 and the shift rod 75.

With the floating piston 94 in place, as previously described, the first, floating, seal member 82 is then integrated into the shift rod assembly 74. As shown in FIGS. 21A and 21B, O-ring 193 is first placed over and about the first end 76a of the shift rod 75, and seated in place within the first O-ring groove 80a. With the O-ring 193 seated in place, the first seal member 82 is then placed over and about the first end 76a of the shift rod 75 and the O-ring 193, as particularly shown in FIG. 21B. As also particularly shown in FIG. 21B, with the first, floating, seal member 82 operably positioned, the previously placed O-ring 193 serves to provide a fluid tight seal, within the fluid pressures expected in the operation of the present inventions, between the interior face 88 of the central bore 87 of the first seal member 82 and the shift rod 75.

Finally, preparation of the shift rod assembly 74 for integration with the valve controller body 37 is completed by placement of an external snap ring 81 within the first snap ring groove 79a of the shift rod 75, and placement of an O-ring 107, or like seal, within the third O-ring groove 80c of the shift rod 75. As particularly shown in FIGS. 21A and 21B, the external snap ring 81 forms an inside stop for placement of the shift rod stop member 108. It is noted that the shift rod stop member 108 is not actually integrated with the shift rod assembly 74 until later in the integration of the shift rod assembly 74 with the valve controller body 37. When later placed, however, the shift rod stop member is placed over and about the first end 76a of the shift rod 75, and the inner end 114 of the stop member 108 abuts against snap ring 81, as shown in FIGS. 21A and 21B.

Figure 22A:
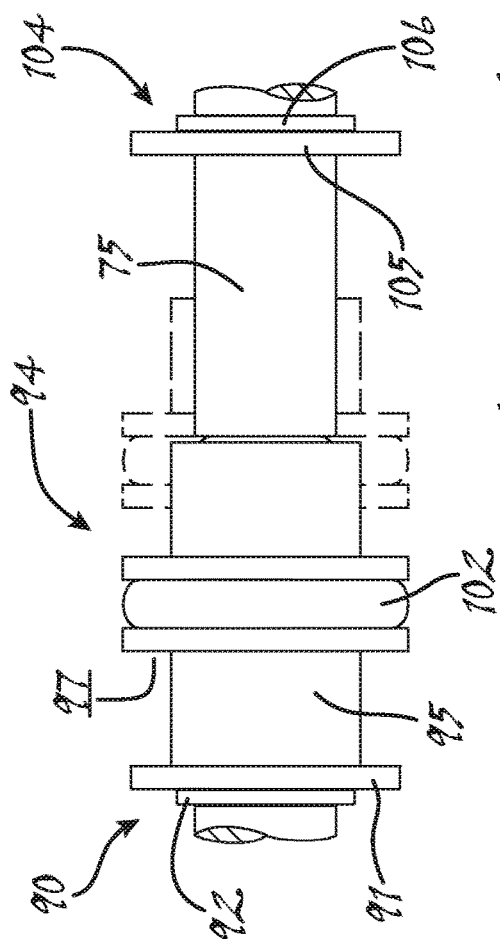
FIGS. 22A and 22B show, in partially phantom detail views taken from FIG. 21A and with the springs of FIG. 21A omitted, details of the unconstrained freedom of motion of the floating piston with respect to the shift rod.
Figure 22B:
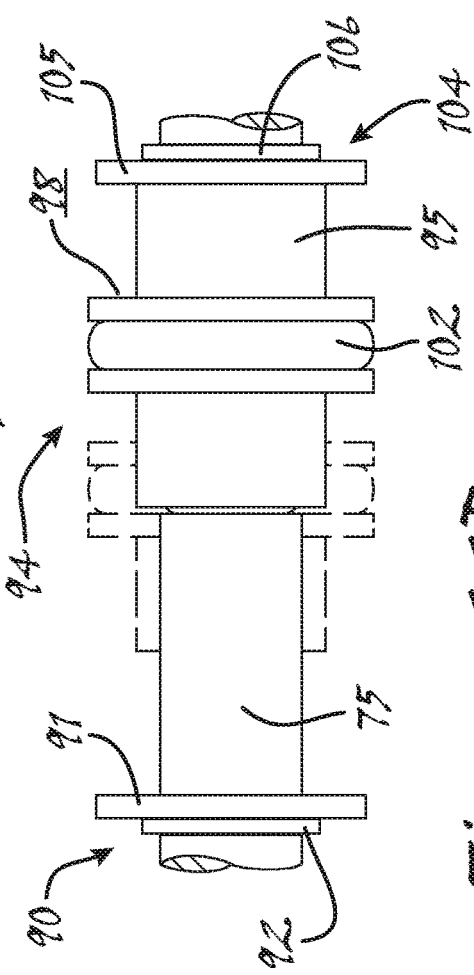

Referring now to FIGS. 22A and 22B, the unconstrained range of motion for the floating piston 94, with respect to the shift rod 75, is shown, and where in each of the figures the phantom line showing represents the position of the floating piston 94 as shown in FIG. 21A. As shown in FIG. 22A, the unconstrained floating piston 94 freely translates over and about the shift rod 75 in the direction of the first end 76a of the shift rod 75 until the body 95 of the floating piston 94 impacts the thrust washer 91 of the first spring shoulder 90. Likewise, as shown in FIG. 22B, the unconstrained floating piston 94 freely translates over and about the shift rod 75 until the body 95 of the floating piston 94 abuts against the thrust washer 105 of the second spring shoulder 104.

Figure 23A:
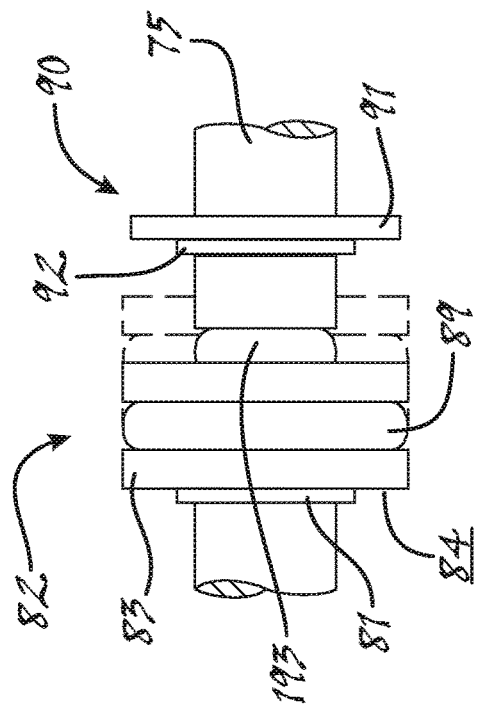
FIGS. 23A and 23B show, in partially phantom detail views taken from FIG. 21A and with the springs of FIG. 21A omitted, details of the unconstrained freedom of motion of the floating seal member with respect to the shift rod.
Figure 23B:
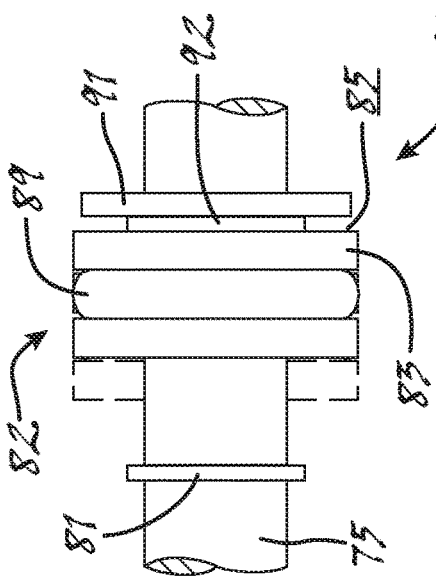

Similarly, FIGS. 23A and 23B show the unconstrained range of motion of the first, floating, seal member 82, with respect to the shift rod 75, and where in each of the figures the phantom line showing represents the position of the first seal member 82 as depicted in FIG. 21A. As shown in FIG. 23A, the unconstrained first seal member 82 freely translates over and about the shift rod 75 in the direction of the first end 76a of the shift rod 75 until the first face 84 of the seal member body 83 impacts external snap ring 81. As shown in FIG. 23B, the unconstrained first seal member 82 freely translates over and about the shift rod 75 in the direction of the second end 76b of the shift rod 75 until the second face 85 of the seal member body 83 abuts against the external snap ring 92 of the first spring shoulder 90.

It is noted that, as shown in FIG. 23A, the free unconstrained translation of the first seal member 82 in the direction of the first end 76a of the shift rod 75 exposes O-ring 193. As will be better understood further herein, however, integration of the shift rod assembly 74 within the valve controller body 37 will impose further constraint on the freedom of motion of the first seal member 82 such that in operation of the present inventions the O-ring 193 will not be exposed. Additionally, it is noted that in the operation of the present inventions, the first seal member 82 remains substantially stationary with respect to the valve controller body 37, while the shift rod 75, and other components of the shift rod assembly 74, translate with respect to the valve controller body 37 and the first seal member 82.

Figure 24:
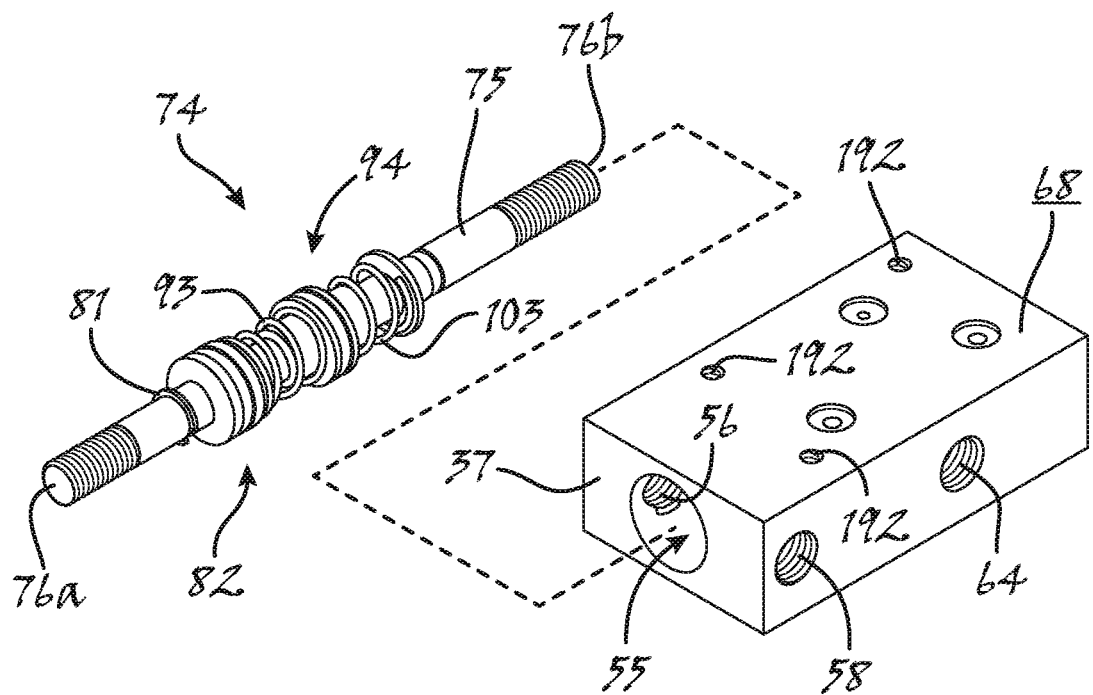
FIG. 24 shows, in a partially exploded isometric view, the shift rod assembly and the valve controller body, as the shift rod assembly is prepared, with its stop member removed, for insertion into the valve controller body.

With the shift rod assembly 74 prepared as previously described, assembly of the fluid pressure operated valve controller 36 begins, as shown in FIG. 24, with insertion of the prepared shift rod assembly 74 into the valve controller body 37. As shown in the figure, the shift rod assembly 74, with the shift rod stop member 108 omitted, is inserted, with the second end 76b of the shift rod 75 first, through the detent cavity 55 and into the interior spaces as defined by the inner walls 38 of the valve controller body 37. With the shift rod assembly 74 fully inserted into the interior space of the valve controller body 37, as shown in FIG. 25, the shift rod assembly 74 is then secured within the valve controller body 37.

Figure 25:
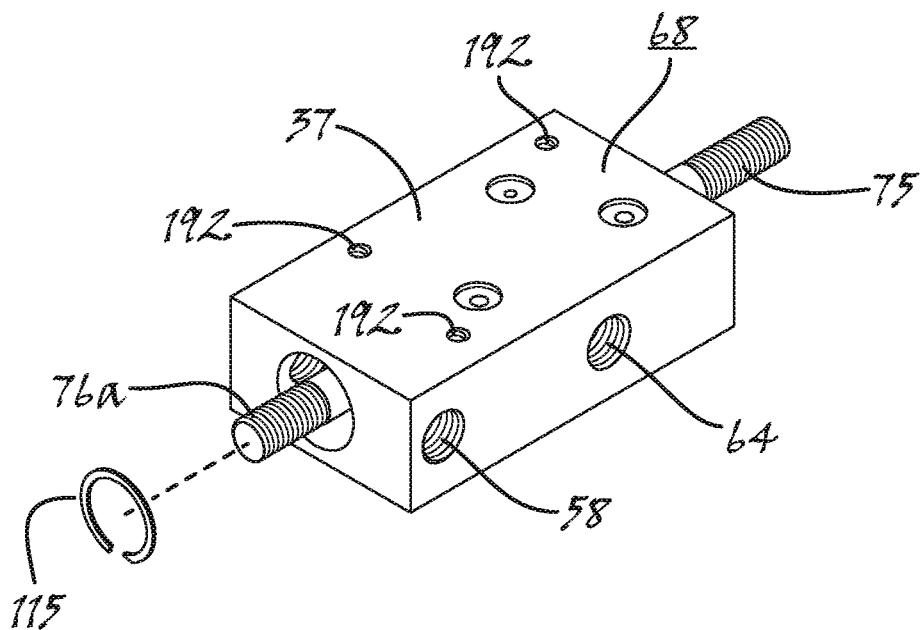
FIG. 25 shows, in a partially exploded isometric view, details of the provision of an internal snap ring in connection with the partially assembled valve controller, which snap ring restrains the shift rod assembly substantially within the valve controller body and also partially arrests the freedom of movement of the floating seal with respect to the shift rod.

In particular, as shown in FIG. 25, an internal snap ring 115 is placed over and about the first end 76a of the shift rod 75, passed through the detent cavity 55, and fitted into the circumferential groove 60, as previously described with respect to FIG. 11, and as shown in FIGS. 26A through 26E. As shown in the figures, and particularly in FIG. 26D, the internal snap ring 115 not only secures the shift rod assembly 74 within the valve controller body 37, but also serves to constrain, or otherwise limit, travel of the first, floating, seal member 82 during operation of the assembled fluid pressure operated valve controller 36. Additionally, it should be appreciated that the placement of the internal snap ring 115, in cooperation with the first, floating, seal member 82 and the first spring shoulder 90, also limits travel of the shift rod assembly 74 in the first operable state of the valve controller 36. Similarly, and as particularly shown in FIG. 26E, it should be appreciated that the placement of the external snap ring 106 of the second spring shoulder 104, in cooperation with the back wall 39 of the piston chamber 40, also limits travel of the shift rod assembly 74 in the second operable state of the valve controller 36.

Figure 26A:
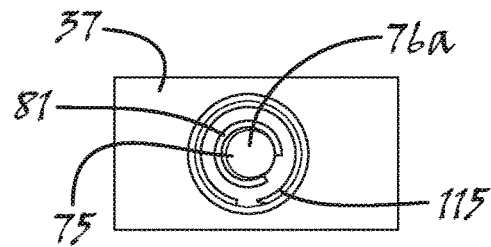
FIG. 26A shows, in an elevational view, various details of the placement of the internal snap ring of FIG. 25 within the valve controller body.
Figure 26B:
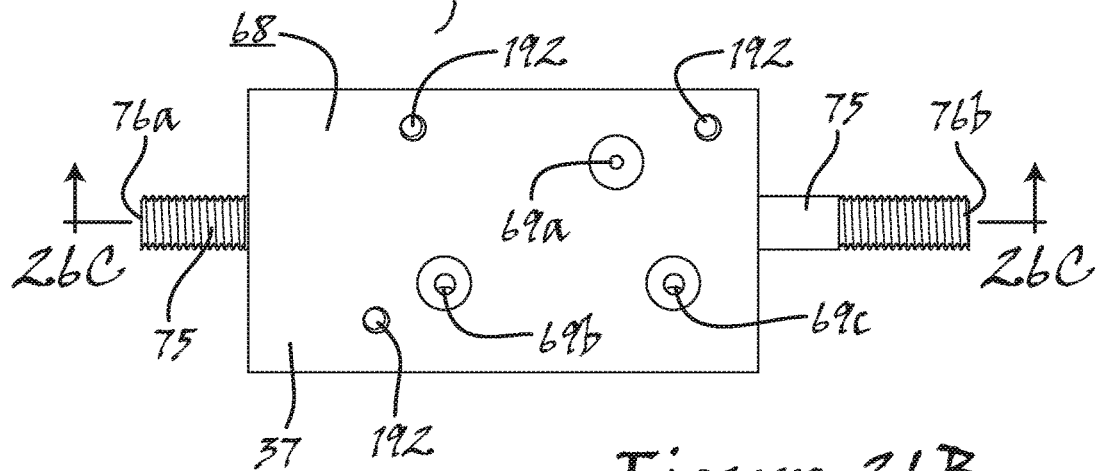
FIG. 26B shows, in a plan view, the valve controller body and shift rod assembly, as arranged in FIG. 26A.
Figure 26D:
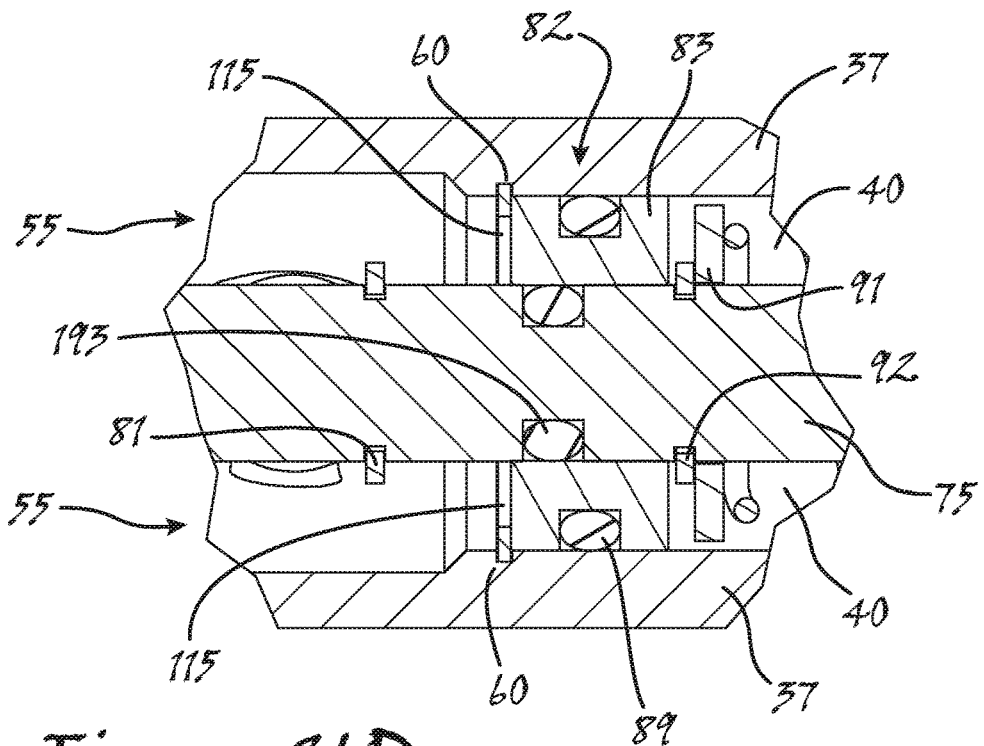
FIG. 26D shows, in a detail view taken from FIG. 26C, further details of the floating seal and the internal snap ring, as operably placed about the shift rod within the valve controller body.
Figure 26C:
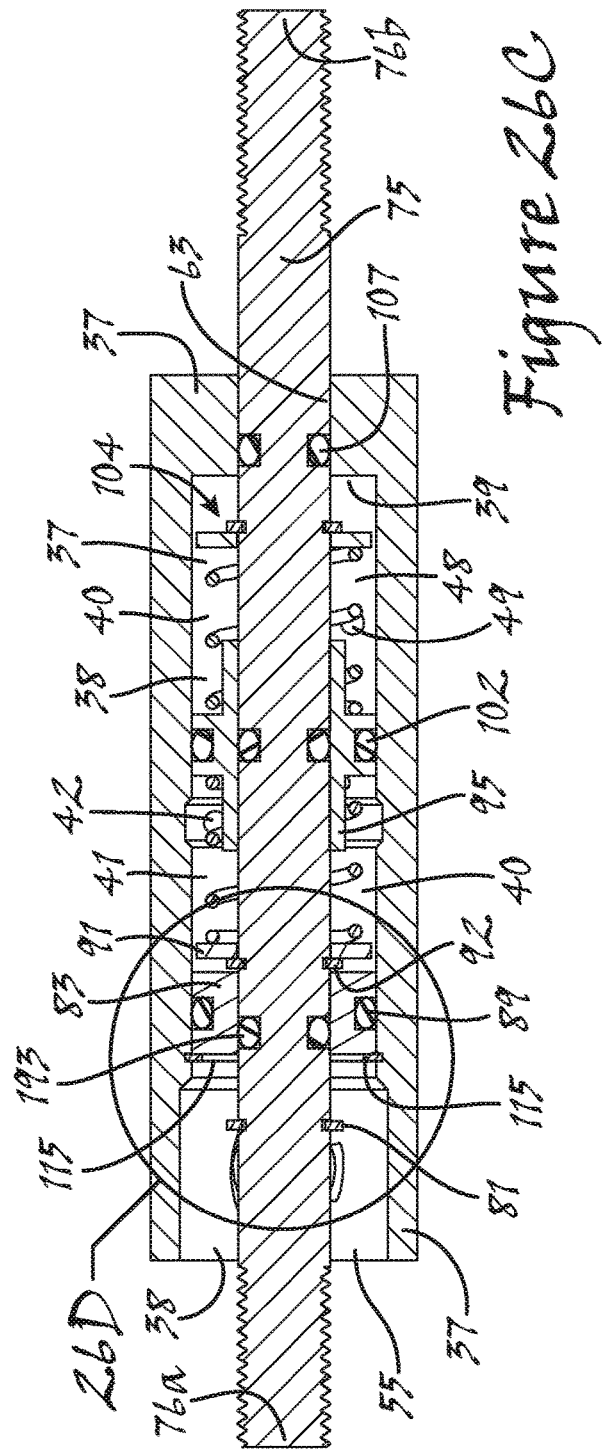
FIG. 26C shows, in a cross-sectional view through cut line 26C-26C of FIG. 26B, various details of the cooperative arrangement of the shift rod assembly and valve controller body, as the shift rod assembly is in a first operable position within the valve controller body corresponding to the first operable state of the valve assembly.
Figure 26E:
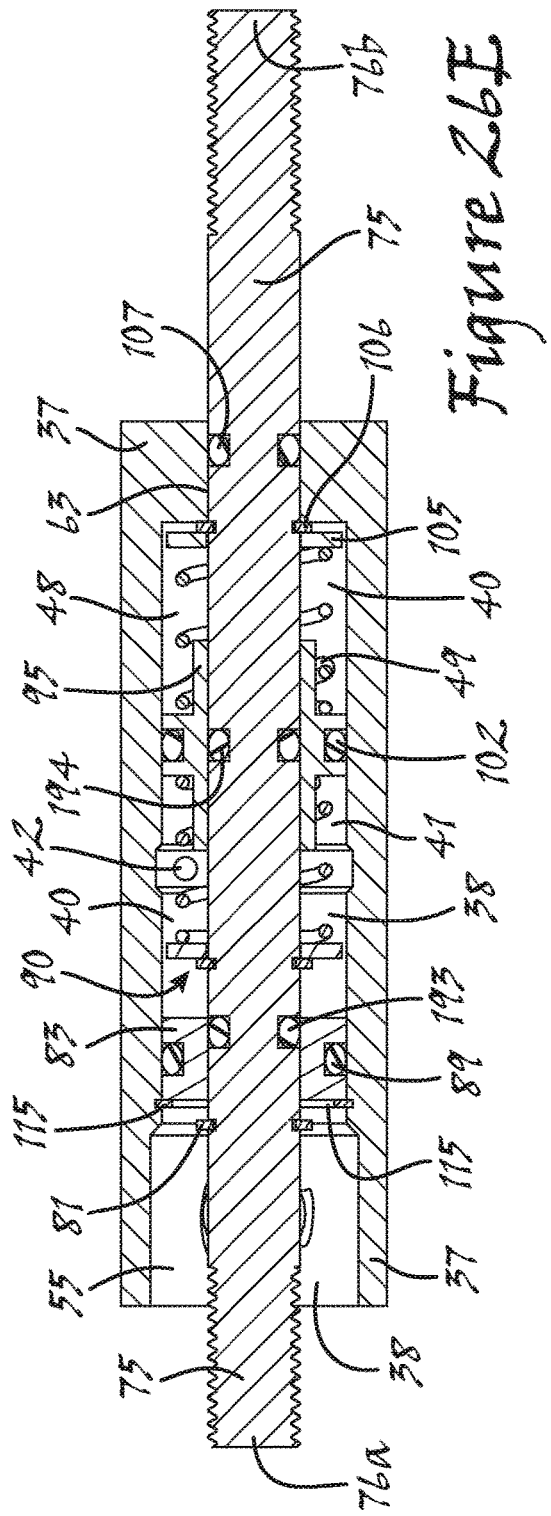
FIG. 26E shows, in a cross-sectional view generally corresponding to the view of FIG. 26C, various details of the cooperative arrangement of the shift rod assembly and valve controller body, as the shift rod assembly is in a second operable position within the valve controller body corresponding to the second operable state of the valve assembly.

As particularly shown in FIG. 26C, depicting the partially assembled valve controller 36 with the shift rod assembly 74 positioned according to the first operable state of the valve controller 36, and in FIG. 26E, depicting the valve controller 36 with the shift rod assembly 74 positioned according to the second operable state of the valve controller 36, O-rings 89, 102, 107 each engage the inner walls 38 of the valve controller body 37, thereby forming, or otherwise defining, internal spaces within the valve controller body 37. In particular, O-ring 89 about the body 83 of the first seal member 82 forms a substantially fluid tight seal, within the fluid pressures expected in the operation of the present inventions, between the seal member 82 and the inner walls 38 of the valve controller body 37. In this manner, the first seal member 82 defines a first end of the piston chamber 40. Additionally, however, it is noted that the first seal member 82 also aligns the first end 76a of the shift rod 75 with the first, longitudinal, axis X of the valve controller body 37.

Similarly, as also shown in the figures, O-ring 107 forms a substantially fluid tight seal, within the fluid pressures expected in the operation of the present inventions, between the shift rod 75 and the inner walls 38 of the valve controller body 37. In this manner O-ring 107 acts as a second seal member, and defines a second end of the piston chamber 40. Additionally, however, it is noted that the O-ring 107 forming the second seal member also particularly engages the inner walls 38 of the body 37 within the shift rod guide 63, as previously described with respect to FIG. 11. In this manner, the O-ring 107 forming the second seal member also serves to align the second end 76b of the shift rod 75 with the first, longitudinal, axis X through the body 37 of the valve controller 36.

Still further, it is shown that O-ring 102, or a like sealing member, about the body 95 of the floating piston 94 engages the inner walls 38 of the valve controller body to form a substantially to provide a fluid tight seal, within the fluid pressures expected in the operation of the present inventions. In this manner, the floating piston 94 divides the piston chamber 40 into a first volume 41 and a second volume 48. As will be appreciated by those of ordinary skill in the art, especially in light of this exemplary description, the first volume 41 and the second volume 48, as defined by the position within the piston chamber 40 of the floating piston 94, are each variable. In particular, it should be appreciated that if the fluid pressure in the first volume 41 exceeds the fluid pressure in the second volume 48, the first volume 41 will expand causing the floating piston 94 to move in the direction of the second volume 48, compressing the second piston spring 103. Likewise, if the fluid pressure in the second volume 48 exceeds the fluid pressure in the first volume 41, the second volume 48 will expand causing the floating piston 94 to move in the direction of the first volume 41, compressing the first piston spring 93.

In any case, it is noted at this juncture that the O-ring 102 about the body 95 of the floating piston 94 must traverse the first pressure port 42, which, as previously described, provides fluid communication into the first volume 41. In order to prevent damage to the O-ring 102 as it passes the first pressure port, and, as a result, loss of sealing integrity, a circumferential recess 61 is placed about the first pressure port 42, as previously described with respect to FIG. 11. As will be appreciated by those of ordinary skill in the art, the provision of this recess 61 prevents the O-ring 102 from coming into contact with potentially sharp edges about the first pressure port 42. In order to ensure that the provision of the recess 61 itself does not create similar potentially cutting edges, the recess 61 is most preferably provided with chamfered 62, or otherwise relieved, edges 62, as particularly shown in FIG. 11.

Figure 27:
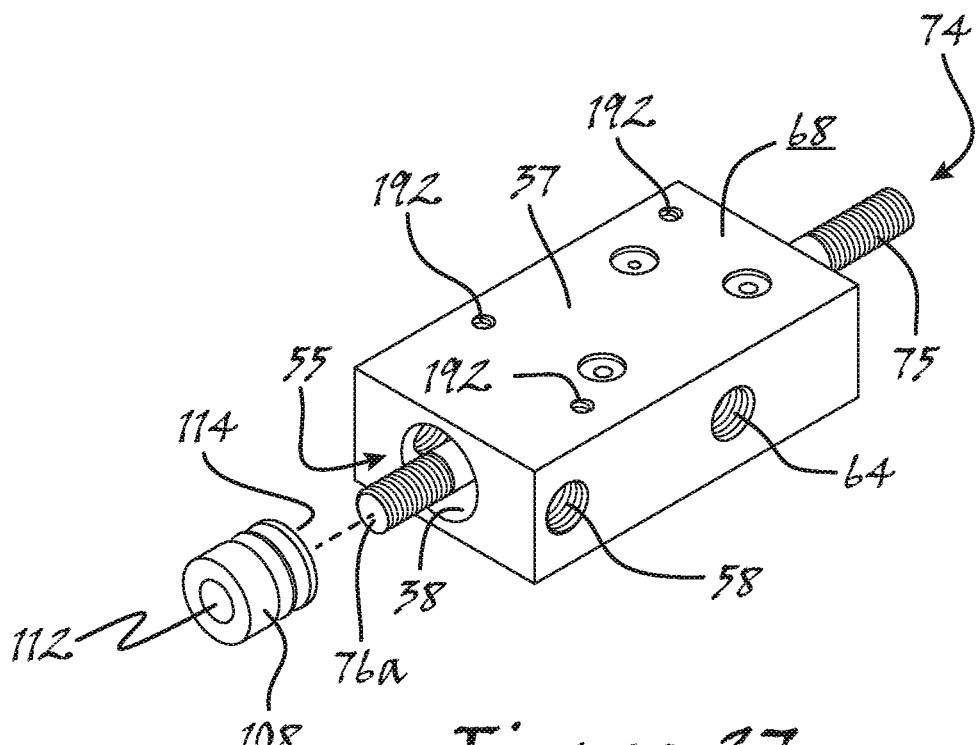
FIG. 27 shows, in a partially exploded isometric view, various details, in the assembly of the fluid pressure operated valve controller, of the placement of a shift rod stop member.
Figure 28:
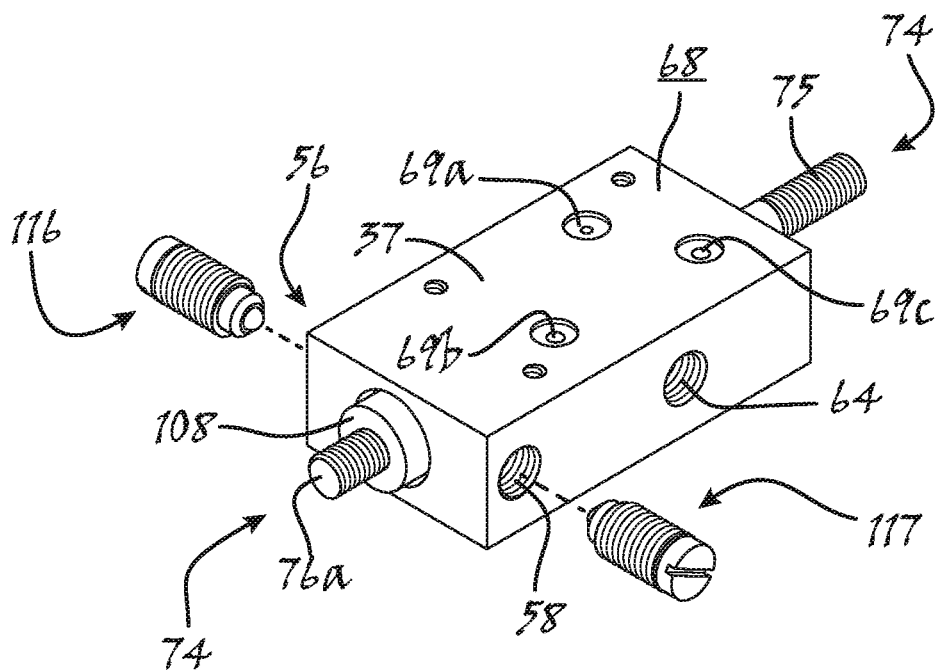
FIG. 28 shows, in a partially exploded isometric view, various details, in the continued assembly of the fluid pressure operated valve controller, of the placement of a first detent and a second detent, each detent being cooperatively adapted with the stop member for alternatively retaining the shift rod assembly in one of its first or second operable positions.

In order to secure the shift rod assembly 74 in either a first position corresponding to the first operable state of the valve controller 36 or a second position corresponding to the second operable state of the valve controller 36, at least a first detent 116 is provided, as will be better understood further herein. To this end, the shift rod assembly 74 includes a shift rod stop member 108, as previously described, and which provides an engagement member for the detent 116. In order to secure the shift rod stop member 108 to the otherwise completed shift rod assembly 74, the shift rod stop member 108 is initially secured in place with the detent 116. To this end, the shift rod stop member 108 is first placed over and about the first end 76a of the shift rod 75, as shown in FIG. 27, and then inserted into the detent cavity 55 until the inner and 114 of the shift rod stop member 108 abuts against the external snap ring 81, as shown in FIG. 28. As also shown in FIG. 28, the shift rod stop member 108 is then temporarily secured in place by inserting the first detent 116 through the previously described first transverse bore 56 provided along the second axis Y of the valve controller body 37.

Figure 29A:
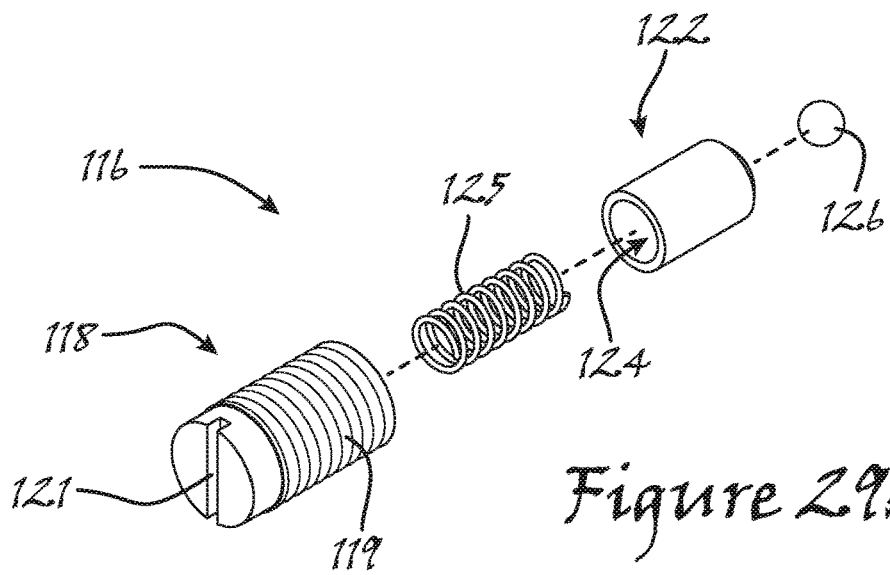
FIGS. 29A and 29B show, in exploded isometric views, various details of the first detent of FIG. 28, which details are identically present in the second detent.
Figure 29B:
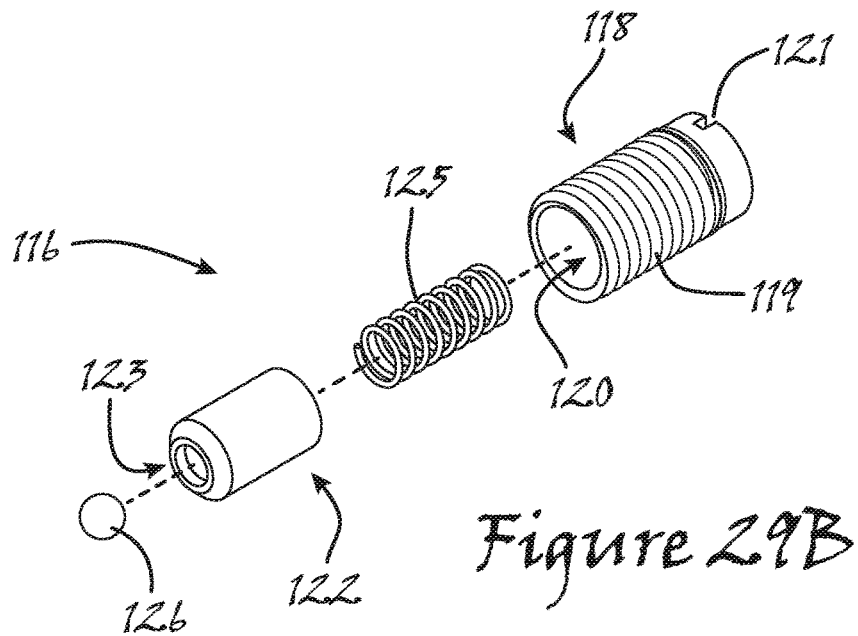
Figure 30:
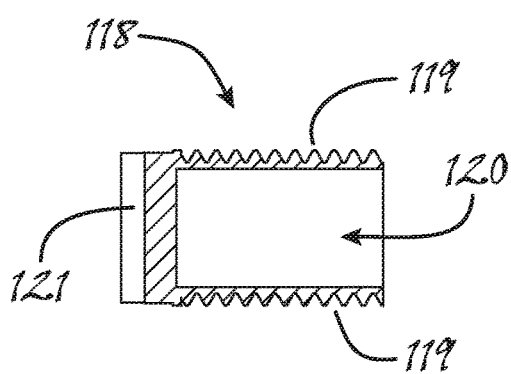
FIG. 30 shows, in a cross-sectional view through its longitudinal axis, various details of a body, as provided in implementation of each detent of FIG. 28.

In order to better understand engagement of the detent 116 with the shift rod stop member 108, however, the detent 116 is first described in detail. As shown in FIGS. 29A and 29B, the first detent 116 most preferably comprises a generally cylindrical body 118, a generally cylindrical ball retainer 122, a spring 125 and a preferably spherical ball 126. As shown in 30, the cylindrical body 118, which preferably comprises brass, or a like material, is provided with external threading 119 corresponding to internal threading 57 provided in the first transverse bore 56 into the detent cavity 55. In order to provide full adjustability of the degree of insertion of the detent 116 into the bore 56, the threading 57, 119 for the bore 56 and body 118, respectively, comprise straight, or parallel, threads. In order to facilitate adjustment of the degree of insertion of the detent 116 into the bore 56, the body 118 also preferably comprises a screw driver slot 121. In any case, the body 118 has a preferably cylindrical cavity 120, which is sized and shaped to receive the also preferably cylindrical ball retainer 122.

Figure 31:
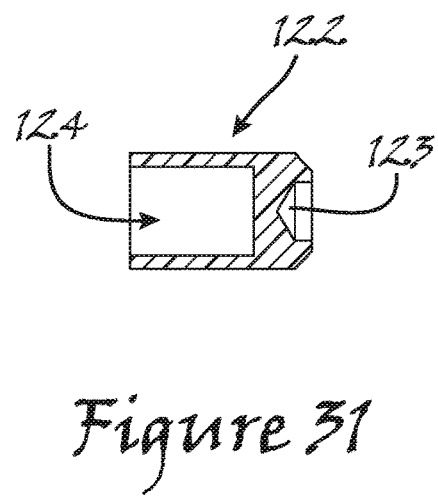
FIG. 31 shows, in a cross-sectional view through its longitudinal axis, various details of a ball retainer, as provided in implementation of each detent of FIG. 28.

As shown in FIG. 31, the ball retainer 122 comprises, at its distal end, a ball pocket 123, which is sized, shaped and otherwise adapted to receive the spherical ball 123. As will be better understood further herein, the spherical ball 123, such as may comprise a stainless steel or like material bearing, frictionally engages the ball pocket 123, to which end the ball retainer preferably comprises polyoxymethylene, or a like material providing high stiffness and dimensional stability, but low friction. In any case, the ball retainer 122 also includes a spring cavity 124, which receives the spring 125 as placed in compression between the ball retainer 122 and the base of the cavity 120 in the body 118.

Finally, although many if not all of the teachings of the present invention may be obtained in an implementation comprising only a single detent 116, a second detent 117, acting in concert with the first detent 116 is most preferred. In particular, provision of a second detent 117 generally opposite the first detent 116, as particularly shown, for example, in FIG. 28, serves to prevent binding of the shift rod assembly 74 as the shift rod assembly 74 transitions between the first position and the second position, and also, as will be better understood further herein, provides additional and/or more finely controllable restraining force for the shift rod assembly 74. In cases where a second detent 117 is provided, such as the exemplary implementation shown and described, the second detent 117 may comprise identical component parts and construction as described with respect to the first detent 116. To that end, the second transverse bore 58 is also preferably provided with straight, or parallel, threading 59. Additionally, the second transverse bore 58 may likewise be provided along the second axis Y, but also may be provided along any other transverse axis in the same longitudinal position along the valve controller body 37 as is the second axis Y.

Figure 32A:
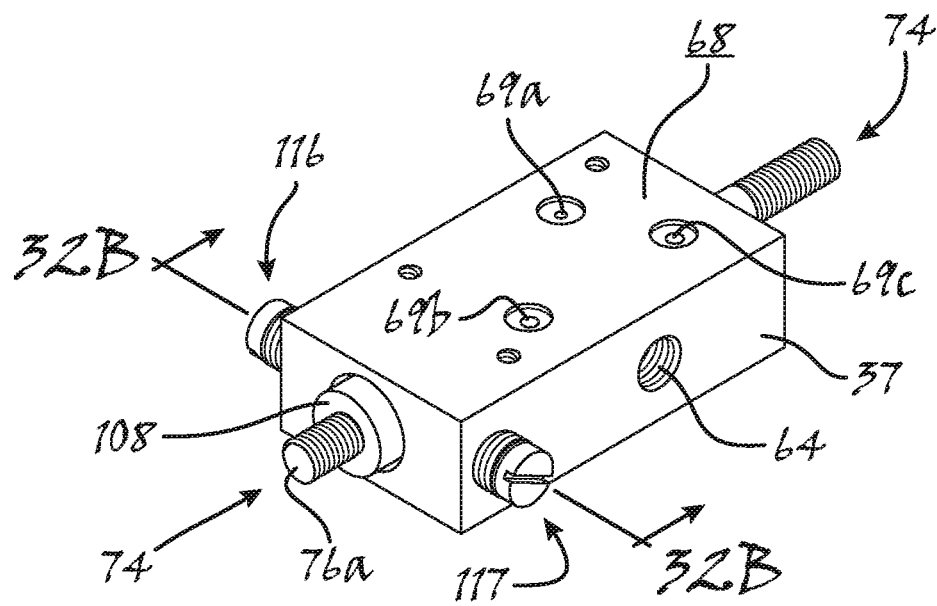
FIG. 32A shows, in an isometric view, the valve controller as prepared for integration within the valve assembly, the valve controller being shown in a first operable state corresponding to the first operable state of the valve assembly.
Figure 32B:
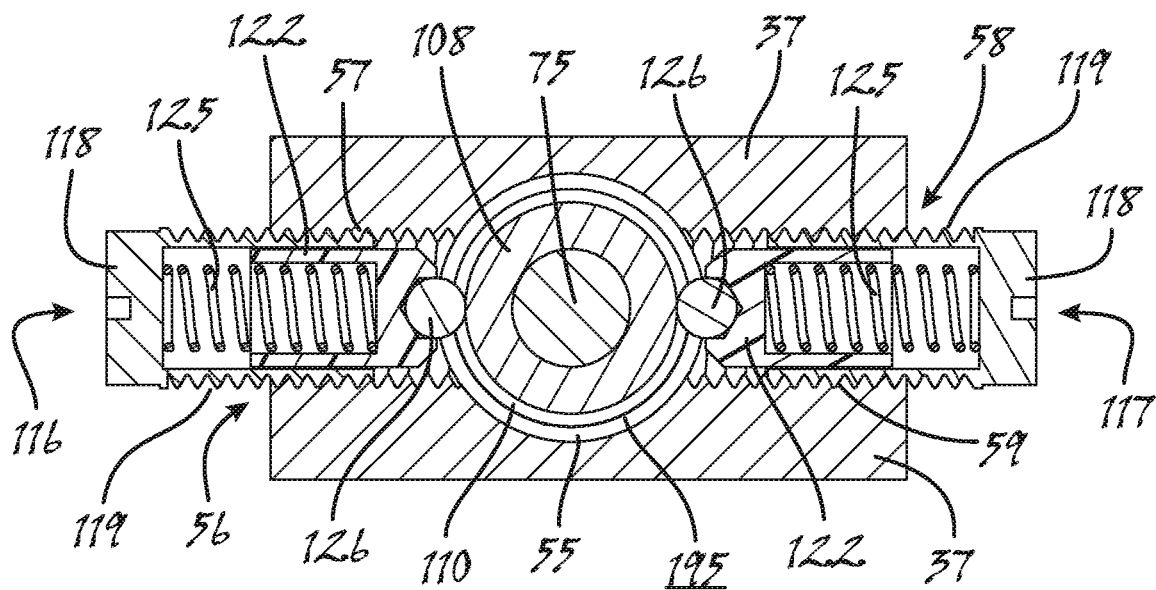
FIG. 32B shows, in a cross-sectional view through cut line 32B-32B of FIG. 32A, various details of the cooperative arrangement of the first and second detents and the shift rod stop member, as the valve controller is in its first operable state.

Returning then to the engagement of the detents 116, 117 with the shift rod stop member 108, the detents 116, 117 are introduced into the transverse bores 56, 58, respectively, as shown in FIG. 28, and then screwed in place as shown in FIGS. 32A and 32B, which, it is noted, depict the shift rod assembly 74 in the first operable position. As particularly shown in FIG. 32B, and as previously noted, each of the spherical balls 126 of each detent 116, 117 are sized, shaped and otherwise adapted to engage the circumferential grooves 110, 111 provided about the outer cylindrical surface 195 of the shift rod stop member 108. In particular, when the shift rod assembly 74 is in the first operable position, as shown in FIG. 32B, the spherical balls engage the first circumferential groove 110, as also shown in FIG. 32B. As will be appreciated by those of ordinary skill in the art, in light of this exemplary description, the balls 126 as fully engaged in one or the other of the circumferential grooves 110, 111, serve to resist longitudinal movement of the shift rod stop member 108. As a result, the engagement as depicted in FIG. 32A will hold the shift rod stop member 108 in place as the assembly of valve assembly 11 next takes place.

Before describing the final steps of assembly, however, it is noted that FIG. 32B also highlights that each detent 116, 117, as implemented in the exemplary embodiment of the present inventions, is fully adjustable with respect to its insertion into the bores 56, 58, respectively, of the valve controller body 37. For example, the offset from center of the first, longitudinal, axis X of the body 37, as clearly visible in FIG. 32B, is fully accommodated by the detents 116, 117. In particular, the second detent 117 is shown to be screwed farther into bore 58 than is the first detent 116 screwed into the bore 56. That said, the spring force applied by detent 117 is shown to be identical to the spring force applied by detent 116. As will be appreciated by those of ordinary skill in the art, however, one, the other, or both of the detents 116, 117 can be made to apply more or less spring force, and hence, more or less resistance to the longitudinal movement of the shift rod assembly 74, by screwing the detents 116, 117 more or less into their respective bores 56, 58.

Figure 33:
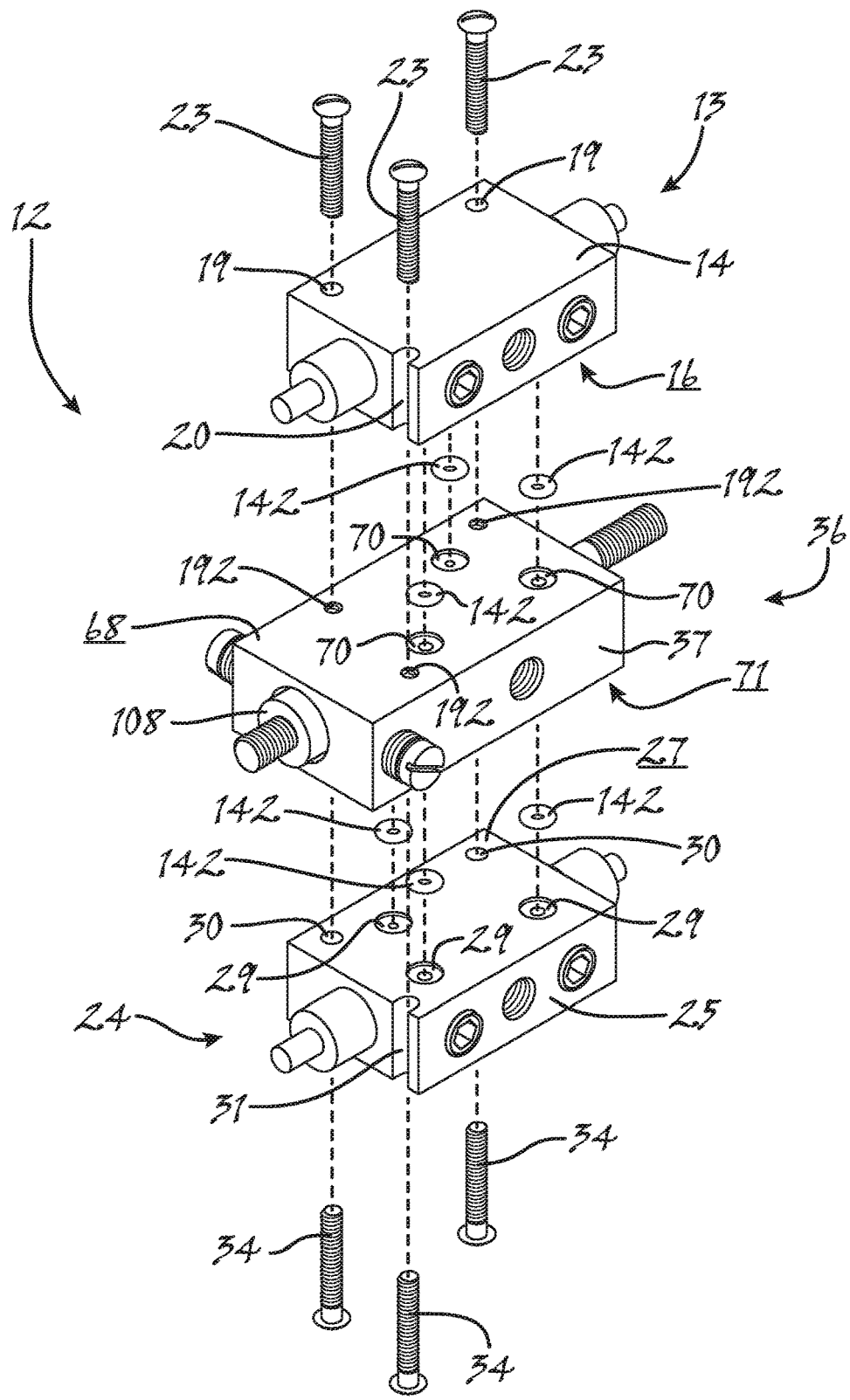
FIG. 33 shows, in a partially exploded isometric view, details of the mating of the first and second spool valves with the valve controller, in the initial assembly of the exemplary implementation of the valve assembly of the present invention.

As shown in FIG. 33, the final stage of assembly of the valve assembly 11 of the present invention begins with the coupling together of the first spool valve 13 and the fluid pressure operated valve controller 36, and the coupling together of the second spool valve 24 and the fluid pressure operated valve controller 36. As shown in the figure, the substantially planar mating face 16 of the valve body 14 of the first spool valve 13 is aligned with and coupled to the first substantially planar face 68 of the valve body 37 of the valve controller 36, with one each sealing member 142 placed between duct 17a and duct 69a, between duct 17b and duct 69b, and between duct 17c and duct 69c. As also shown in the figure, conventional mounting hardware, such as, for example, machines screws 23 are placed through the mounting holes 19 and within the mounting recess 20 of the valve body 14 of the first spool valve 13, and screwed into threaded through holes 192 provided in the valve controller body 37. Likewise, the substantially planar mating face 27 of the valve body 25 of the second spool valve 24 is aligned with and coupled to the second substantially planar face 71 of the valve body 37 of the valve controller 36, with one each sealing member 142 placed between duct 28a and duct 72a, between duct 28b and duct 72b, and between duct 28c and duct 72c. As also shown in FIG. 33, conventional mounting hardware, such as, for example machines screws 34 are placed through the mounting holes 30 and within the mounting recess 31 of the valve body 25 of the second spool valve 24, and screwed into the threaded through holes 192 of the valve controller body 37.

Figure 34:
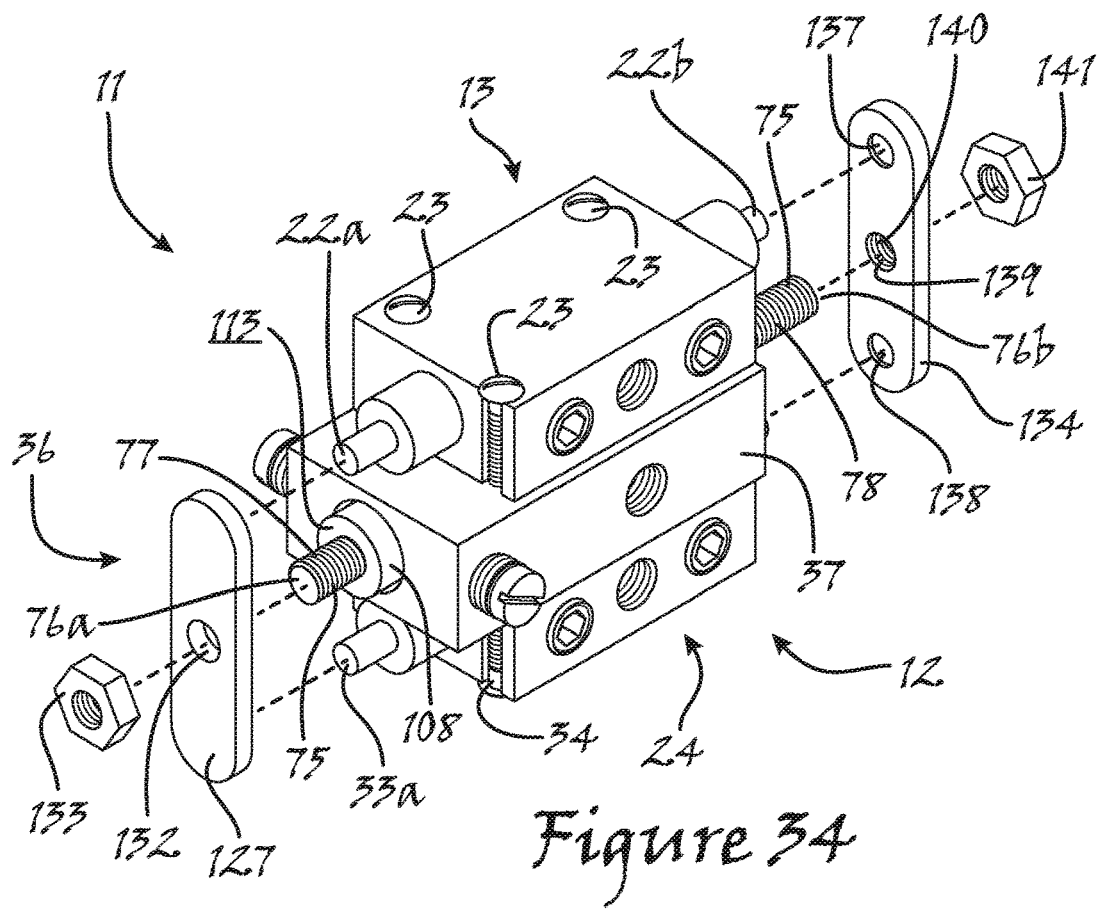
FIG. 34 shows, in a partially exploded isometric view, details of the provision of first and second push plates, as adapted to operably couple valve actuators of the spool valves to the shift rod of the valve controller.
Figure 35:
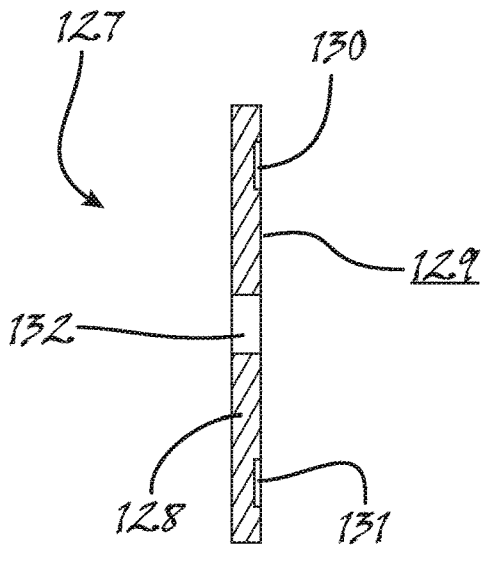
FIGS. 35 and 36 show, cross-sectional views through their respective centrally located vertical planes, various details of the first and second push plates, respectively.
Figure 36:
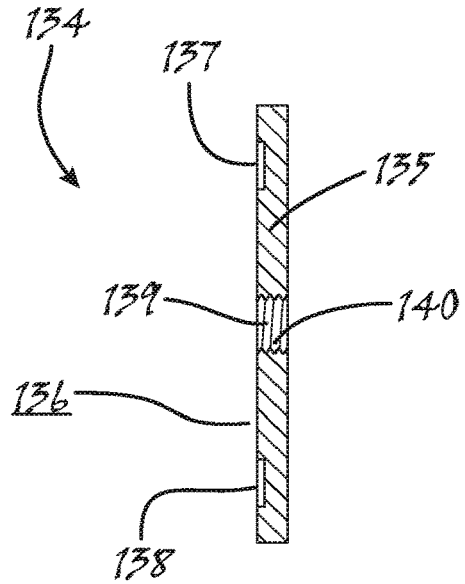

With the first spool valve 13 and the second spool valve 24 coupled together with the valve controller 36, as shown in FIG. 34, the valve assembly 11 is completed by operably connecting the shift rod 75 of the fluid pressure operated valve controller 36 to the valve actuator 21 of the first spool valve 13 and to the valve actuator 32 of the second spool valve 24. To this end, and as previously noted, a first push plate 127 and a second push plate 134 are provided. As shown in FIG. 35, the first push plate 127 comprises a substantially planar body 128, having an interior face 129 and a centrally located smooth bore 132 adapted to receive therethrough the first end 76a of the shift rod 75. As shown in the figure the interior face 129 comprises a first recess 130 for engaging the first end 22a of the valve actuator 21 of the first spool valve 13, and a second recess 131 for engaging the first end 33a of the valve actuator 32 of the second spool valve 24. As shown in FIG. 36, the second push plate 134 comprises a substantially planar body 135, having an interior face 136 and a centrally located bore 139 for receiving therethrough the second end 76b of the shift rod 75. Unlike the first push plate 127, however, the centrally located bore 139 of the second push plate 134 comprises straight, or parallel, threading 140. The interior face 136 comprises a first recess 137 for engaging the second end 22b of the valve actuator 21 of the first spool valve 13, and a second recess 138 for engaging the second end 33b of the valve actuator 32 of the second spool valve 24.

To operably place the first and second push plates 127, 134, the valve actuators 21, 32 and the shift rod 75 are first aligned in one or the other of the first or second operable states. As shown in FIG. 34, however, the valve actuators 21, 32 and the shift rod 75 are in the first operable state. In any case, with the valve actuators 21, 32 and the shift rod 75 aligned, the second push plate 134 is first threaded into position by holding the second push plate 134 with its first and second recesses 137, 138 aligned with the first and with the second ends 22b, 33b, respectively, of the valve actuators 21, 32. The shift rod 75 is then turned to thread the shift rod 74 through the threaded bore 139 of the second push plate 134, thereby drawing the second push plate 134 into position with the first recess 137 engaged about and against the second end 22b of the valve actuator 21 and the second recess 138 engaged about and against the second end 33b of the valve actuator 32. With the second push plate 134 thus in operable position, the second push plate 134 is secured by affixing a jam nut 141.

Finally, the first push plate 127 is positioned with the first recess 130 aligned with the first end 22*a* of the valve actuator 21 and the second recess 131 aligned with the first end 33*a* of the valve actuator 32. The smooth bore 132 of the first push plate 127 is then slipped over and about the first end 76*a* of the shift rod 75 until the first recess 130 and the second recess 131 are engaged about and against the first end 22*a* of the valve actuator 21 and the first end 33*a* of the second of the valve actuator 32, respectively. With the first push plate 127 thus in operable position, the first push plate 127 is secured in place with a jam nut 133 or lock nut.

Figure 37A:
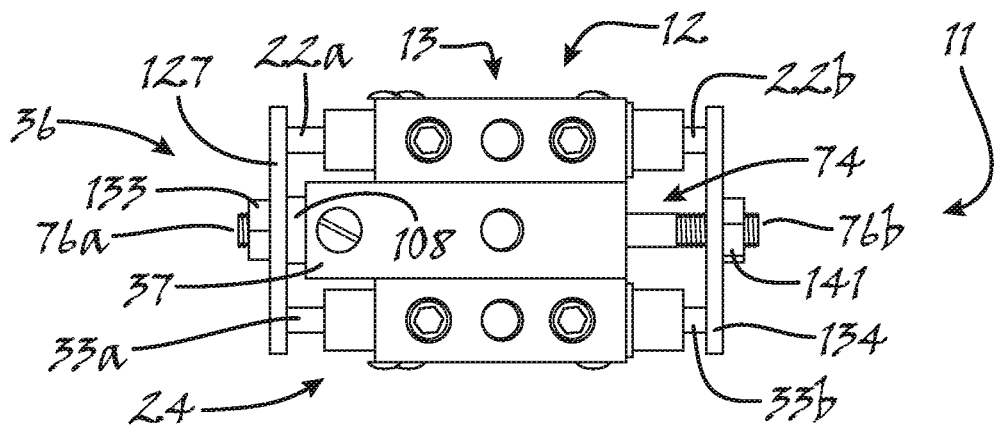
FIG. 37A shows, in an elevational view, the fully assembled exemplary implementation of the valve assembly of the present invention, as configured in its first operable state.
Figure 37B:
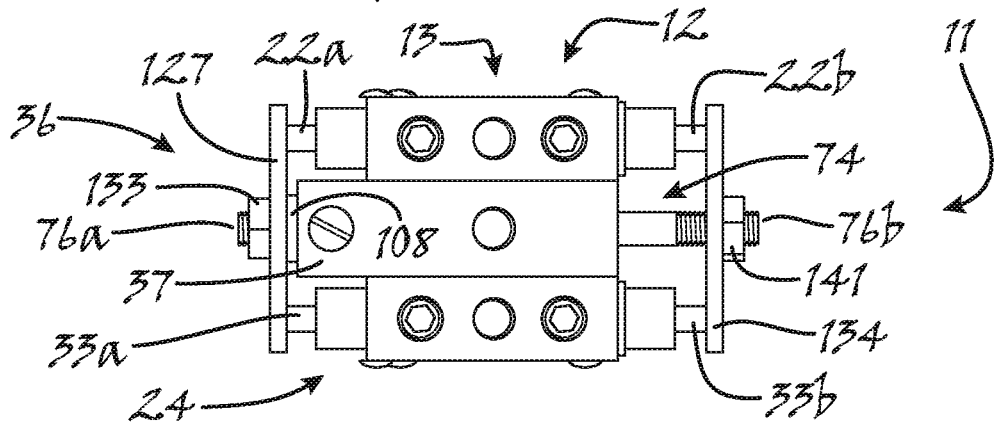
FIG. 37B shows, in an elevational view, the valve assembly of FIG. 37A, as in transition mid-stroke between its first operable state and its second operable state, or alternatively, between its second operable state and its first operable state.

Referring now to FIGS. 37A through 37B, the operable states of the valve assembly 11 of the present inventions are now described, where, in particular, FIG. 37A shows the valve assembly 11 in the first operable state, FIG. 27C shows the valve assembly 11 in the second operable state, and FIG. 37B shows the valve assembly 11 "mid-stroke"—that is, in transition from either the first operable state to the second operable state or from the second operable state to the first operable state. Although the valve assembly 11 is for clarity, in FIGS. 37A through 37B, shown in isolation from the pneumatic arrangement 10 of FIG. 1, the following discussions, including the detailed discussions with respect to FIGS. 38A through 44D, should be read as though the valve assembly 11 is integrated into the pneumatic arrangement as previously described in detail with reference to FIGS. 1 through 3B.

In the first operable state, as shown in FIG. 37A, the shift rod 75 is fully in its first operable position, and, primarily through the second push plate 134, holds the valve actuator 21 of the first spool valve 13 and the valve actuator 32 of the second spool valve 24 in their respective first operable positions, placing, or maintaining, the first spool valve 13 and the second spool valve 24 in their respective first operable states. In the described first operable state of the pneumatic arrangement 10, gases of the first set 144 of storage chambers—first canister 145 and second canister 148—are mixed, or blended, together and ultimately delivered to the mixed gas consumer 196. In particular, the first gas flows from the first canister 145 into port 15*b*, and out through duct 17*b*, of the first spool valve 13. Through coupling of the first spool valve 13 to the valve controller 36, the first gas from duct 17*b* enters duct 69*b* through the first face 68 of the valve controller body 37 and passes into the gas mixing manifold 65. Likewise, the second gas flows from the second canister 148 into port 26*b*, and out through duct 28*b*, of the second spool valve 24. Through coupling of the second spool valve 24 to the valve controller 36, the second gas from duct 28*b* enters duct 72*b* through the second face 71 of the valve controller body 37 and passes into the gas mixing manifold 65, where it blends together with the first gas from the first canister 145. The mixed gases then pass, as demanded by the ultimate gas consumer 196, through outlet port 64 of the valve controller body 37.

Importantly, however, mixed gases are also introduced, in the first operable state, to the second volume 48 of the piston chamber 40. In particular, a portion of the fluid flow present at port 26*b* of the second spool valve 24 is conducted through duct 28*a* of the second spool valve 24. Through coupling of the second spool valve 24 to the valve controller 36, the gases from duct 28*a* enter duct 72*a* through the second face 71 of the valve controller body 37 and pass through channel 50 and port 49 into the second volume 48 of the piston chamber 40.

As the mixture of gases from the first set 144 of storage chambers is being delivered to the mixed gas consumer 196, the valve assembly 11 also operates to charge the second set 151 of storage chambers—third canister 152 and fourth canister 155—by providing fluid communication between the first gas source 158 and the third canister 152, and fluid communication between the second gas source 159 and the fourth canister 155. In particular, the first gas flows from first gas source 158 into port 15*a* of the first spool valve 13, which, in the first operable state, conducts the first gas out through port 15*c* to the third canister 152. Likewise, the second gas flows from second gas source 159 into port 26*a* of the second spool valve, which, in the first operable state, conducts the second gas out through port 26*c* to the fourth canister 155.

Importantly, however, the first gas, in the full pressure as provided from the first gas source 158 is also introduced, in the first operable state, to the first volume 41 of the piston chamber 40. In particular, a portion of the fluid flow present at port 15*c* of the first spool valve 13 is conducted through duct 17*a* of the first spool valve 13. Through coupling of the first spool valve 13 to the valve controller 36, the gas from duct 17*a* enter duct 69*a* through the first face 68 of the valve controller body 37 and passes through channel 43 and port 42 into the first volume 41 of the piston chamber 40.

Under the inventive pneumatic control of the valve assembly 11, as will be better understood further herein, depletion of the mixed gases from the first set 144 of storage chambers to a fluid pressure less than a threshold value below the fluid pressure of the first gas charging third canister 152 of the second set 151 of storage chambers will result in mechanical transition of the valve assembly 11, and hence the pneumatic arrangement 10, from the first operable state to its second operable state.

Figure 37C:
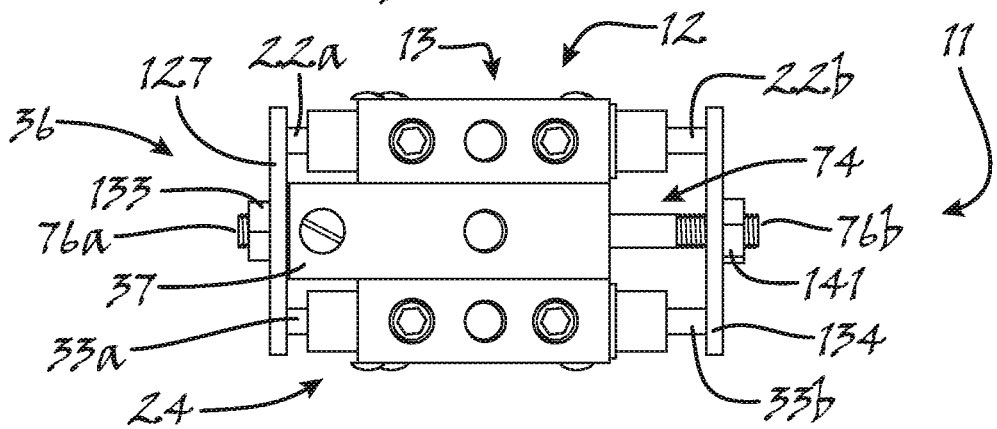
FIG. 37C shows, in an elevational view, the valve assembly of FIG. 37A, as configured in its second operable state.
Figure 38A:
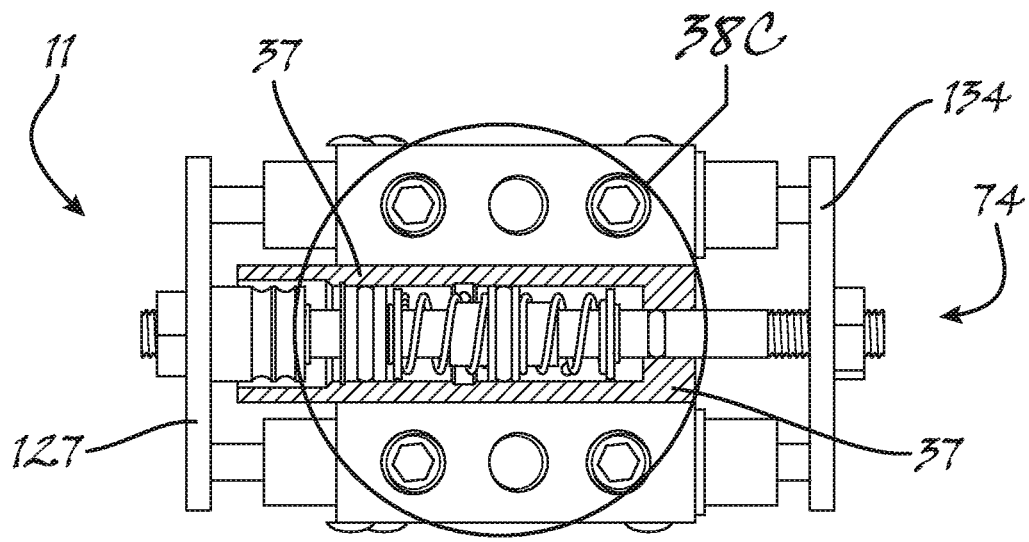
FIG. 38A shows, in an elevational breakout view cutting away the second detent and cross-sectioning the valve controller body through the longitudinal axis of the shift rod assembly, various details of the valve assembly, as the valve assembly is in the first operable state and the fluid pressures within a first volume of the piston chamber and a second volume of the piston chamber are substantially balanced.
Figure 38B:
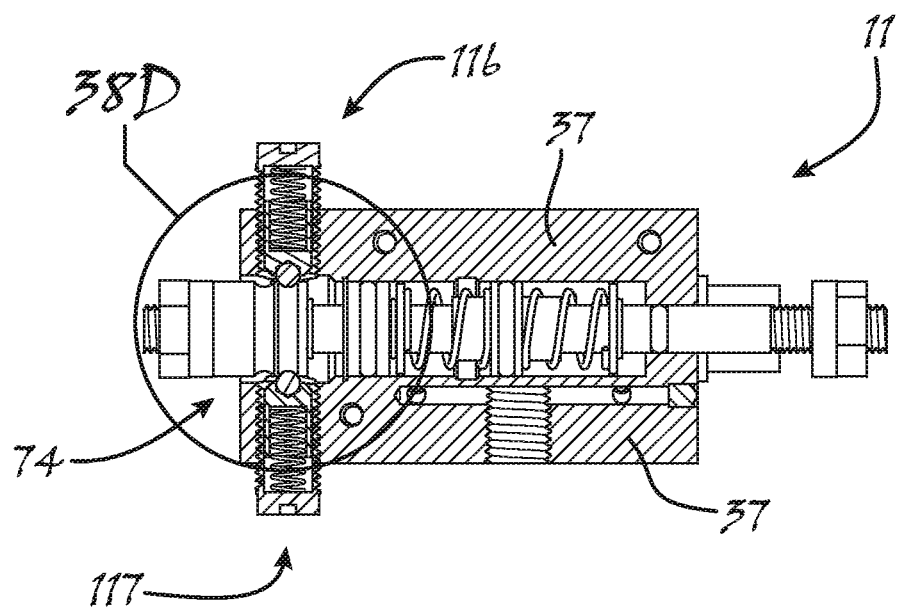
FIG. 38B shows, in a plan breakout view cross-sectioning the valve controller body and the body, ball carrier and ball of each detent through the longitudinal axis of the shift rod assembly, various details of the valve assembly, as the valve assembly is in the state of FIG. 38A.
Figure 38D:
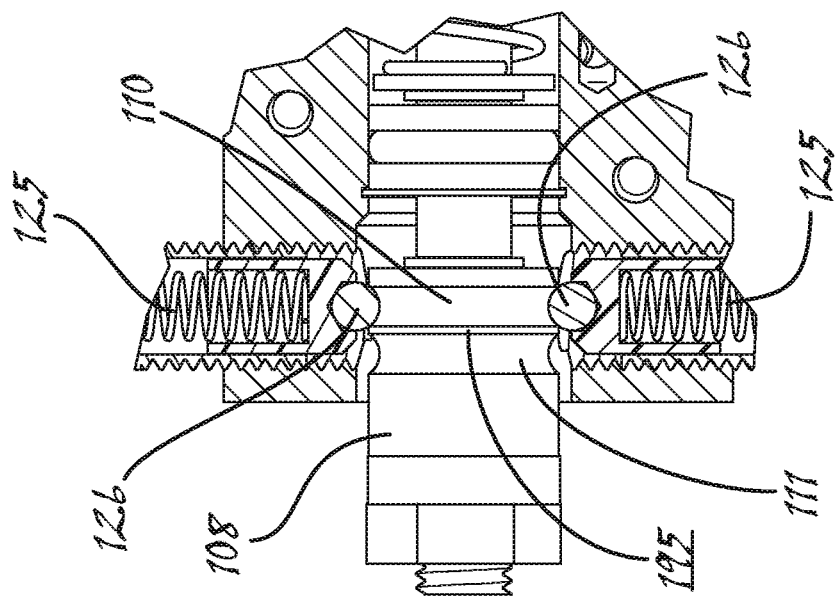
FIG. 38D shows, in a detail view taken from FIG. 38B, details of the operation of the detents on the shift rod stop member, as the valve assembly is in the state of FIG. 38A.
Figure 38C:
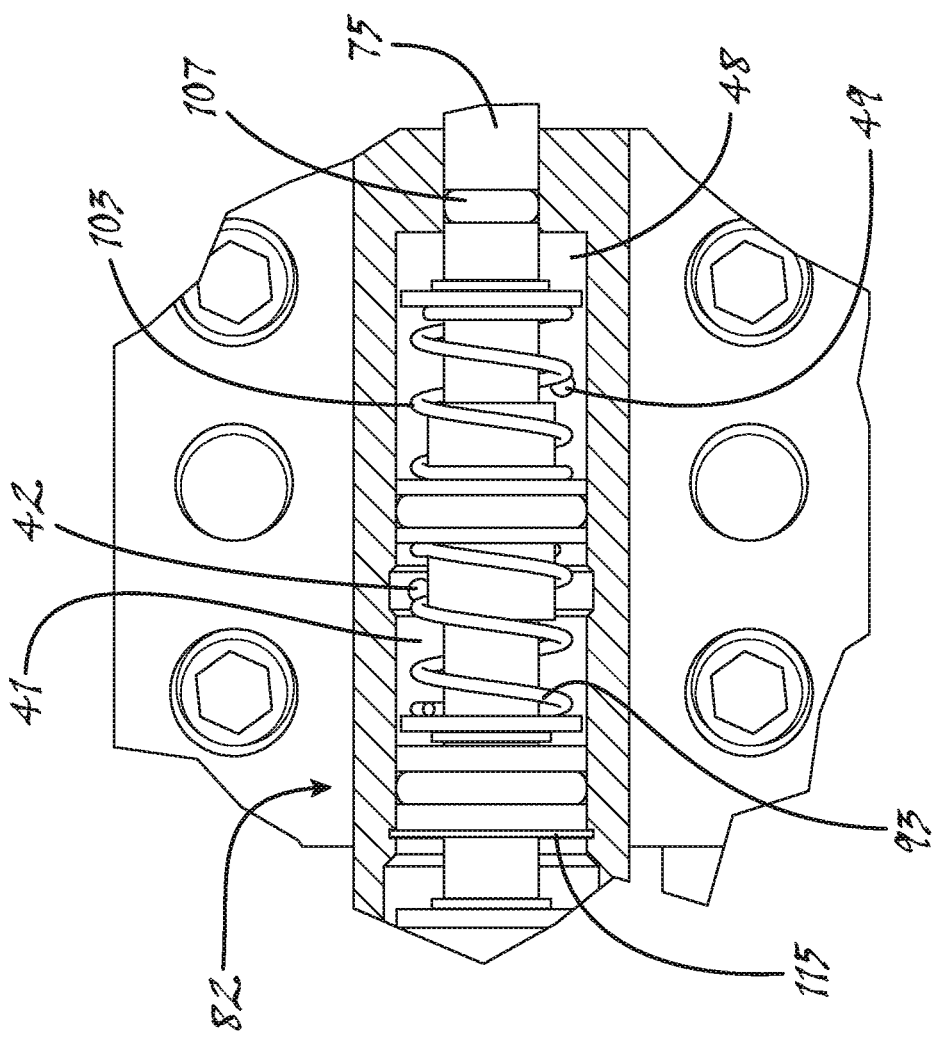
FIG. 38C shows, in a detail view taken from FIG. 38A, details of the shift rod assembly, as the valve assembly is in the state of FIG. 38A.

In the second operable state, as shown in FIG. 37C, the shift rod 75 is fully in its second operable position, and, primarily through the first push plate 127 holds the valve actuator 21 of the first spool valve 13 and the valve actuator 32 of the second spool valve 24 in their respective second operable positions, placing, or maintaining, the first spool valve 13 and the second spool valve 24 in their respective second operable states. In the described second operable state of the pneumatic arrangement 10, gases of the second set 151 of storage chambers—third canister 152 and fourth canister 155—are mixed, or blended, together and ultimately delivered to the mixed gas consumer 196. In particular, the first gas flows from the third canister 152 into port 15*c*, and out through duct 17*c*, of the first spool valve 13. Through coupling of the first spool valve 13 to the valve controller 36, the first gas from duct 17*c* enters duct 69*c* through the first face 68 of the valve controller body 37 and passes into the gas mixing manifold 65. Likewise, the second gas flows from the fourth canister 155 into port 26*c*, and out through duct 28*c*, of the second spool valve 24. Through coupling of the second spool valve 24 to the valve controller 36, the second gas from duct 28*c* enters duct 72*c* through the second face 71 of the valve controller body 37 and passes into the gas mixing manifold 65, where it blends together with the first gas from the third canister 152. The mixed gases then pass, as demanded by the ultimate gas consumer 196, through outlet port 64 of the valve controller body 37.

Importantly, however, mixed gases are also introduced, in the second operable state, to the first volume 41 of the piston chamber 40. In particular, a portion of the fluid flow present at port 15*c* of the first spool valve 13 is conducted through duct 17*a* of the first spool valve 13. Through coupling of the first spool valve 0 to the valve controller 36, the gases from duct 17*a* enter duct 69*a* through the first face 68 of the valve controller body 37 and pass through channel 43 and port 42 into the first volume 41 of the piston chamber 40.

As the mixture of gases from the second set 151 of storage chambers is being delivered to the mixed gas consumer 196, the valve assembly 11 also operates to charge the first set 144 of storage chambers—first canister 145 and second canister 148—by providing fluid communication between the first gas source 158 and the first canister 145, and fluid communication between the second gas source 159 and the second canister 148. In particular, the first gas flows from first gas source 158 into port 15*a* of the first spool valve 13, which, in the second operable state, conducts the first gas out through port 15*b* to the first canister 145. Likewise, the second gas flows from second gas source 159 into port 26*a* of the second spool valve 24, which, in the second operable state, conducts the second gas out through port 26*b* to the second canister 148.

Importantly, however, the second gas, in the full pressure as provided from the second gas source 159 is also introduced, in the second operable state, to the second volume 48 of the piston chamber 40. In particular, a portion of the fluid flow present at port 26*b* of the second spool valve 13 is conducted through duct 28*a* of the second spool valve 24. Through coupling of the second spool valve 24 to the valve controller 36, the gas from duct 28*a* enters duct 72*a* through the second face 71 of the valve controller body 37 and passes through channel 50 and port 49 into the second volume 48 of the piston chamber 40.

Under the inventive pneumatic control of the valve assembly 11, as will be better understood further herein, depletion of the mixed gases from the second set 151 of storage chambers to a fluid pressure less than a threshold value below the fluid pressure of the second gas charging second canister 148 of the first set 144 of storage chambers of storage chambers will result in mechanical transition of the valve assembly 11, and hence the pneumatic arrangement 10, from the second operable state to its first operable state. As will be appreciated by those of ordinary skill in the art, in light of this exemplary description, this process continues in automated transition between states so long as first and second gas sources 158, 159 each provide at least a minimum pressure of first and second gases, respectively.

Referring now to FIGS. 1 and 38A through 44D, the preferred method of operation of the pneumatic arrangement 10 of the present inventions is now described. In preparation for use, the valve assembly 11, as previously described in detail, is integrated into the pneumatic arrangement 10, as shown in FIG. 1, and as also previously described in detail. With the pneumatic arrangement 10 configured as shown in, and described with respect to, FIG. 1, the first and second pressure regulators 160, 169 are set to appropriate pressures, and the valves 163, 172 are opened to provide fluid flow from the first and second gas sources 158, 159, to the valve assembly 11, and ultimately to the mixed gas consumer 196.

As previously noted, FIGS. 38A through 44D omit, for clarity, details of the pneumatic arrangement 10 beyond the valve assembly 11. It is to be understood, however, that the following discussions are with reference to the preferred implementation of the pneumatic arrangement 10. As a result, these discussions should be read as though the full arrangement 10 is shown in each of the figures, although the figures depict only particular details of the valve assembly 11. Further, for purposes of explanation, it will be assumed that the pneumatic arrangement 10 of the present invention begins its operation in the first operable state, as shown in FIGS. 38A through 38D. Those of ordinary skill in the art will recognize, however, in light of this exemplary description, that the initial state could be either the first operable state or the second operable state.

FIGS. 38A through 38D show the valve assembly 11 in the first operable state of the pneumatic arrangement 10, and with the pressures of the gases in the first set 144 of storage chambers being substantially equal to the pressures of the gases in the second set 151 of storage chambers, as is the case when both sets 144, 151 are fully charged—that is, neither set 144, 151 has been depleted through consumption of the contained gases. In the depicted first operable state of the pneumatic arrangement 10, the valve assembly operates to mix, or blend, the gases of the first set 144 of storage chambers—first canister 145 and second canister 148—for delivery to the mixed gas consumer 196, while charging the gases of the second set 151 of storage chambers—third canister 152 and fourth canister 155—by providing fluid communication between the first gas source 158 and the third canister 152 and fluid communication between the second gas source 159 and the fourth canister 155.

Additionally, the first gas, in the full pressure as provided from the first gas source 158, is introduced, through the first pressure port 42, to the first volume 41 of the piston chamber 40, and the mixed gases from the first set 144 of storage chambers are introduced, through the second pressure port 49, to the second volume 48 of the piston chamber 40. As particularly shown in FIG. 38C, with the gas pressure in the first volume 41 of the piston chamber 40 being substantially equal to the gas pressure in the second volume 48 of the piston chamber 40, the floating piston 94 remains substantially centered between the first and second spring shoulders 90, 104, and the first and second piston springs 93, 103 are in substantially the same states of compression. With no longitudinal force being applied to the shift rod 75, and therefore no force being exerted against the detent balls 126, the detent balls 126 remain firmly within the first circumferential groove 110 about the body 109 of the shift rod stop member 108, as particularly shown in FIG. 38D.

FIGS. 39A through 39D show the valve assembly 11 still in the first operable state of the pneumatic arrangement 10, but with the pressures of the gases in the first set 144 of storage chambers being an initial quantity less than the pressures of the gases in the second set 151 of storage chambers, as is the case when the second set 151 remains fully charged as the first set 144 has been partially depleted through consumption of the contained gases. Because of the partial depletion of the gases in the first set 144 of storage chambers, the pressure of the mixed gases as introduced to the second volume 48 of the piston chamber 40 will be less than the pressure of the first gas as introduced to the first volume 41 of the piston chamber 40.

Figure 39A:
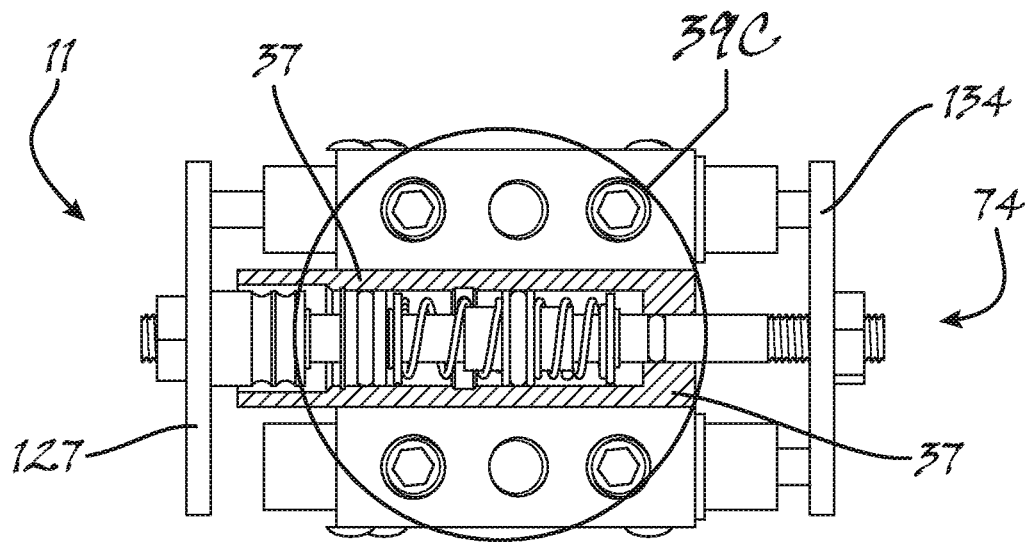
FIG. 39A shows, in an elevational breakout view cutting away the second detent and cross-sectioning the valve controller body through the longitudinal axis of the shift rod assembly, various details of the valve assembly, as the valve assembly is in the first operable state and beginning to transition to the second operable state as the fluid pressure within the second volume of the piston chamber begins to decrease relative to the fluid pressure within the first volume of the piston chamber.
Figure 39B:
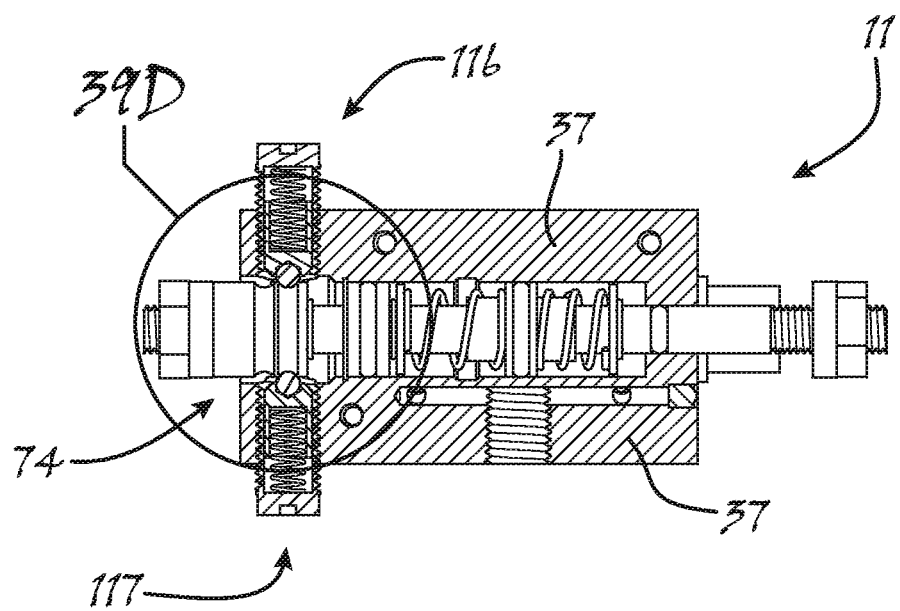
FIG. 39B shows, in a plan breakout view cross-sectioning the valve controller body and the body, ball carrier and ball of each detent through the longitudinal axis of the shift rod assembly, various details of the valve assembly, as the valve assembly is in the state of FIG. 39A.
Figure 39D:
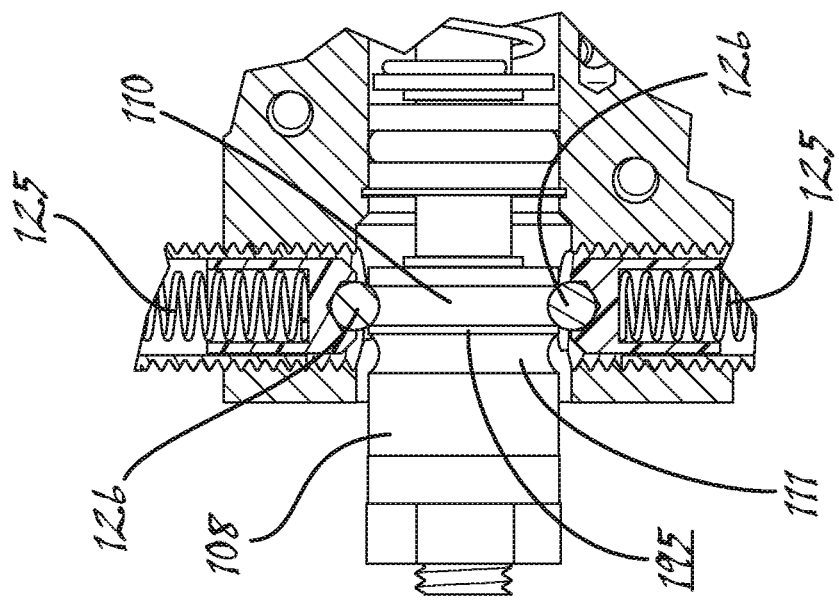
FIG. 39D shows, in a detail view taken from FIG. 39B, details of the operation of the detents on the shift rod stop member, as the valve assembly is in the state of FIG. 39A.
Figure 39C:
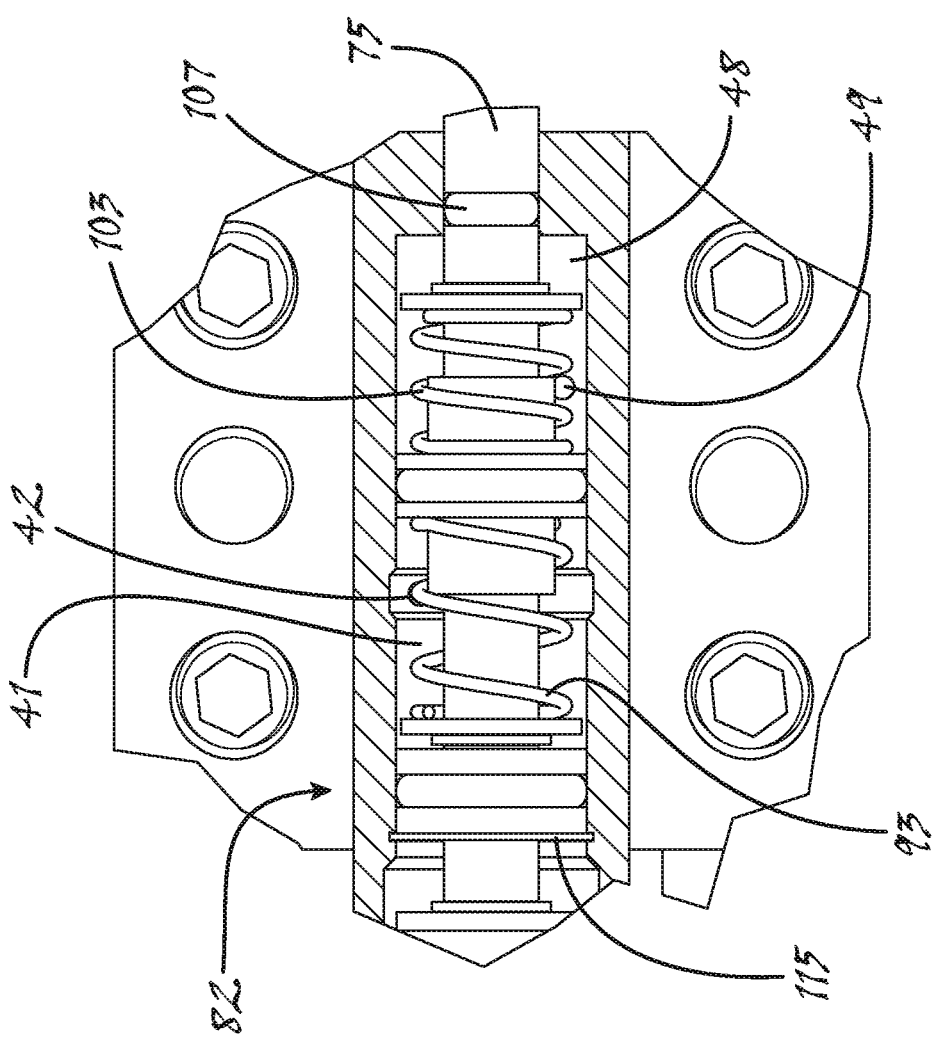
FIG. 39C shows, in a detail view taken from FIG. 39A, details of the shift rod assembly, as the valve assembly is in the state of FIG. 39A.

As a result of the increased pressure in the first volume 41 of the piston chamber 40 relative to the pressure in the second volume 48 of the piston chamber 40, the first volume 41 will expand as the relatively increased pressure in the first volume 41 causes the floating piston 94 to shift in the direction of the second volume 48. As the floating piston 94 shifts in the direction of the second volume 48, the floating piston 94 compresses the second piston spring 103 against the second spring shoulder 104, as particularly shown in FIG. 39C. Although longitudinal force is thereby applied to the shift rod 75 in the direction of the second end 76*b* of the shift rod 75, the detent balls 126 remain in place within the first circumferential groove 110 about the body 109 of the shift rod stop member 108 under the force of the detent springs 125, as shown in FIG. 39D. To this end, the provision and functional arrangement of the detents 116, 117 act as an implementation of an adjustable force resisting mechanism adapted to oppose translation of the shift rod 75 until a threshold target depletion of gases in the first set 144 of storage chambers has been attained.

FIGS. 40A through 40D show the valve assembly 11 mid-stroke in the beginning phase of transition from the first operable state of the pneumatic arrangement 10 to the second operable state of the pneumatic arrangement 10, and with the pressures of the gases in the first set 144 of storage chambers being at a threshold quantity less than the pressures of the gases in the second set 151 of storage chambers, as is the case when the second set 151 remains fully charged as the first set 144 has been critically depleted through consumption of the contained gases. Because of the substantial depletion of the gases in the first set 144 of storage chambers, the pressure of the mixed gases as introduced to the second volume 48 of the piston chamber 40 will be considerably less than the pressure of the first gas as introduced to the first volume 41 of the piston chamber 40.

Figure 40A:
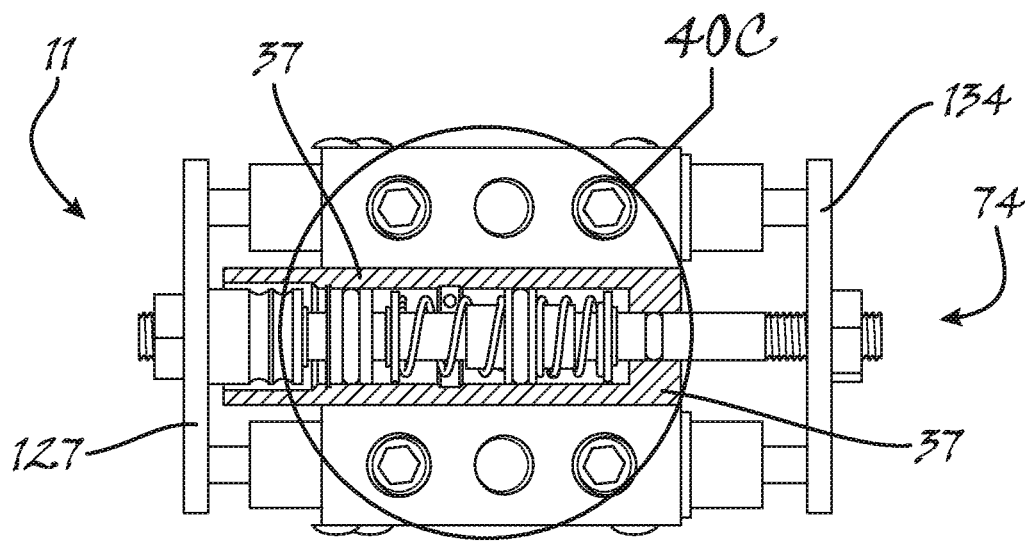
FIG. 40A shows, in an elevational breakout view cutting away the second detent and cross-sectioning the valve controller body through the longitudinal axis of the shift rod assembly, various details of the valve assembly, as the valve assembly is mid-stroke between the first operable state and the second operable state as the fluid pressure within the second volume of the piston chamber continues to decrease relative to the fluid pressure within the first volume of the piston chamber.
Figure 40B:
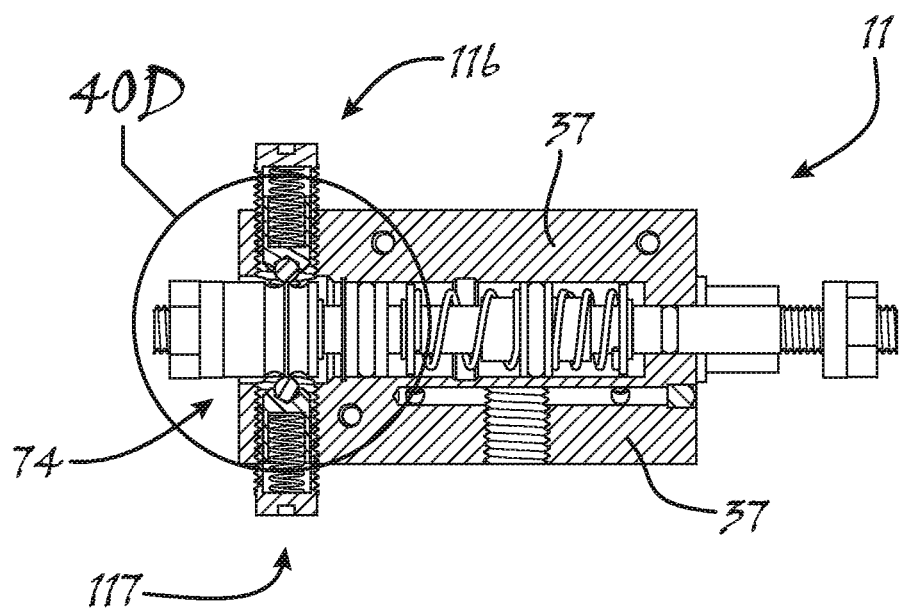
FIG. 40B shows, in a plan breakout view cross-sectioning the valve controller body and the body, ball carrier and ball of each detent through the longitudinal axis of the shift rod assembly, various details of the valve assembly, as the valve assembly is in the state of FIG. 40A.
Figure 40D:
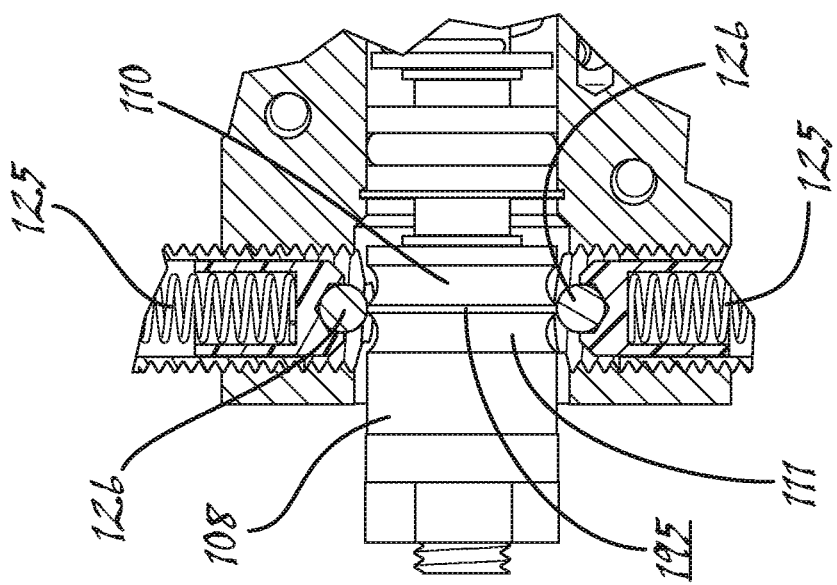
FIG. 40D shows, in a detail view taken from FIG. 38B, details of the operation of the detents on the shift rod stop member, as the valve assembly is in the state of FIG. 40A.
Figure 40C:
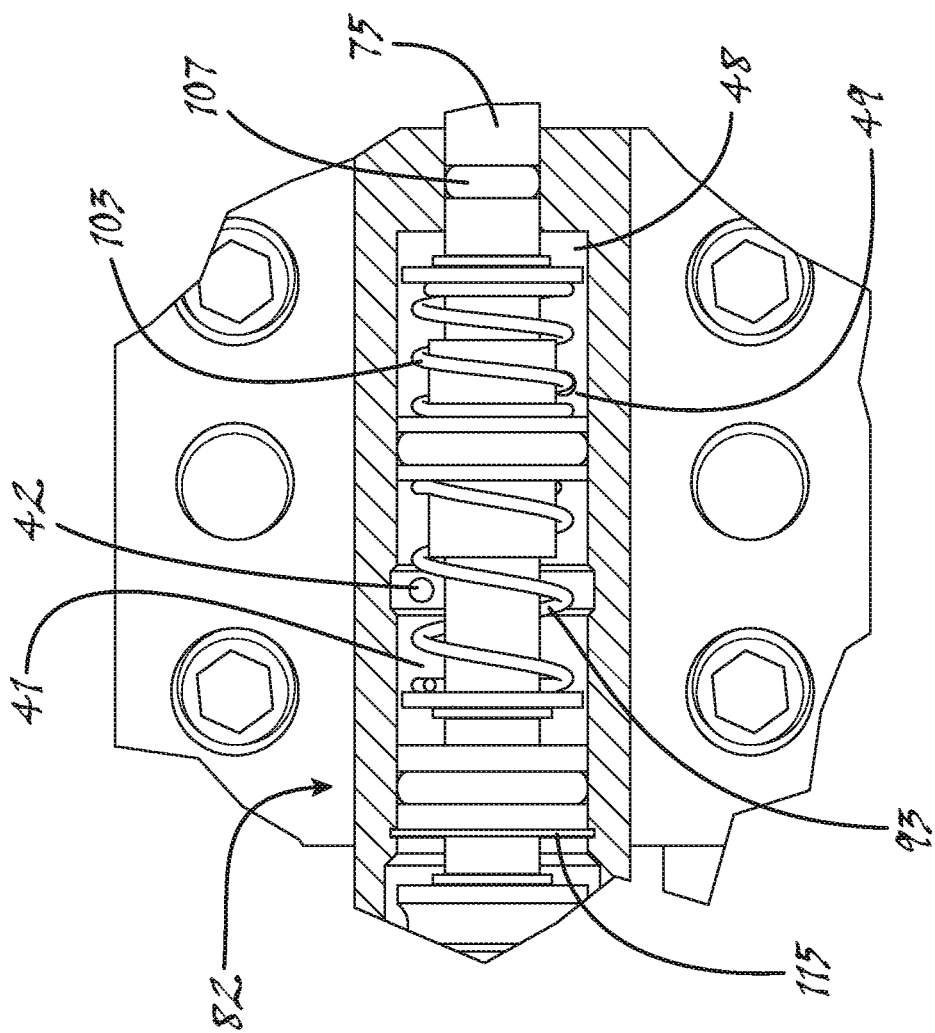
FIG. 40C shows, in a detail view taken from FIG. 40A, details of the shift rod assembly, as the valve assembly is in the state of FIG. 40A.

As a result of the substantially increased pressure in the first volume 41 of the piston chamber 40 relative to the pressure in the second volume 48 of the piston chamber 40, the first volume 41 will continue to expand as the relatively increased pressure in the first volume 41 causes the floating piston 94 to shift farther in the direction of the second volume 48. As the floating piston 94 continues to shift in the direction of the second volume 48, the floating piston 94 further compresses the second piston spring 103 against the second spring shoulder 104, as particularly shown in FIG. 40C. At this point in operation, the longitudinal force thereby applied to the shift rod 75 in the direction of the second end 76b of the shift rod 75 is sufficient to cause each detent ball 126 to retract, against the force of its detent spring 125, toward its detent body 118, as shown in FIG. 40D. As also shown in FIG. 40D, retraction of the detent balls 126 out of the first circumferential groove 110 about the body 109 of the shift rod stop member 108, and onto the outer cylindrical surface 195 of the body 109, enables longitudinal translation of the shift rod stop member 108, and therefore also the shift rod 75.

FIGS. 41A through 41D show the valve assembly 11 mid-stroke in the transition from the first operable state of the pneumatic arrangement 10 to the second operable state of the pneumatic arrangement 10, but with the pressures of the gases in the first set 144 of storage chambers having returned to being substantially equal to the pressures of the gases in the second set 151 of storage chambers. This pressure equalization, which will be a rapid change, is the result of the valve actuators 21, 32 of first and second spool valves 13, 24 having moved sufficiently to cause the first and second spool valves 13, 24 to transition from their respective first operable states to their respective second operable states. With the first and second spool valves 13, 24, each in their second operable state, the second gas, in the full pressure as provided from the second gas source 159, is introduced, through the second pressure port 49, to the second volume 48 of the piston chamber 40, and the mixed gases from the second set 151 of storage chambers are introduced, through the first pressure port 42, to the first volume 41 of the piston chamber 40. At this point, the contained gases of the second set 151 of storage chambers have not yet been depleted through consumption, and therefore the pressure of the mixed gases from the second set 151 is substantially equal to the pressure of the second gas from the second gas source 159.

Figure 41A:
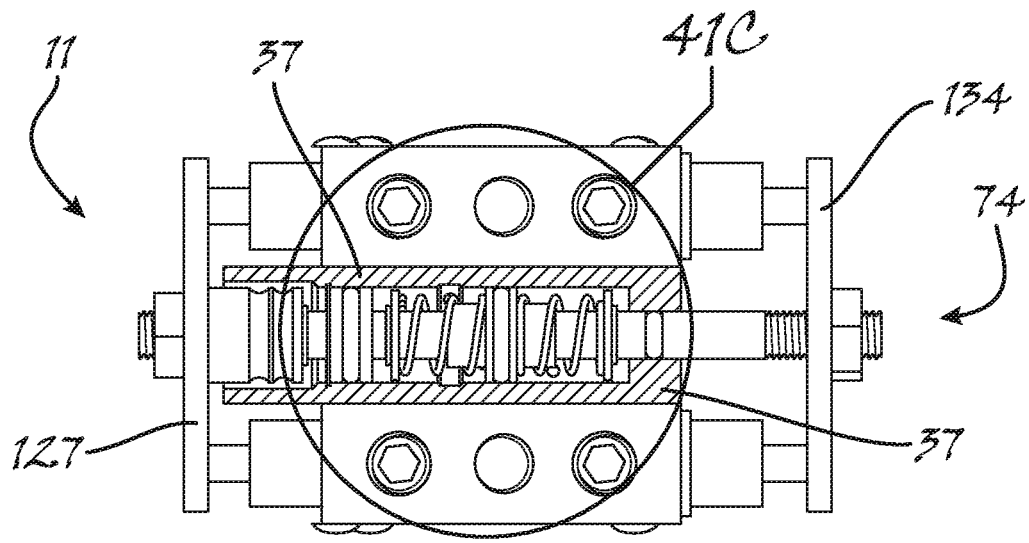
FIG. 41A shows, in an elevational breakout view cutting away the second detent and cross-sectioning the valve controller body through the longitudinal axis of the shift rod assembly, various details of the valve assembly, as the valve controller is mid-stroke between the first operable state and the second operable state (or, alternatively, is mid-stroke between the second operable state and the first operable state) immediately following substantial equalization of the fluid pressures within the first volume of the piston chamber and the second volume of the piston chamber.
Figure 41B:
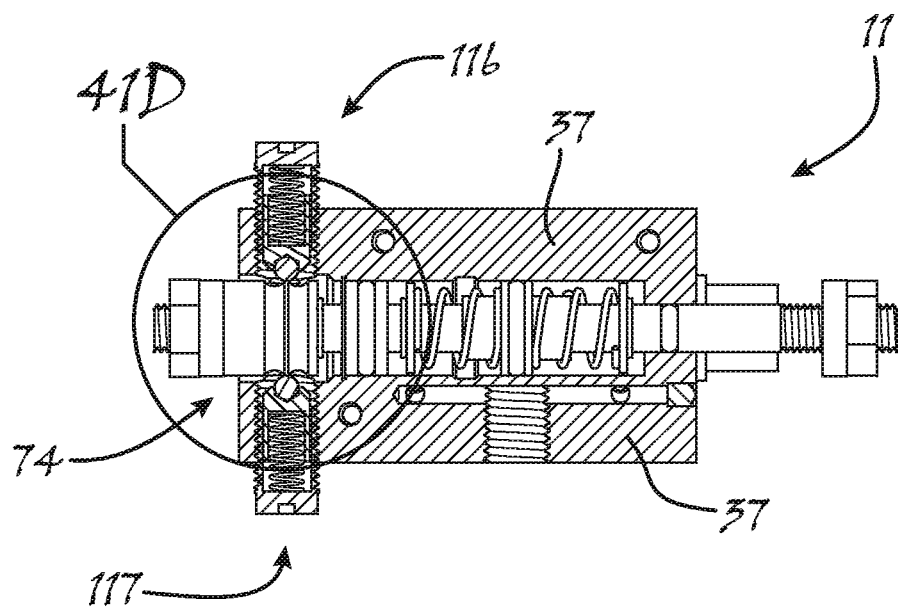
FIG. 41B shows, in a plan breakout view cross-sectioning the valve controller body and the body, ball carrier and ball of each detent through the longitudinal axis of the shift rod assembly, various details of the valve assembly, as the valve assembly is in the state of FIG. 41A.
Figure 41D:
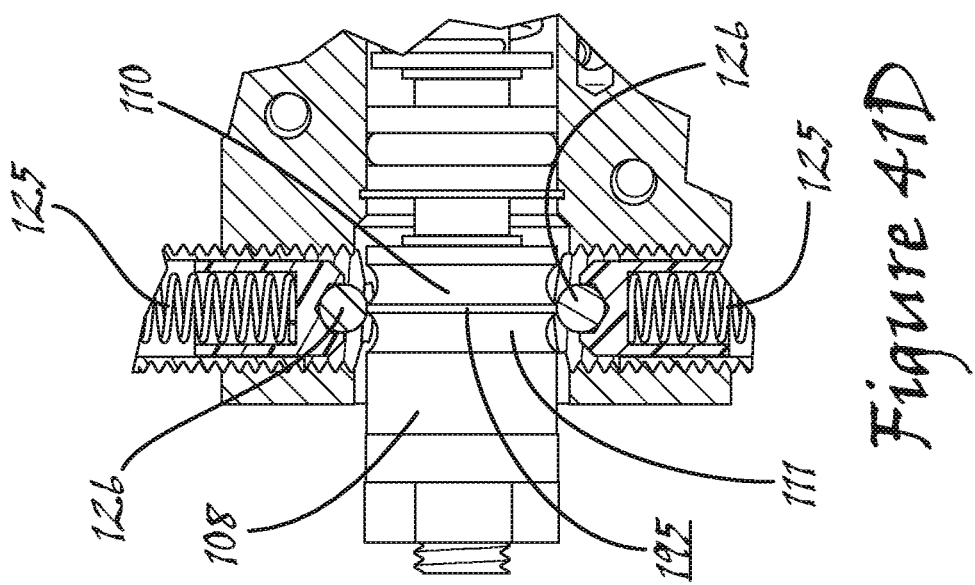
FIG. 41D shows, in a detail view taken from FIG. 41B, details of the operation of the detents on the shift rod stop member, as the valve assembly is in the state of FIG. 41A.
Figure 41C:
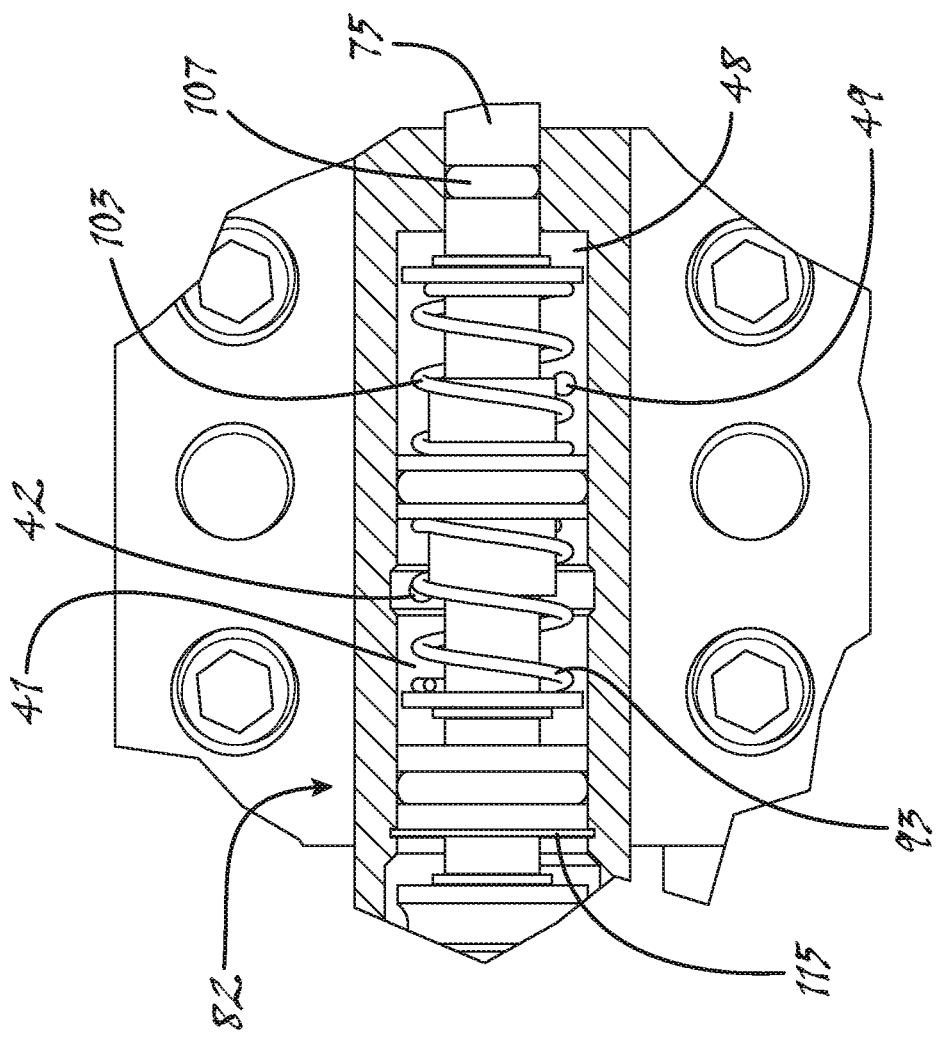
FIG. 41C shows, in a detail view taken from FIG. 41A, details of the shift rod assembly, as the valve assembly is in the state of FIG. 41A.
Figure 42A:
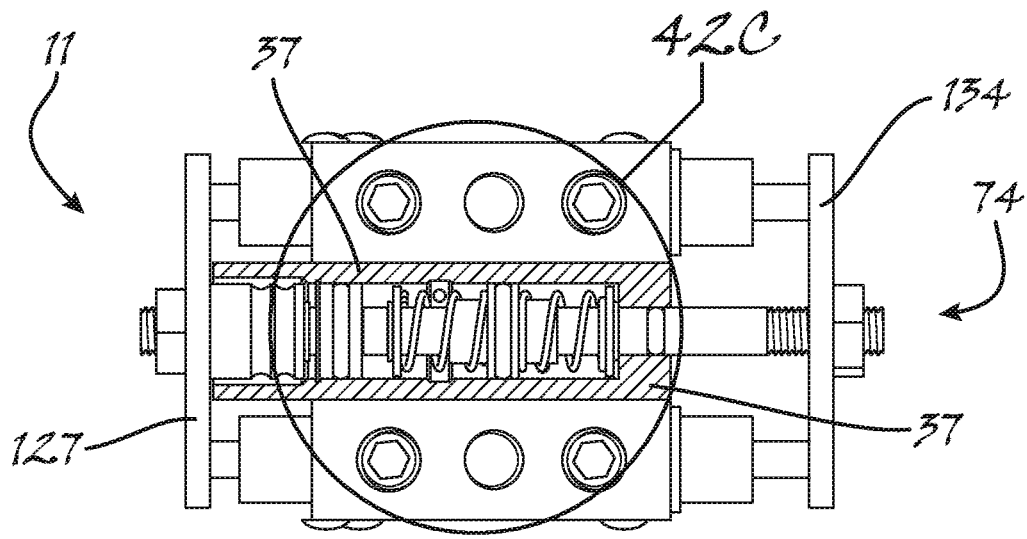
FIG. 42A shows, in an elevational breakout view cutting away the second detent and cross-sectioning the valve controller body through the longitudinal axis of the shift rod assembly, various details of the valve assembly, as the valve assembly is in the second operable state and the fluid pressures within the first volume of the piston chamber and the second volume of the piston chamber are substantially balanced.
Figure 42B:
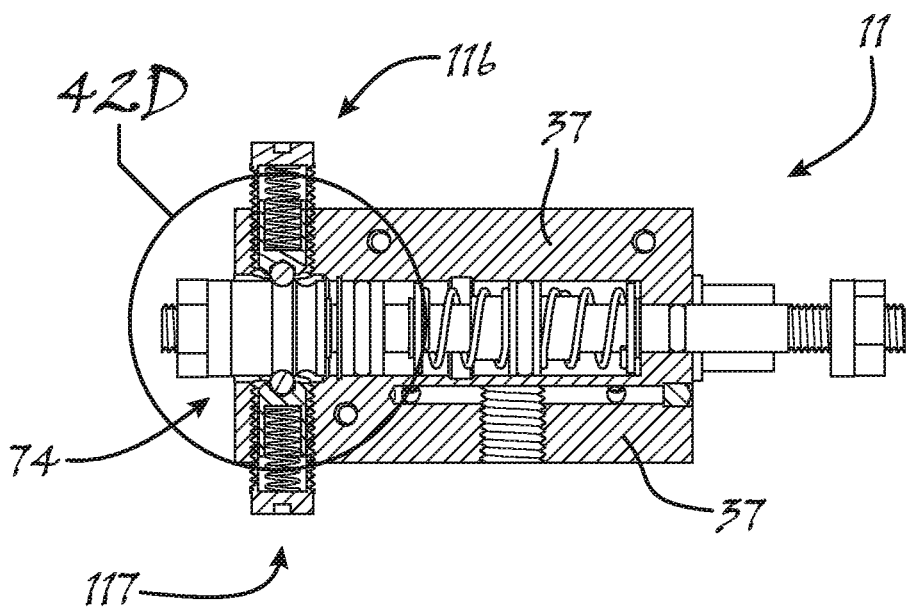
FIG. 42B shows, in a plan breakout view cross-sectioning the valve controller body and the body, ball carrier and ball of each detent through the longitudinal axis of the shift rod assembly, various details of the valve assembly, as the valve assembly is in the state of FIG. 42A.
Figure 42D:
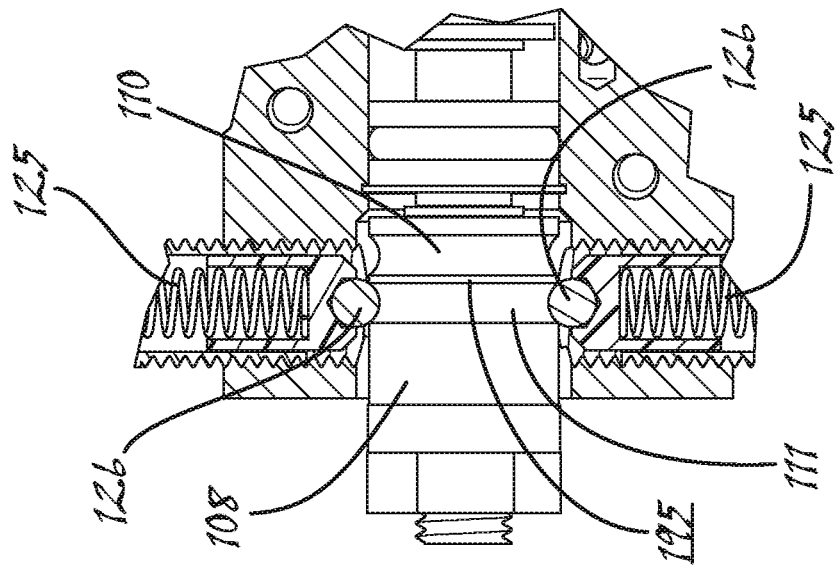
FIG. 42D shows, in a detail view taken from FIG. 38B, details of the operation of the detents on the shift rod stop member, as the valve assembly is in the state of FIG. 42A.
Figure 42C:
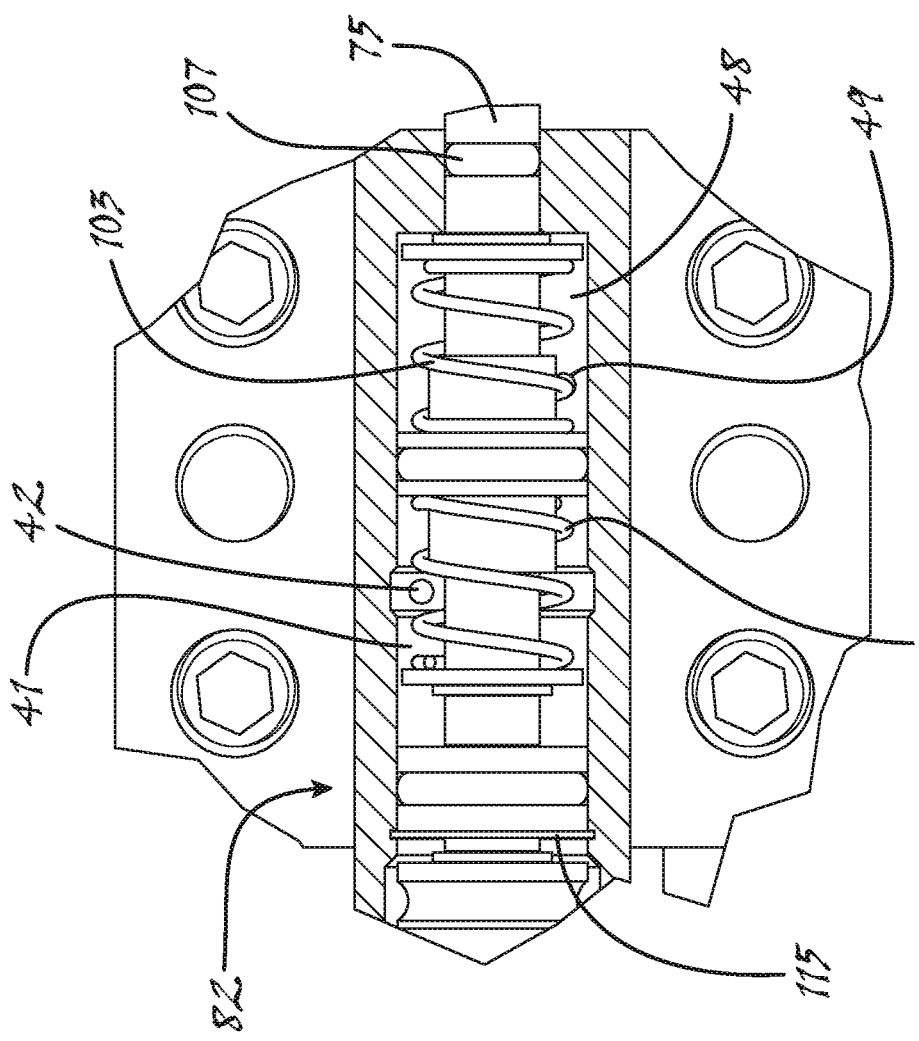
FIG. 42C shows, in a detail view taken from FIG. 42A, details of the shift rod assembly, as the valve assembly is in the state of FIG. 42A.
Figure 43A:
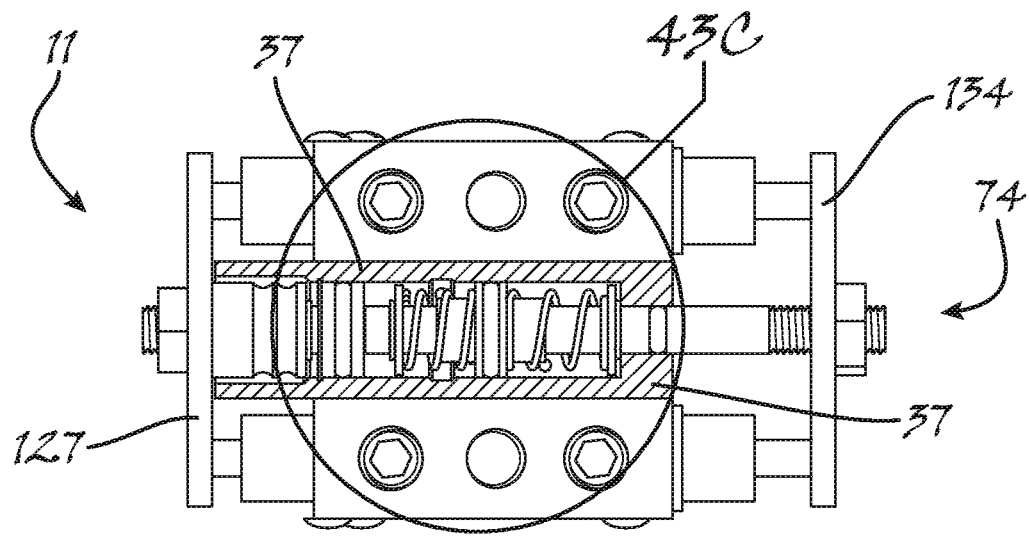
FIG. 43A shows, in an elevational breakout view cutting away the second detent and cross-sectioning the valve controller body through the longitudinal axis of the shift rod assembly, various details of the valve assembly, as the valve assembly is in the second operable state and beginning to transition to the first operable state as the fluid pressure within the first volume of the piston chamber begins to decrease relative to the fluid pressure within the second volume of the piston chamber.
Figure 43B:
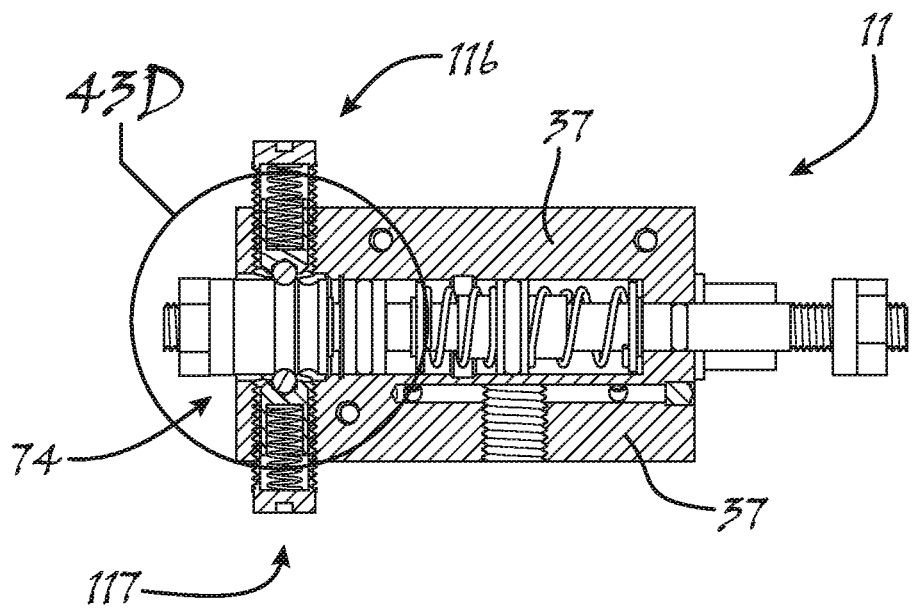
FIG. 43B shows, in a plan breakout view cross-sectioning the valve controller body and the body, ball carrier and ball of each detent through the longitudinal axis of the shift rod assembly, various details of the valve assembly, as the valve assembly is in the state of FIG. 43A.

It is noted, though, that as depicted in FIG. 41D the detent balls 126 have not, as desired, properly engaged within the second circumferential groove 111 about the body 109 of the shift rod stop member 108. In order to ensure that this undesirable condition does not persist, if it should arise, the inventive valve assembly 11 further acts as a positive actuation mechanism, whereby energy stored in the compressed spring 103 in earlier stages of transition between states is released to urge the shift rod 75 into proper position. To this end, as will be better understood further herein, the provision and arrangement of the piston springs 93, 103 and the floating piston 94 act as an implementation of a force storage mechanism, which is adapted to facilitate transition of the shift rod 75 upon substantial equalization of the fluid pressures within the first and second volumes 41, 48 of the piston chamber 40. As will also be better understood further herein, in at least some implementations of the present inventions the provision and arrangement of the detents 116, 117 can be said to form a part of the force storage mechanism. In particular, it is noted that the adjustable force resisting function of the detents 116, 117 enables more or less force to be stored in the piston springs 93, 103 as more or less longitudinal force on the shift rod 75 is required to dislodge the detent balls 126 from within a circumferential groove 110, 111.

Upon equalization of the pressures within the first and second volumes 41, 48 of the piston chamber 40, the floating piston 94 no longer exerts a compressive force on the second piston spring 103. As particularly shown in FIG. 41C, the second piston spring 103 rapidly releases the compressive force stored therein, and returns to being of equal compression to the first piston spring 93. This rapid release of the force from the second piston spring 103 is exerted equally on the second face 98 of the piston body 95 and the second spring shoulder 104. Whereas the second spring shoulder 104 is fixed with respect to the shift rod 75, the piston body 95 floats with respect to the shift rod 75, and, additionally, any direct transfer of force between the piston body 95 and the shift rod 75 is dampened by the first piston spring 93. As a result, a net positive force is applied to the shift rod 75 in the direction of the second end 76b of the shift rod 75, which in turn will cause the shift rod stop member 108 to move into position for the desired engagement of the detent balls 126 within the second circumferential groove 111 about the body 109 of the shift rod stop member 108. Additionally, it is noted that once the balls 126 begin to engage the arcuate face of the second circumferential groove 111 about the body 109 of the shift rod stop member 108, the force of the detent springs 125 will drive the balls 126 into the second groove 111, which will have the effect of "pushing" the shift rod stop member 108, and affixed shift rod 75, into the desired position. In any case, at this point the valve assembly 11 will be in the second operable state of the pneumatic arrangement 10, as described with respect to FIGS. 42A through 42D.

FIGS. 42A through 42D show the valve assembly 11 in the second operable state of the pneumatic arrangement 10, and with the pressures of the gases in the first set 144 of storage chambers being substantially equal to the pressures of the gases in the second set 151 of storage chambers, as is the case when both sets 144, 151 are fully charged—that is, neither set 144, 151 has been depleted through consumption of the contained gases. In the depicted second operable state of the pneumatic arrangement 10, the valve assembly operates to mix, or blend, the gases of the second set 151 of storage chambers—third canister 152 and fourth canister 155—for delivery to the mixed gas consumer 196, while charging the gases of the first set 144 of storage chambers—first canister 145 and second canister 148—by providing fluid communication between the first gas source 158 and the first canister 145 and fluid communication between the second gas source 159 and the second canister 148.

Additionally, the second gas, in the full pressure as provided from the second gas source 159, is introduced, through the second pressure port 49, to the second volume 48 of the piston chamber 40, and the mixed gases from the second set 151 of storage chambers are introduced, through the first pressure port 42, to the first volume 41 of the piston chamber 40. As particularly shown in FIG. 42C, with the gas pressure in the first volume 41 of the piston chamber 40 being substantially equal to the gas pressure in the second volume 48 of the piston chamber 40, the floating piston 94 remains substantially centered between the first and second spring shoulders 90, 104, and the first and second piston springs 93, 103 are in substantially the same states of compression. With no longitudinal force being applied to the shift rod 75, and therefore no force being exerted against the detent balls 126, the detent balls 126 remain firmly within the second circumferential groove 111 about the body 109 of the shift rod stop member 108, as particularly shown in FIG. 42D.

FIGS. 43A through 43D show the valve assembly 11 still in the second operable state of the pneumatic arrangement 10, but with the pressures of the gases in the second set 151 of storage chambers being an initial quantity less than the pressures of the gases in the first set 144 of storage chambers, as is the case when the first set 144 remains fully charged as the second set 151 has been partially depleted through consumption of the contained gases. Because of the partial depletion of the gases in the second set 151 of storage chambers, the pressure of the mixed gases as introduced to the first volume 41 of the piston chamber 40 will be less than the pressure of the second gas as introduced to the second volume 48 of the piston chamber 40.

As a result of the increased pressure in the second volume 48 of the piston chamber 40 relative to the pressure in the first volume 41 of the piston chamber 40, the second volume 48 will expand as the relatively increased pressure in the second volume 48 causes the floating piston 94 to shift in the direction of the first volume 41. As the floating piston 94 shifts in the direction of the first volume 41, the floating piston 94 compresses the first piston spring 93 against the first spring shoulder 90, as particularly shown in FIG. 43C. Although longitudinal force is thereby applied to the shift rod 75 in the direction of the first end 76a of the shift rod 75, the detent balls 126 remain in place within the second circumferential groove 111 about the body 109 of the shift rod stop member 108 under the force of the detent springs 125, as shown in FIG. 43D. To this end, and as previously discussed, the provision and functional arrangement of the detents 116, 117 act as an implementation of an adjustable force resisting mechanism adapted to oppose translation of the shift rod 75 until a threshold target depletion of gases in the second set 151 of storage chambers has been attained.

FIGS. 44A through 44D show the valve assembly 11 mid-stroke in the beginning phase of transition from the second operable state of the pneumatic arrangement 10 to the first operable state of the pneumatic arrangement 10, and with the pressures of the gases in the second set 151 of storage chambers being at a threshold quantity less than the pressures of the gases in the first set 144 of storage chambers, as is the case when the first set 144 remains fully charged as the second set 151 has been critically depleted through consumption of the contained gases. Because of the substantial depletion of the gases in the second set 151 of storage chambers, the pressure of the mixed gases as introduced to the first volume 41 of the piston chamber 40 will be considerably less than the pressure of the second gas as introduced to the second volume 48 of the piston chamber 40.

Figure 44A:
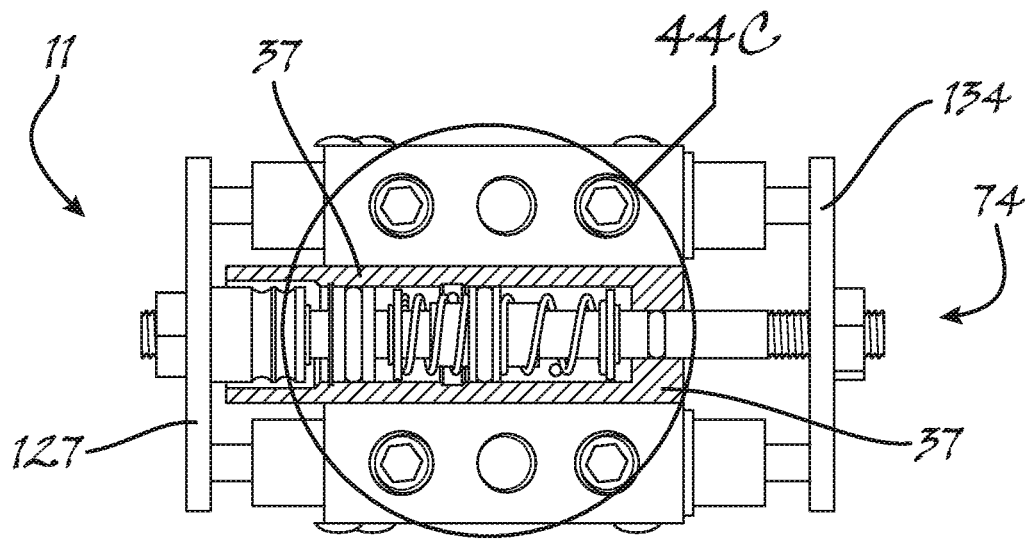
FIG. 44A shows, in an elevational breakout view cutting away the second detent and cross-sectioning the valve controller body through the longitudinal axis of the shift rod assembly, various details of the valve assembly, as the valve assembly is mid-stroke between the second operable state and the first operable state as the fluid pressure within the first volume of the piston chamber continues to decrease relative to the fluid pressure within the second volume of the piston chamber.
Figure 44B:
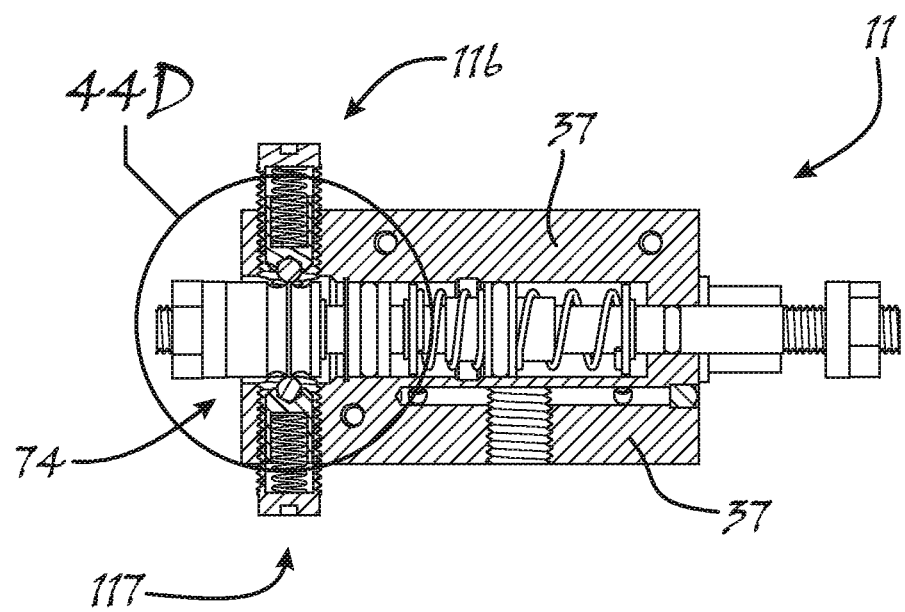
FIG. 44B shows, in a plan breakout view cross-sectioning the valve controller body and the body, ball carrier and ball of each detent through the longitudinal axis of the shift rod assembly, various details of the valve assembly, as the valve assembly is in the state of FIG. 44A.
Figure 44D:
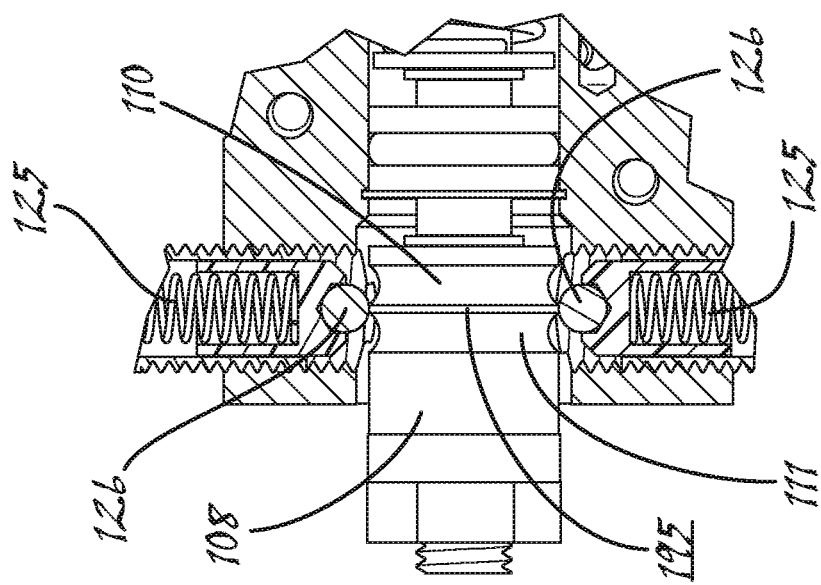
FIG. 44D shows, in a detail view taken from FIG. 44B, details of the operation of the detents on the shift rod stop member, as the valve assembly is in the state of FIG. 44A.
Figure 44C:
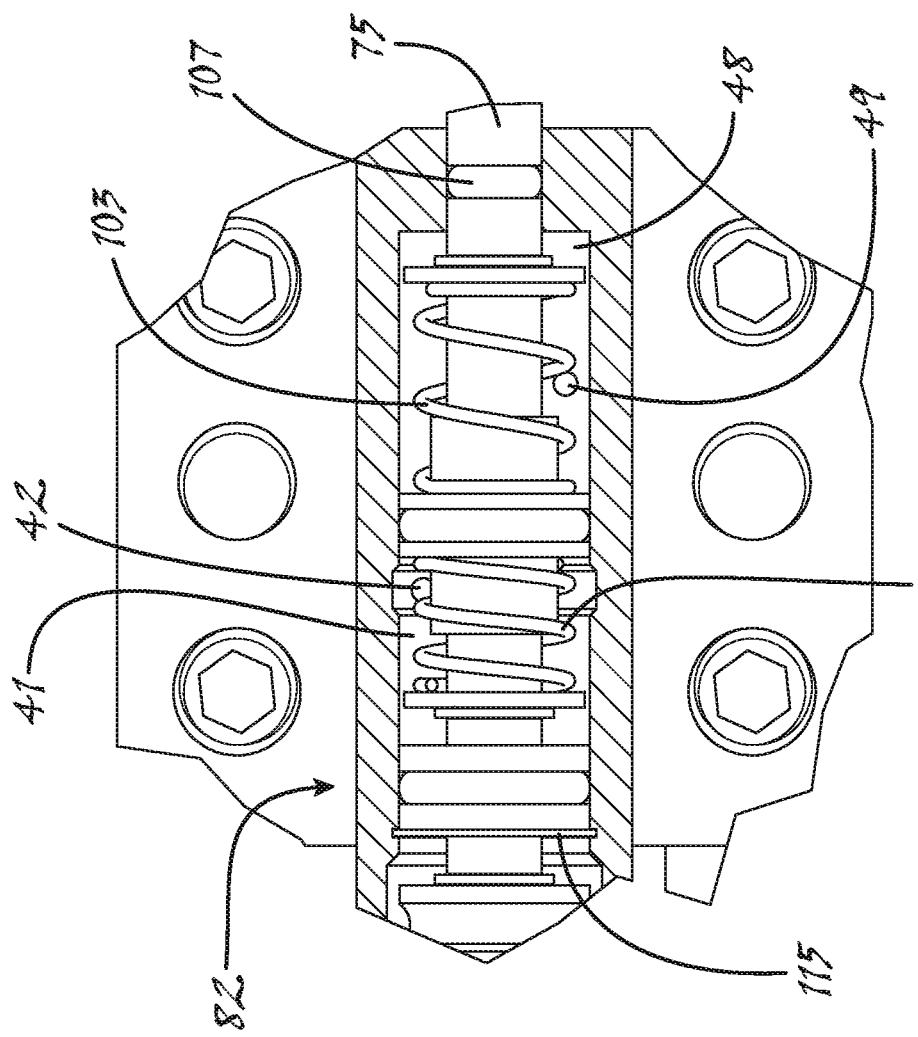
FIG. 44C shows, in a detail view taken from FIG. 44A, details of the shift rod assembly, as the valve assembly is in the state of FIG. 44A.

As a result of the substantially increased pressure in the second volume 48 of the piston chamber 40 relative to the pressure in the first volume 41 of the piston chamber 40, the second volume 48 will continue to expand as the relatively increased pressure in the second volume 48 causes the floating piston 94 to shift farther in the direction of the first volume 41. As the floating piston 94 continues to shift in the direction of the first volume 41, the floating piston 94 further compresses the first piston spring 93 against the first spring shoulder 90, as particularly shown in FIG. 44C. At this point in operation, the longitudinal force thereby applied to the shift rod 75 in the direction of the first end 76a of the shift rod 75 is sufficient to cause each detent ball 126 to retract, against the force of its detent spring 125, toward its detent body 118, as shown in FIG. 44D. As also shown in FIG. 44D, retraction of the detent balls 126 out of the second circumferential groove 111 about the body 109 of the shift rod stop member 108, and onto the outer cylindrical surface 195 of the body 109, enables longitudinal translation of the shift rod stop member 108, and therefore also the shift rod 75.

As previously discussed, FIGS. 41A through 41D show the valve assembly 11 mid-stroke in the transition from the first operable state of the pneumatic arrangement 10 to the second operable state of the pneumatic arrangement 10, but with the pressures of the gases in the first set 144 of storage chambers having returned to being substantially equal to the pressures of the gases in the second set 151 of storage chambers. FIGS. 41A through 41D also, however, identically show the valve assembly 11 mid-stroke in the transition from the second operable state of the pneumatic arrangement 10 to the first operable state of the pneumatic arrangement 10, but with the pressures of the gases in the first set 144 of storage chambers having returned to being substantially equal to the pressures of the gases in the second set 151 of storage chambers. This pressure equalization, which will be a rapid change, is the result of the valve actuators 21, 32 of first and second spool valves 13, 24 having moved sufficiently to cause the first and second spool valves 13, 24 to transition from their respective second operable states to their respective first operable states. With the first and second spool valves 13, 24, each in their first operable state, the first gas, in the full pressure as provided from the first gas source 158, is introduced, through the first pressure port 42, to the first volume 41 of the piston chamber 40, and the mixed gases from the first set 144 of storage chambers are introduced, through the second pressure port 49, to the second volume 48 of the piston chamber 40. At this point, the contained gases of the first set 144 of storage chambers have not yet been depleted through consumption, and therefore the pressure of the mixed gases from the first set 144 is substantially equal to the pressure of the first gas from the first gas source 158.

It is noted, though, that as depicted in FIG. 41D the detent balls 126 have not, as desired, properly engaged within the first circumferential groove 110 about the body 109 of the shift rod stop member 108. In order to ensure that this undesirable condition does not persist, if it should arise, the inventive valve assembly 11 again further acts as a positive actuation mechanism, whereby energy stored in the compressed spring 93 in earlier stages of transition between states is released to urge the shift rod 75 into proper position. Upon equalization of the pressures within the first and second volumes 41, 48 of the piston chamber 40, the floating piston 94 no longer exerts a compressive force on the first piston spring 93. As particularly shown in FIG. 41C, the first piston spring 93 rapidly releases the compressive force stored therein, and returns to being of equal compression to the second piston spring 103. This rapid release of the force from the first piston spring 93 is exerted equally on the first face 97 of the piston body 95 and the first spring shoulder 90. Whereas the first spring shoulder 90 is fixed with respect to the shift rod 75, the piston body 95 floats with respect to the shift rod 75, and, additionally, any direct transfer of force between the piston body 95 and the shift rod 75 is dampened by the second piston spring 103. As a result, a net positive force is applied to the shift rod 75 in the direction of the first end 76a of the shift rod 75, which in turn will cause the shift rod stop member 108 to move into position for the desired engagement of the detent balls 126 within the first circumferential groove 110 about the body 109 of the shift rod stop member 108. Additionally, it is noted that once the balls 126 begin to engage the arcuate face of the first circumferential groove 110 about the body 109 of the shift rod stop member 108, the force of the detent springs 125 will drive the balls 126 into the first groove 110, which will have the effect of "pushing" the shift rod stop member 108, and affixed shift rod 75, into the desired position. In any case, at this point the valve assembly 11 will again be in the first operable state of the pneumatic arrangement 10, as previously described in detail with respect to FIGS. 38A through 38D. As previously noted, this process continues in automated transition between states so long as the first and second gas sources 158, 159 each provide at least a minimum pressure of first and second gases, respectively.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, in an embodiment where only the first end 76a need extend from the valve controller body 37 for interfacing with one or more actuators of the valve block 12, the second end 76b of the shift rod 75 may terminate in a shift rod guide 63 formed with a blind face rather than presenting a shift rod port through the valve controller body 37. In any case, because the scope of the present invention is much broader than any particular embodiment, the foregoing detailed description should not be construed as a limitation of the scope of the present invention, which is limited only by the claims appended hereto.

What is claimed is:

1. A fluid pressure operated valve controller, said valve controller comprising:
   a body having a first, longitudinal axis, a second axis transverse to said first axis, and inner walls about said first axis, said inner walls defining at least a piston chamber and a detent cavity;
   a shift rod adapted to interface with a valve actuator, said shift rod having a central axis collinear with said first, longitudinal axis of said body and being translatable along said central axis between a first position with respect to said body and a second position with respect to said body;
   a first seal member about said shift rod, said first seal member forming a substantially fluid tight seal between said shift rod and said inner walls of said body to define a first end of said piston chamber;
   a second seal member about said shift rod, said second seal member forming a substantially fluid tight seal between said shift rod and said inner walls of said body to define a second end of said piston chamber;
   a floating piston slidingly affixed about said shift rod, said floating piston forming a substantially fluid tight seal between said shift rod and said inner walls of said body to segregate said piston chamber into a first volume adjacent said first end of said piston chamber and a second Volume adjacent said second end of said piston chamber;
   a first shoulder about said shift rod within said first volume and adjacent said first end of said piston chamber, and a first piston spring between said first shoulder and said floating piston;
   a second shoulder about said shift rod within said second volume and adjacent said second end of said piston chamber, and a second piston spring between said second shoulder and said floating piston;
   a stop member fixed in place about said shift rod within said detent cavity, said stop member having a first groove and a second groove substantially identical to said first groove, wherein the central plane through said second groove is longitudinally spaced apart from the central plane through said first groove by a distance equal to the distance that said shift rod translates between said first position and said second position;
   a first detent having a spring biased catch, said spring biased catch being oriented along said second, transverse axis of said body and being adapted to conformingly engage with said first groove when said shift rod is in said first position with respect to said body and with said second groove when said shift rod is in said second position with respect to said body; and
   a first fluid conduit from without said body to within said first volume and a second fluid conduit from without said body to within said second volume.

2. The fluid pressure operated valve controller as recited in claim 1, wherein said floating piston comprises:
   a piston body having a longitudinal bore substantially conforming to the exterior surface of said shift rod;
   a first piston seal retained in place about said shift rod between the surface of said bore and said shift rod;
   a sleeve about a central portion of said piston body; and
   a second piston seal retained in place about said sleeve between said sleeve of said floating piston and said inner walls of said body.

3. The fluid pressure operated valve controller as recited in claim 1, wherein said first seal member is slidingly affixed about said shift rod.

4. The fluid pressure operated valve controller as recited in claim 3, wherein said first seal member comprises:
   a sleeve about said shift rod;
   a first sealing element retained in place about said shift rod between the interior surface of said sleeve of said first seal and said shift rod; and
   a second sealing element retained in place about said sleeve between said sleeve of said first seal and said inner walls of said body.

5. The fluid pressure operated valve controller as recited in claim 1, wherein said second seal member is affixed about said shift rod within a shift rod guide defined by said inner walls of said body.

6. The fluid pressure operated valve controller as recited in claim 5, wherein said shift rod guide terminates in a blind face.

7. The fluid pressure operated valve controller as recited in claim 5, wherein said shift rod guide forms a shift rod port.

8. The fluid pressure operated valve controller as recited in claim 5, wherein said second seal member comprises a sealing element retained in place about said shift rod between said shift rod and said inner walls of said body.

9. The fluid pressure operated valve controller as recited in claim 1, wherein said spring biased catch is substantially spherical.

10. The fluid pressure operated valve controller as recited in claim 1, wherein a projecting portion of said spring biased catch is substantially hemispherical.

11. The fluid pressure operated valve controller as recited in claim 1, wherein said detent further comprises an externally threaded body adapted to be received by a correspondingly tapped hole along said second, transverse axis through said body.

12. The fluid pressure operated valve controller as recited in claim 1, said valve controller further comprising a second detent having a spring biased catch, said spring biased catch of said second detent being adapted to conformingly engage with said first groove when said shift rod is in said first position with respect to said body and with said second groove when said shift rod is in said second position with respect to said body.

13. The fluid pressure operated valve controller as recited in claim 12, wherein said spring biased catch of said second detent is oriented along said second, transverse axis of said body.

14. The fluid pressure operated valve controller as recited in claim 12, wherein said spring biased catch of said second detent is oriented along a third axis transverse to said first axis of said body.

15. The fluid pressure operated valve controller as recited in claim 1, said valve controller further comprising a first pressurized fluid source in fluid communication through said first conduit with said first volume and a second pressurized fluid source in fluid communication through said second conduit with said second volume.

16. The fluid pressure operated valve controller as recited in claim 15, wherein said first pressurized fluid source and said second pressurized fluid source each comprise a gas source.

17. A pneumatic arrangement for continuous delivery of a volumetrically proportioned mixture of gases, said pneumatic arrangement comprising:
a first pressurized gas source and a second pressurized gas source;
a first set of storage vessels and a second set of storage vessels, wherein:
said first set of storage vessels includes a first vessel having a first volume and a second vessel having a second volume;
said second set of storage vessels includes a third vessel having a third volume and a fourth vessel having a fourth volume; and
the ratio of said third volume to said fourth volume is substantially equal to the ratio of said first volume to said second volume;
a valve block, said valve block having:
a first source gas inlet in fluid communication with said first pressurized gas source, and a second source gas inlet in fluid communication with said second pressurized gas source;
a first vessel gas passage in fluid communication with said first vessel, a second vessel gas passage in fluid communication with said second vessel, a third vessel gas passage in fluid communication with said third vessel, and a fourth vessel gas passage in fluid communication with said fourth vessel;
a mixed gas outlet; and
a first pressure port and a second pressure port; and
wherein:
said valve block is selectively operable in a first valve state and a second valve state;
said first valve state establishes:
a first fluid interconnection between said third vessel gas passage, said fourth vessel gas passage, said mixed gas outlet, and said second pressure port;
a second fluid interconnection, isolated from said first fluid interconnection, between said first source gas inlet and said first vessel gas passage;
a third fluid interconnection, isolated from both said first fluid interconnection and said second fluid interconnection, between said second source gas inlet and said second vessel gas passage; and
a fourth fluid interconnection between said first pressure port and a single one fluid interconnection selected from the group consisting of:
said second fluid interconnection of said first valve state; and
said third fluid interconnection of said first valve state; and
said second valve state establishes:
a first fluid interconnection between said first vessel gas passage, said second vessel gas passage, said mixed gas outlet, and said first pressure port;
a second fluid interconnection, isolated from said first fluid interconnection, between said first source gas inlet and said third vessel gas passage;
a third fluid interconnection, isolated from both said first fluid interconnection and said second fluid interconnection, between said second source gas inlet and said fourth vessel gas passage; and
a fourth fluid interconnection between said second pressure port and a single one fluid interconnection selected from the group consisting of:
said second fluid interconnection of said second valve state; and
said third fluid interconnection of said second valve state; and
a valve controller operably interfaced with said valve block; said valve controller comprising:
a body having a first, longitudinal axis, a second axis transverse to said first axis, and inner walls about said first axis, said inner walls defining at least a piston chamber and a detent cavity;
a shift rod adapted to interface with a valve actuator of said valve block, said shift rod having a central axis collinear with said first, longitudinal axis of said body and being translatable along said central axis between a first position with respect to said body and a second position with respect to said body;
a first seal member about said shift rod, said first seal member forming a substantially fluid tight seal between said shift rod and said inner walls of said body to define a first end of said piston chamber;
a second seal member about said shift rod, said second seal member forming a substantially fluid tight seal between said shift rod and said inner walls of said body to define a second end of said piston chamber;
a floating piston slidingly affixed about said shift rod, said floating piston forming a substantially fluid tight seal between said shift rod and said inner walls of said body to segregate said piston chamber into a first volume adjacent said first end of said piston chamber and a second volume adjacent said second end of said piston chamber;
a first shoulder about said shift rod within said first volume and adjacent said first end of said piston chamber, and a first piston spring between said first shoulder and said floating piston;
a second shoulder about said shift rod within said second volume and adjacent said second end of said piston chamber, and a second piston spring between said second shoulder and said floating piston;
a stop member fixed in place about said shift rod within said detent cavity, said stop member having a first groove and a second groove substantially identical to said first groove, wherein the central plane through said second groove is longitudinally spaced apart from the central plane through said first groove by a distance equal to the distance that said shift rod translates between said first position and said second position;
a first detent having a spring biased catch, said spring biased catch being oriented along said second, transverse axis of said body and being adapted to conformingly engage with said first groove when said shift rod is in said first position with respect to said body and with said second groove when said shift rod is in said second position with respect to said body;
a first fluid conduit from without said body to within said first volume, said first fluid conduit being in fluid communication with said first pressure port of said valve block;
a second fluid conduit from without said body to within said second volume, said second fluid conduit being in fluid communication with said second pressure port of said valve block; and
whereby said valve controller:
is adapted to cause said valve block to transition from said first valve state to said second valve state when the fluid pressure within said second volume of said valve controller reaches a threshold value below the fluid pressure within said first volume of said valve controller;
is adapted to cause said valve block to transition from said second valve state to said first valve state when the fluid pressure within said first volume of said valve controller reaches a threshold value below the fluid pressure within said second volume of said valve controller.

18. The pneumatic arrangement for continuous delivery of a volumetrically proportioned mixture of gases as recited in claim 17, said pneumatic arrangement further comprising a pressure balancer adapted to equalize the fluid pressures of gases entering said a first source gas inlet and said second source gas inlet.

19. The pneumatic arrangement for continuous delivery of a volumetrically proportioned mixture of gases as recited in claim 17, said pneumatic arrangement further comprising a first pressure regulator interposed said fluid communication between said first pressurized gas source and said first source gas inlet, and a second pressure regulator interposed said fluid communication between said second pressurized gas source and said second source gas inlet.

20. The pneumatic arrangement for continuous delivery of a volumetrically proportioned mixture of gases as recited in claim 17, said pneumatic arrangement further comprising a surge chamber in fluid communication with said mixed gas outlet, said surge chamber being adapted to dampen rapid pressure increases at said mixed gas outlet following transition between said valve states.

21. A fluid pressure operated valve controller, said valve controller comprising:
a body having an axis therethrough, and defining an interior chamber about a portion of said axis;
a shift rod adapted to interface with a valve actuator, said shift rod being translatable along said axis between a first position with respect to said body and a second position with respect to said body, and running at least partially though said chamber;
a floating piston slidingly affixed about said shift rod, said floating piston segregating said chamber into a first volume and a second volume;
a first seal member about said shift rod defining a first closed end of said interior chamber, and a second seal member about said shift rod defining a second closed end of said interior chamber;
a first fluid conduit from without said body to within said first volume and a second fluid conduit from without said body to within said second volume; and
wherein:
a positive differential fluid pressure between said first volume and said second volume creates a force on said shift rod in a first direction along said axis; and
a negative differential fluid pressure between said first volume and said second volume creates a force on said shift rod in a second direction, opposite said first direction, along said axis.

22. The fluid pressure operated valve controller as recited in claim 21, said valve controller further comprising:
a force resisting mechanism adapted to oppose translation of said shift rod until the differential fluid pressure between said first volume and said second volume exceeds a threshold absolute value;
a force storage mechanism adapted to facilitate translation of said shift rod upon substantial equalization of the fluid pressures of said first volume and said second volume following attainment of said threshold absolute value in differential fluid pressure between said first volume and said second volume.

23. A pneumatic arrangement for continuous delivery of a volumetrically proportioned mixture of gases, said pneumatic arrangement comprising:
a first pressurized gas source and a second pressurized gas source;
a first set of storage vessels and a second set of storage vessels, wherein:
said first set of storage vessels includes a first vessel having a first volume and a second vessel having a second volume;
said second set of storage vessels includes a third vessel having a third volume and a fourth vessel having a fourth volume; and
the ratio of said third volume to said fourth volume is substantially equal to the ratio of said first volume to said second volume;
a valve block, said valve block having:
a first source gas inlet in fluid communication with said first pressurized gas source, and a second source gas inlet in fluid communication with said second pressurized gas source;
a first vessel gas passage in fluid communication With said first vessel, a second vessel gas passage in fluid communication with said second vessel, a third vessel gas passage in fluid communication with said third vessel, and a fourth vessel gas passage in fluid communication with said fourth vessel;

a mixed gas outlet; and a first pressure port and a second pressure port; and wherein:

said valve block is selectively operable in a first valve state and a second valve state;

said first valve state establishes:
- a first fluid interconnection between said third vessel gas passage, said fourth vessel gas passage, said mixed gas outlet, and said second pressure port;
- a second fluid interconnection, isolated from said first fluid interconnection, between said first source gas inlet and said first vessel gas passage;
- a third fluid interconnection, isolated from both said first fluid interconnection and said second fluid interconnection, between said second source gas inlet and said second vessel gas passage; and
- a fourth fluid interconnection between said first pressure port and a single one fluid interconnection selected from the group consisting of:
  - said second fluid interconnection of said first valve state; and
  - said third fluid interconnection of said first valve state; and said second valve state establishes:
- a first fluid interconnection between said first vessel gas passage, said second vessel gas passage, said mixed gas outlet, and said first pressure port;
- a second fluid interconnection, isolated from said first fluid interconnection, between said first source gas inlet and said third vessel gas passage;
- a third fluid interconnection, isolated from both said first fluid interconnection and said second fluid interconnection, between said second source gas inlet and said fourth vessel gas passage; and
- a fourth fluid interconnection between said second pressure port and a single one fluid interconnection selected from the group consisting of:
  - said second fluid interconnection of said second valve state; and
  - said third fluid interconnection of said second valve state; and a valve controller operably interfaced with said valve block, said valve controller comprising:
- a body having an axis therethrough, and defining an interior chamber about a portion of said axis;
- a shift rod adapted to interface with a valve actuator of said valve block, said shift rod being translatable along said axis between a first position with respect to said body and a second position with respect to said body, and running at least partially though said chamber;
- a floating piston slidingly affixed about said shift rod, said floating piston segregating said chamber into a first volume and a second volume;
- a first seal member about said shift rod defining a first closed end of said interior chamber, and a second seal member about said shift rod defining a second closed end of said interior chamber;
- a first fluid conduit from without said body to within said first volume and a second fluid conduit from without said body to within said second volume; and wherein:
- a positive differential fluid pressure between said first volume and said second volume creates a force on said shift rod in a first direction along said axis; and
- a negative differential fluid pressure between said first volume and said second volume creates a force on said shift rod in a second direction, opposite said first direction, along said axis.

24. The fluid pressure operated valve controller as recited in claim 22, wherein said force resisting mechanism is adjustable.

25. The fluid pressure operated valve controller as recited in claim 22, wherein said force resisting mechanism comprises a ball adapted to engage a circumferential groove about said shift rod.

26. The fluid pressure operated valve controller as recited in claim 25, wherein said force resisting mechanism further comprises a spring adapted to exert a force on said ball.

27. The fluid pressure operated valve controller as recited in claim 26, wherein said force resisting mechanism is adjustable.

28. The fluid pressure operated valve controller as recited in claim 22, wherein said force resisting mechanism comprises a plurality of balls, each said ball being adapted to engage a circumferential groove about said shift rod.

29. The fluid pressure operated valve controller as recited in claim 28, wherein for each said ball said force resisting mechanism further comprises a spring adapted to exert a force on the corresponding said ball.

30. The fluid pressure operated valve controller as recited in claim 29, wherein said force resisting mechanism is adjustable.

\* \* \* \* \*